US012669788B2

(12) United States Patent
Quirynen et al.

(10) Patent No.: US 12,669,788 B2
(45) Date of Patent: Jun. 30, 2026

(54) RECURRENT PREDICTION AND ITERATIVE CORRECTION METHOD FOR FAST SOLUTION OF MIXED-INTEGER OPTIMAL CONTROL

(71) Applicant: Mitsubishi Electric Research Laboratories, Inc., Cambridge, MA (US)

(72) Inventors: Rien Quirynen, Somerville, MA (US); Ankush Chakrabarty, Bedford, MA (US); Stefano Di Cairano, Newton, MA (US); Abhishek Cauligi, Mountain View, CA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 1087 days.

(21) Appl. No.: 17/662,664

(22) Filed: May 10, 2022

(65) Prior Publication Data

US 2023/0324859 A1 Oct. 12, 2023

Related U.S. Application Data

(60) Provisional application No. 63/362,547, filed on Apr. 6, 2022.

(51) Int. Cl.
G05B 15/02 (2006.01)

(52) U.S. Cl.
CPC .................................... G05B 15/02 (2013.01)

(58) Field of Classification Search
CPC ... G05B 15/02; G05B 13/0265; G05B 13/048
See application file for complete search history.

(56) References Cited

U.S. PATENT DOCUMENTS

| | | | | |
|---|---|---|---|---|
| 8,924,341 | B2 * | 12/2014 | Rothberg | G06N 3/126 |
| | | | | 706/62 |
| 10,613,490 | B2 * | 4/2020 | Quirynen | G06F 17/11 |
| 2020/0293009 | A1 * | 9/2020 | Quirynen | G05B 13/041 |

OTHER PUBLICATIONS

Bertsimas et al., Online Mixed-Integer Optimization in Milliseconds (Bertsimas) (Year: 2021).*
Hespanhol et al., A Structure Exploiting Branch-and-Bound Algorithm for Mixed-Integer Model Predictive Control (Year: 2019).*

* cited by examiner

*Primary Examiner* — Rehana Perveen
*Assistant Examiner* — John David Hagler
(74) *Attorney, Agent, or Firm* — Gene Vinokur

(57) ABSTRACT

A controller uses a motion trajectory for controlling a motion of a device to perform a task subject to constraints. The controller evaluates a parametric function to output predicted values for a set of discrete variables in a mixed-integer convex programming (MICP) problem for performing the task defined by the parameters. The controller fixes a first subset of discrete variables in the MICP to the predicted values outputted by the trained parametric function and updates at least some of the predicted values of a remaining subset of discrete variables to values are uniquely defined by the fixed values for the first subset of discrete variables and the constraints. Hence, the controller transforms the MICP into a convex programming (CP) problem, solves the CP problem subject to the constraints to produce a feasible motion trajectory, and controls the device according to the motion trajectory.

21 Claims, 48 Drawing Sheets

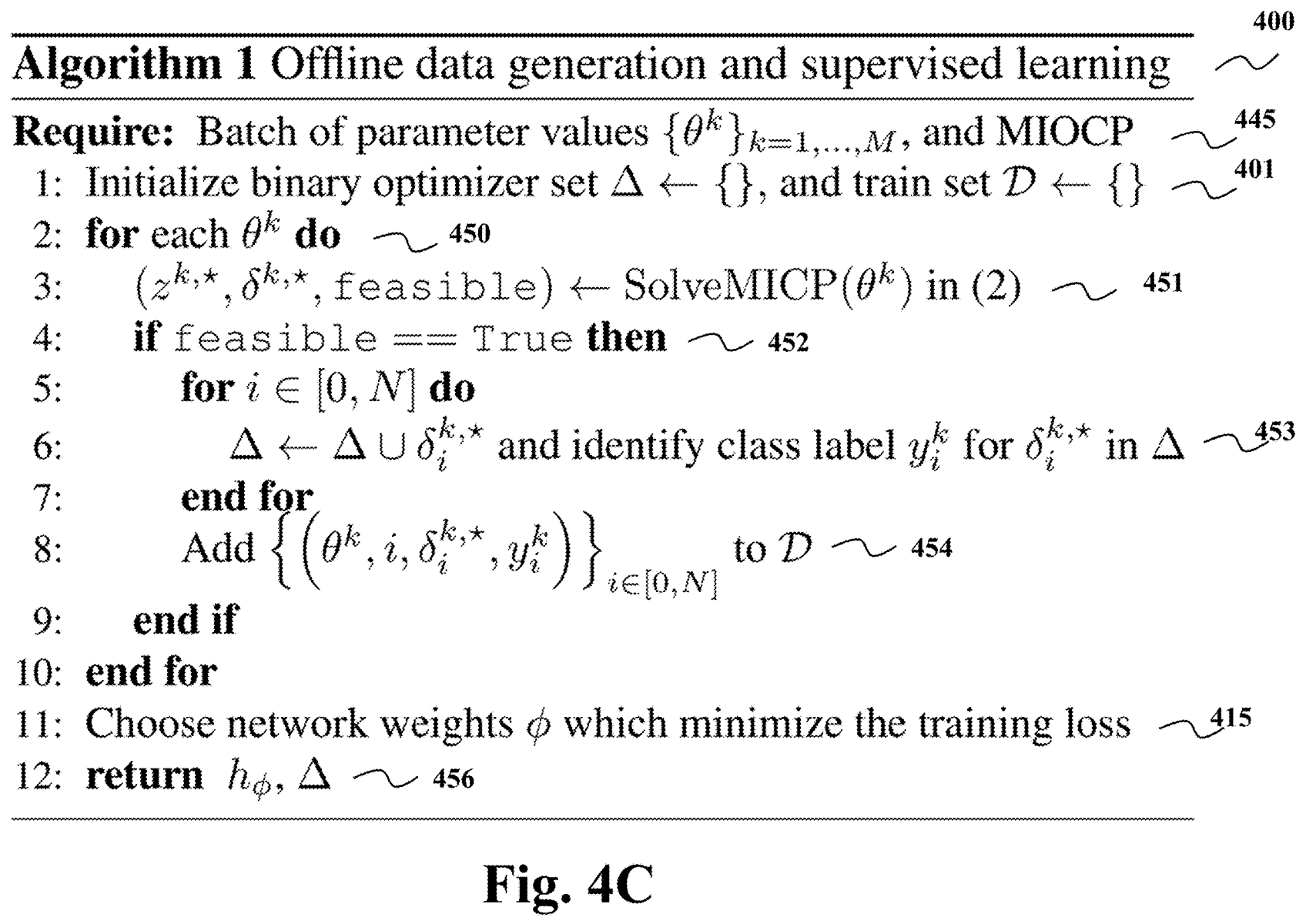

400

Algorithm 1 Offline data generation and supervised learning    445

Require: Batch of parameter values $\{\theta^k\}_{k=1,\ldots,M}$, and MIOCP    401

1: Initialize binary optimizer set $\Delta \leftarrow \{\}$, and train set $\mathcal{D} \leftarrow \{\}$ 2: for each $\theta^k$ do    450

3:    $(z^{k,\star}, \delta^{k,\star}, \text{feasible}) \leftarrow \text{SolveMICP}(\theta^k)$ in (2)    451

4:    if feasible == True then    452

5:       for $i \in [0, N]$ do

6:          $\Delta \leftarrow \Delta \cup \delta_i^{k,\star}$ and identify class label $y_i^k$ for $\delta_i^{k,\star}$ in $\Delta$    453

7:       end for

8:       Add $\left\{\left(\theta^k, i, \delta_i^{k,\star}, y_i^k\right)\right\}_{i\in[0,N]}$ to $\mathcal{D}$    454

9:    end if

10: end for

11: Choose network weights $\phi$ which minimize the training loss    415

12: return $h_\phi, \Delta$    456

Fig. 4C

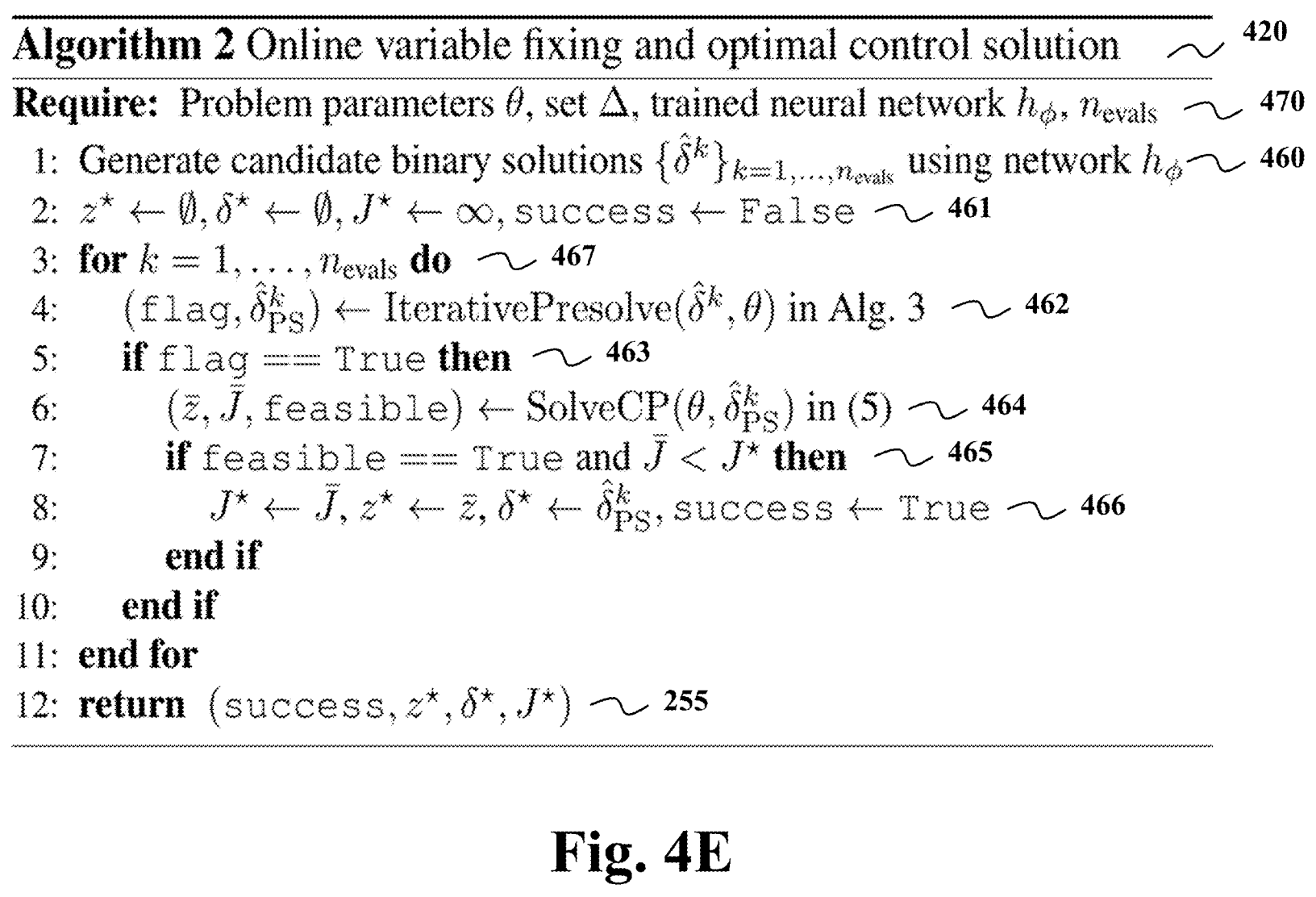

Algorithm 2 Online variable fixing and optimal control solution $\sim$ 420

Require: Problem parameters $\theta$, set $\Delta$, trained neural network $h_\phi$, $n_{evals}$ $\sim$ 470

1: Generate candidate binary solutions $\{\hat{\delta}^k\}_{k=1,\ldots,n_{evals}}$ using network $h_\phi$ $\sim$ 460

2: $z^* \leftarrow \emptyset, \delta^* \leftarrow \emptyset, J^* \leftarrow \infty$, success $\leftarrow$ False $\sim$ 461

3: for $k = 1, \ldots, n_{evals}$ do $\sim$ 467

4: $\quad$ (flag, $\hat{\delta}_{PS}^k$) $\leftarrow$ IterativePresolve($\hat{\delta}^k$, $\theta$) in Alg. 3 $\sim$ 462

5: $\quad$ if flag == True then $\sim$ 463

6: $\quad\quad$ ($\bar{z}, \bar{J}$, feasible) $\leftarrow$ SolveCP($\theta$, $\hat{\delta}_{PS}^k$) in (5) $\sim$ 464

7: $\quad\quad$ if feasible == True and $\bar{J} < J^*$ then $\sim$ 465

8: $\quad\quad\quad$ $J^* \leftarrow \bar{J}, z^* \leftarrow \bar{z}, \delta^* \leftarrow \hat{\delta}_{PS}^k$, success $\leftarrow$ True $\sim$ 466

9: $\quad\quad$ end if

10: $\quad$ end if

11: end for

12: return (success, $z^*, \delta^*, J^*$) $\sim$ 255

Fig. 4E

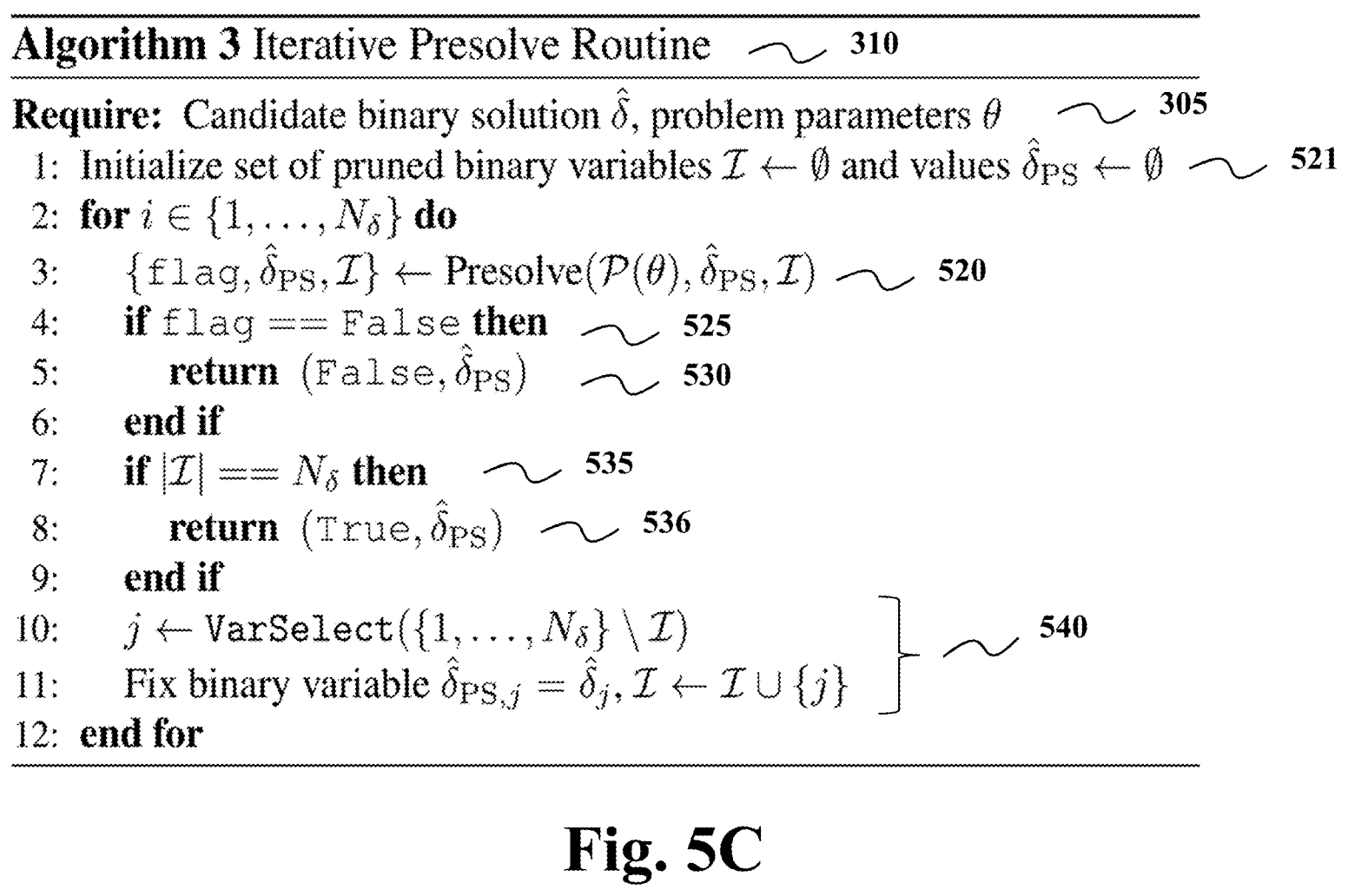

Algorithm 3 Iterative Presolve Routine $\sim$ 310

Require: Candidate binary solution $\hat{\delta}$, problem parameters $\theta$ $\sim$ 305

1: Initialize set of pruned binary variables $\mathcal{I} \leftarrow \emptyset$ and values $\hat{\delta}_{PS} \leftarrow \emptyset$ $\sim$ 521

2: for $i \in \{1, \ldots, N_\delta\}$ do

3:      $\{flag, \hat{\delta}_{PS}, \mathcal{I}\} \leftarrow \text{Presolve}(\mathcal{P}(\theta), \hat{\delta}_{PS}, \mathcal{I})$ $\sim$ 520

4:      if $flag == \text{False}$ then $\sim$ 525

5:          return $(\text{False}, \hat{\delta}_{PS})$ $\sim$ 530

6:      end if

7:      if $|\mathcal{I}| == N_\delta$ then $\sim$ 535

8:          return $(\text{True}, \hat{\delta}_{PS})$ $\sim$ 536

9:      end if

10:     $j \leftarrow \text{VarSelect}(\{1, \ldots, N_\delta\} \setminus \mathcal{I})$ 11:     Fix binary variable $\hat{\delta}_{PS,j} == \hat{\delta}_j$, $\mathcal{I} \leftarrow \mathcal{I} \cup \{j\}$ $\bigg\}$ $\sim$ 540

12: end for

Fig. 5C

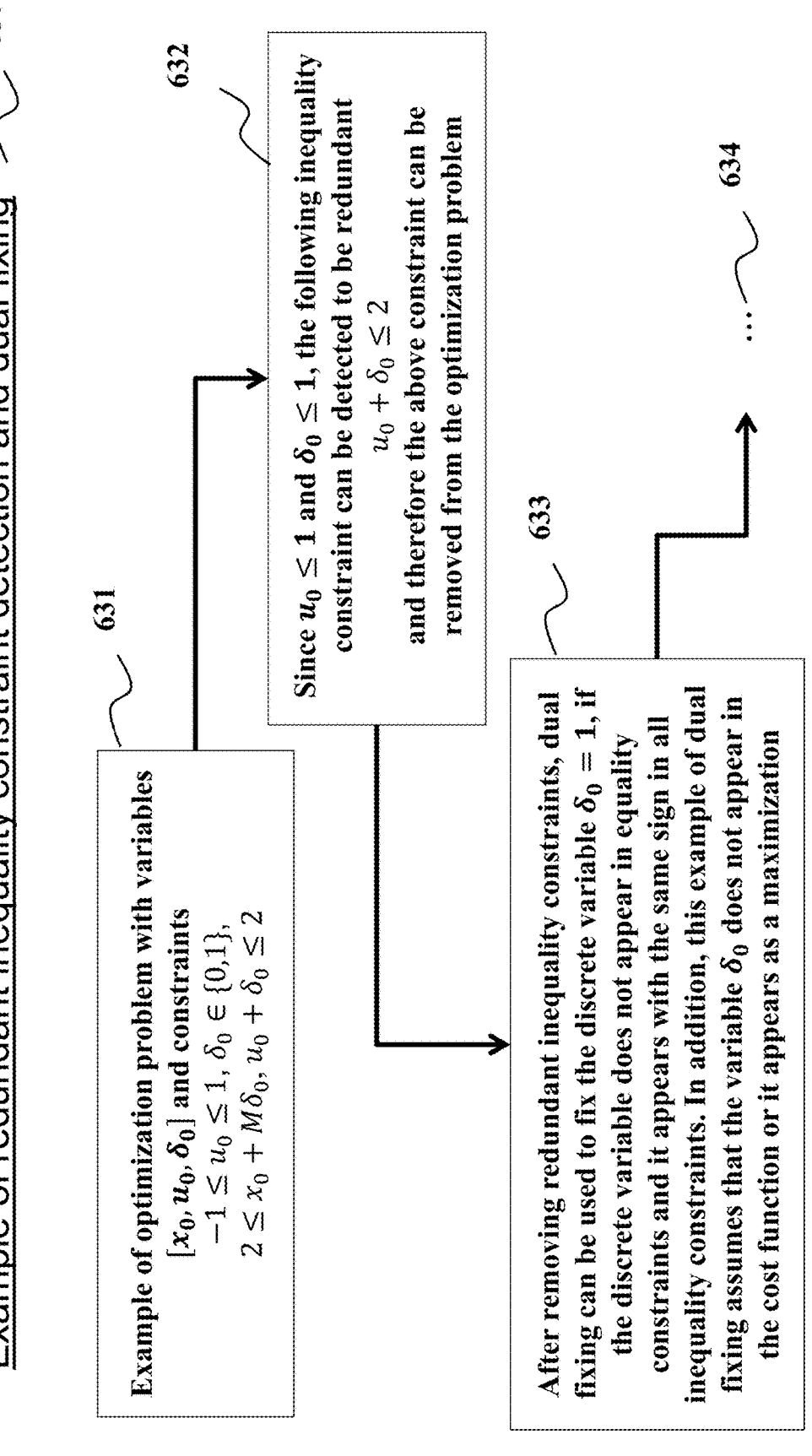

Example of redundant inequality constraint detection and dual fixing

630

631

Example of optimization problem with variables
$[x_0, u_0, \delta_0]$ and constraints
$-1 \leq u_0 \leq 1, \delta_0 \in \{0,1\}$,
$2 \leq x_0 + M\delta_0, u_0 + \delta_0 \leq 2$

632

Since $u_0 \leq 1$ and $\delta_0 \leq 1$, the following inequality constraint can be detected to be redundant
$$u_0 + \delta_0 \leq 2$$
and therefore the above constraint can be removed from the optimization problem

633

After removing redundant inequality constraints, dual fixing can be used to fix the discrete variable $\delta_0 = 1$, if the discrete variable does not appear in equality constraints and it appears with the same sign in all inequality constraints. In addition, this example of dual fixing assumes that the variable $\delta_0$ does not appear in the cost function or it appears as a maximization

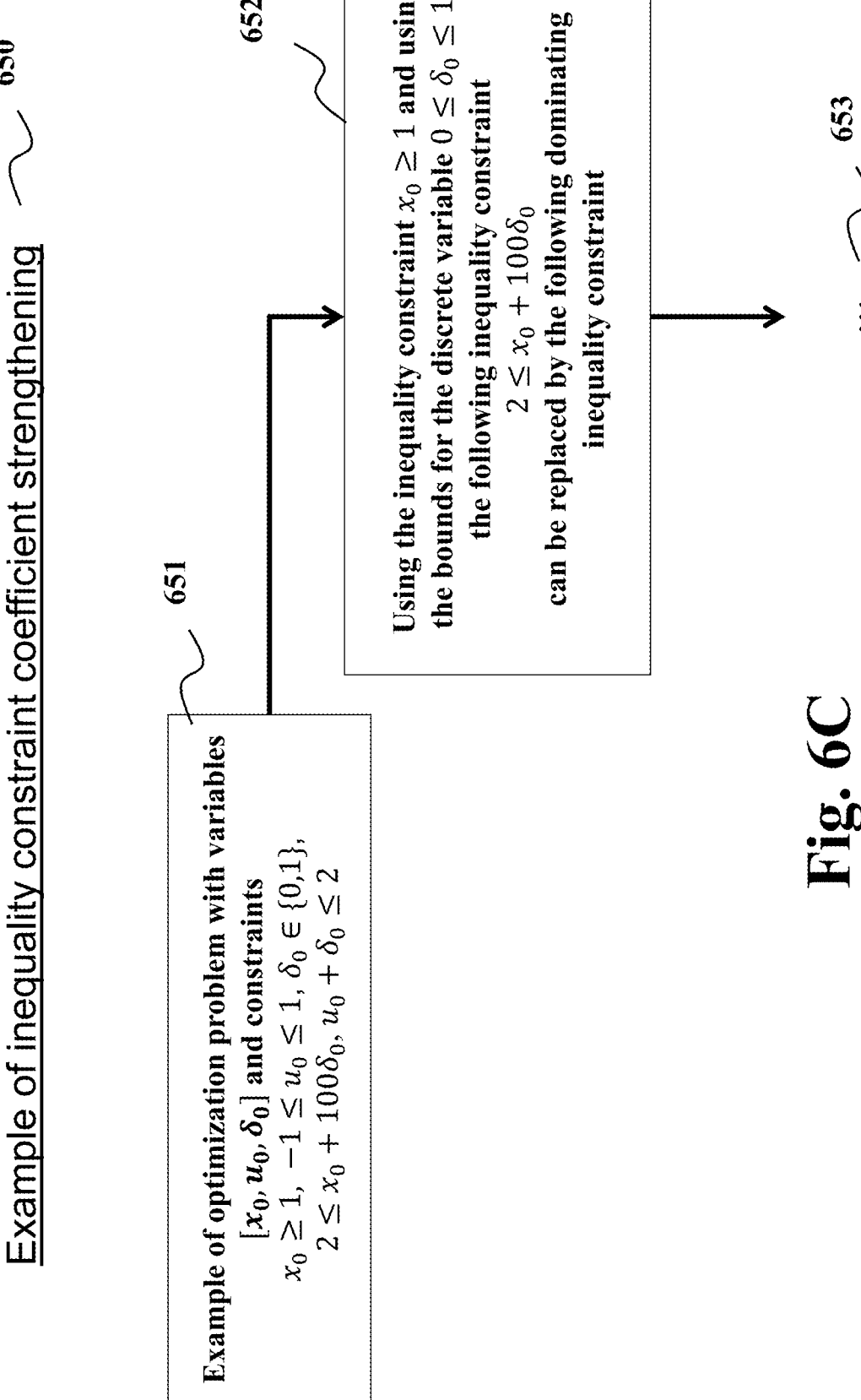

Example of inequality constraint coefficient strengthening

650

651

Example of optimization problem with variables
$[x_0, u_0, \delta_0]$ and constraints
$x_0 \geq 1, \ -1 \leq u_0 \leq 1, \ \delta_0 \in \{0,1\},$
$2 \leq x_0 + 100\delta_0, \ u_0 + \delta_0 \leq 2$

652

Using the inequality constraint $x_0 \geq 1$ and using
the bounds for the discrete variable $0 \leq \delta_0 \leq 1$,
the following inequality constraint
$2 \leq x_0 + 100\delta_0$
can be replaced by the following dominating
inequality constraint

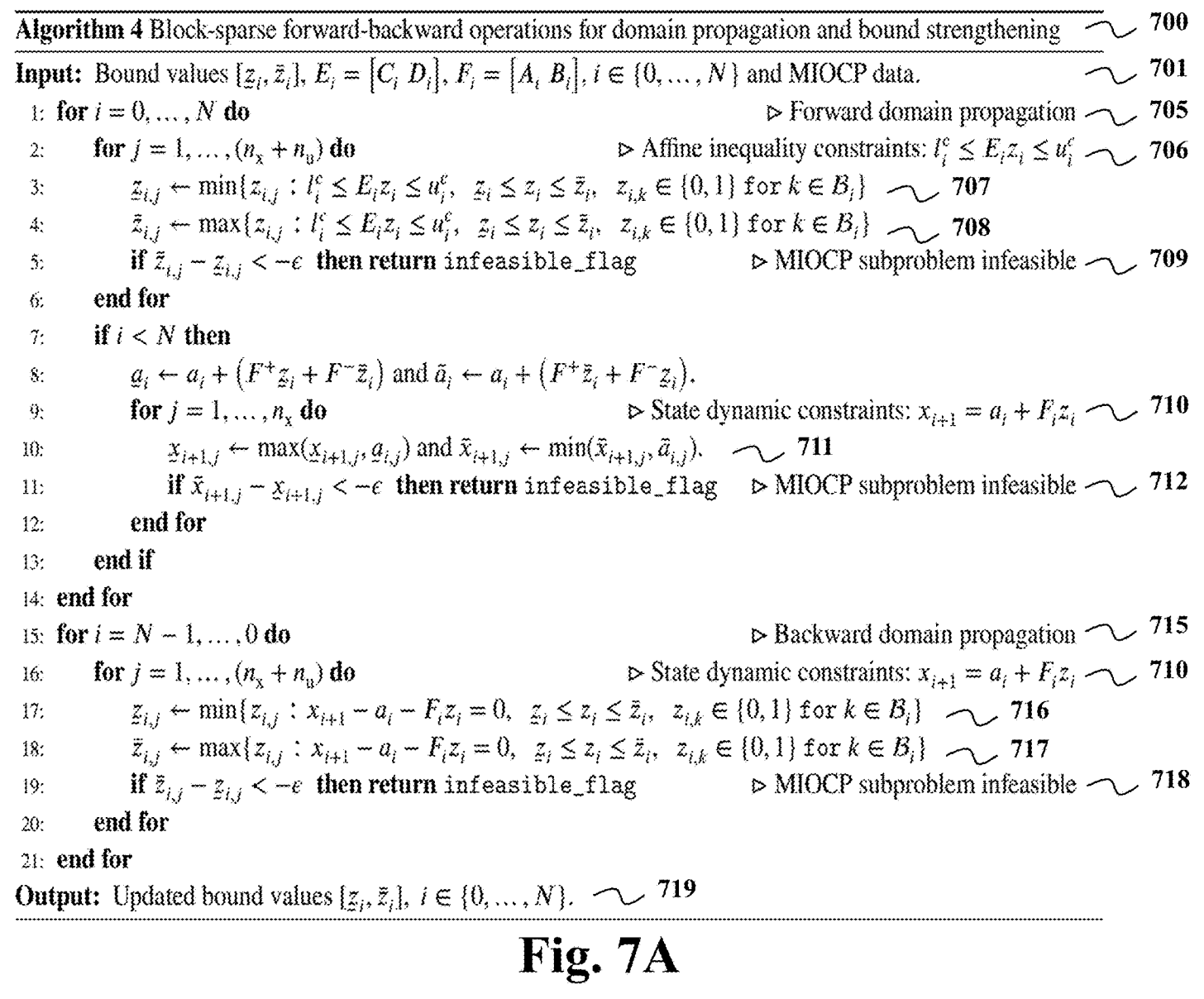

Algorithm 4 Block-sparse forward-backward operations for domain propagation and bound strengthening ⟿ 700

Input: Bound values $[\underline{z}_i, \bar{z}_i]$, $E_i = [C_i \; D_i]$, $F_i = [A_i \; B_i]$, $i \in \{0, \ldots, N\}$ and MIOCP data. ⟿ 701

1: for $i = 0, \ldots, N$ do                    ▷ Forward domain propagation ⟿ 705
2:   for $j = 1, \ldots, (n_x + n_u)$ do              ▷ Affine inequality constraints: $l_i^c \leq E_{i,:} z_i \leq u_i^c$ ⟿ 706
3:     $\underline{z}_{i,j} \leftarrow \min\{\underline{z}_{i,j} : l_i^c \leq E_{i,:} z_i \leq u_i^c, \; \underline{z}_i \leq z_i \leq \bar{z}_i, \; z_{i,k} \in \{0,1\} \text{ for } k \in B_i\}$ ⟿ 707
4:     $\bar{z}_{i,j} \leftarrow \max\{\bar{z}_{i,j} : l_i^c \leq E_{i,:} z_i \leq u_i^c, \; \underline{z}_i \leq z_i \leq \bar{z}_i, \; z_{i,k} \in \{0,1\} \text{ for } k \in B_i\}$ ⟿ 708
5:     if $\bar{z}_{i,j} - \underline{z}_{i,j} < -\epsilon$ then return infeasible_flag          ▷ MIOCP subproblem infeasible ⟿ 709
6:   end for
7:   if $i < N$ then
8:     $\underline{a}_i \leftarrow a_i + \left(F^+ \underline{z}_i + F^- \bar{z}_i\right)$ and $\bar{a}_i \leftarrow a_i + \left(F^+ \bar{z}_i + F^- \underline{z}_i\right)$.
9:     for $j = 1, \ldots, n_x$ do              ▷ State dynamic constraints: $x_{i+1} = a_i + F_i z_i$ ⟿ 710
10:       $\underline{x}_{i+1,j} \leftarrow \max(\underline{x}_{i+1,j}, \underline{a}_{i,j})$ and $\bar{x}_{i+1,j} \leftarrow \min(\bar{x}_{i+1,j}, \bar{a}_{i,j})$. ⟿ 711
11:       if $\bar{x}_{i+1,j} - \underline{x}_{i+1,j} < -\epsilon$ then return infeasible_flag          ▷ MIOCP subproblem infeasible ⟿ 712
12:     end for
13:   end if
14: end for
15: for $i = N-1, \ldots, 0$ do                    ▷ Backward domain propagation ⟿ 715
16:   for $j = 1, \ldots, (n_x + n_u)$ do              ▷ State dynamic constraints: $x_{i+1} = a_i + F_i z_i$ ⟿ 710
17:     $\underline{z}_{i,j} \leftarrow \min\{\underline{z}_{i,j} : x_{i+1} - a_i - F_i z_i = 0, \; \underline{z}_i \leq z_i \leq \bar{z}_i, \; z_{i,k} \in \{0,1\} \text{ for } k \in B_i\}$ ⟿ 716
18:     $\bar{z}_{i,j} \leftarrow \max\{\bar{z}_{i,j} : x_{i+1} - a_i - F_i z_i = 0, \; \underline{z}_i \leq z_i \leq \bar{z}_i, \; z_{i,k} \in \{0,1\} \text{ for } k \in B_i\}$ ⟿ 717
19:     if $\bar{z}_{i,j} - \underline{z}_{i,j} < -\epsilon$ then return infeasible_flag          ▷ MIOCP subproblem infeasible ⟿ 718
20:   end for
21: end for

Output: Updated bound values $[\underline{z}_i, \bar{z}_i]$, $i \in \{0, \ldots, N\}$. ⟿ 719

Fig. 7A

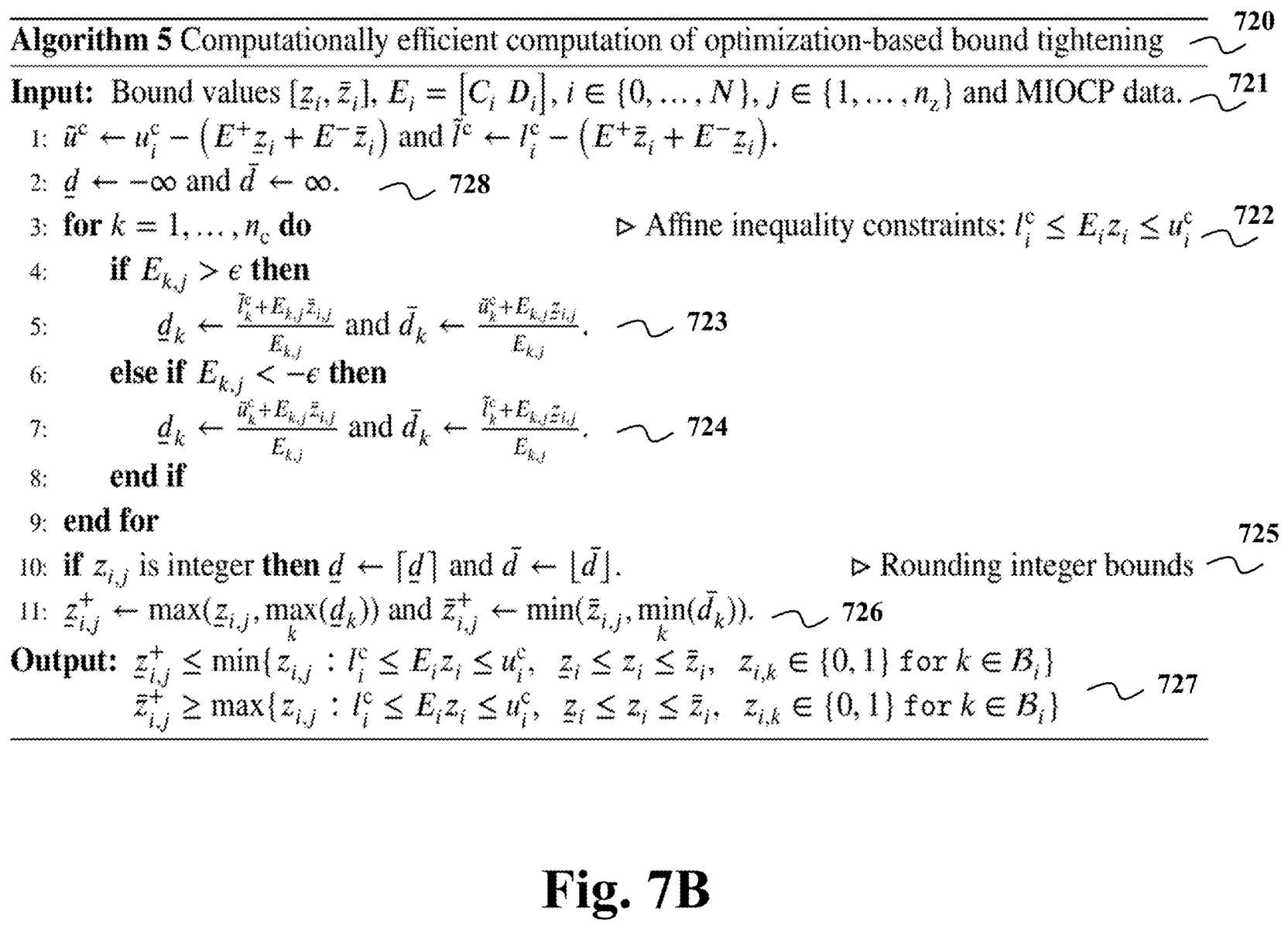

Algorithm 5 Computationally efficient computation of optimization-based bound tightening   720

Input: Bound values $[\underline{z}_i, \bar{z}_i]$, $E_i = [C_i \; D_i]$, $i \in \{0, \ldots, N\}$, $j \in \{1, \ldots, n_z\}$ and MIOCP data.   721

1:   $\bar{u}_i^c \leftarrow u_i^c - (E^+ \underline{z}_i + E^- \bar{z}_i)$ and $\bar{l}_i^c \leftarrow l_i^c - (E^+ \bar{z}_i + E^- \underline{z}_i)$.   728

2:   $\underline{d} \leftarrow -\infty$ and $\bar{d} \leftarrow \infty$.

3:   for $k = 1, \ldots, n_c$ do      $\triangleright$ Affine inequality constraints: $l_i^c \le E_i z_i \le u_i^c$   722

4:    if $E_{k,j} > \epsilon$ then

5:     $\underline{d}_k \leftarrow \dfrac{\bar{l}_k^c + E_{k,j} \bar{z}_{i,j}}{E_{k,j}}$ and $\bar{d}_k \leftarrow \dfrac{\bar{u}_k^c + E_{k,j} \bar{z}_{i,j}}{E_{k,j}}$,   723

6:    else if $E_{k,j} < -\epsilon$ then

7:     $\underline{d}_k \leftarrow \dfrac{\bar{u}_k^c + E_{k,j} \bar{z}_{i,j}}{E_{k,j}}$ and $\bar{d}_k \leftarrow \dfrac{\bar{l}_k^c + E_{k,j} \bar{z}_{i,j}}{E_{k,j}}$,   724

8:    end if

9:   end for

10:   if $z_{i,j}$ is integer then $\underline{d} \leftarrow \lceil \underline{d} \rceil$ and $\bar{d} \leftarrow \lfloor \bar{d} \rfloor$.      $\triangleright$ Rounding integer bounds   725

11:   $\underline{z}_{i,j}^+ \leftarrow \max(\underline{z}_{i,j}, \max_k(\underline{d}_k))$ and $\bar{z}_{i,j}^+ \leftarrow \min(\bar{z}_{i,j}, \min_k(\bar{d}_k))$.   726

Output: $\underline{z}_{i,j}^+ \le \min\{z_{i,j} : l_i^c \le E_i z_i \le u_i^c, \; \underline{z}_i \le z_i \le \bar{z}_i, \; z_{i,k} \in \{0,1\} \text{ for } k \in B_i\}$ $\bar{z}_{i,j}^+ \ge \max\{z_{i,j} : l_i^c \le E_i z_i \le u_i^c, \; \underline{z}_i \le z_i \le \bar{z}_i, \; z_{i,k} \in \{0,1\} \text{ for } k \in B_i\}$   727

Fig. 7B

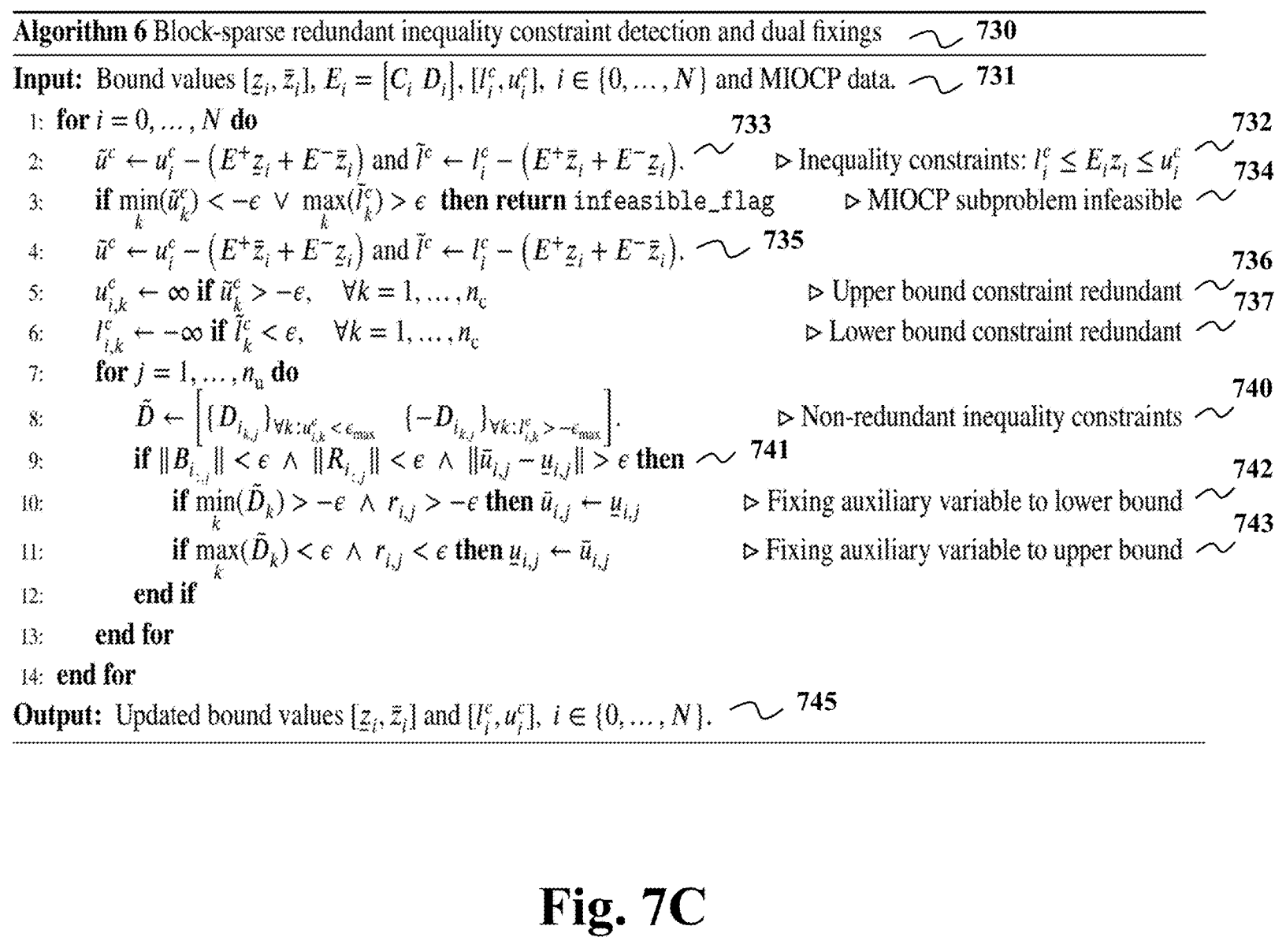

Algorithm 6 Block-sparse redundant inequality constraint detection and dual fixings ~ 730

Input: Bound values $[\underline{z}_i, \bar{z}_i]$, $E_i = [C_i\ D_i]$, $[l_i^c, u_i^c]$, $i \in \{0,\ldots,N\}$ and MIOCP data ~ 731

1: for $i = 0,\ldots,N$ do

2: $\quad \tilde{u}_i^c \leftarrow u_i^c - (E^+\bar{z}_i + E^-\underline{z}_i)$ and $\tilde{l}_i^c \leftarrow l_i^c - (E^+\underline{z}_i + E^-\bar{z}_i)$. ~ 733 $\qquad \triangleright$ Inequality constraints: $l_i^c \leq E_i z_i \leq u_i^c$ ~ 732, 734

3: $\quad$ if $\min_k(\tilde{u}_k^c) < -\epsilon \vee \max_k(\tilde{l}_k^c) > \epsilon$ then return infeasible_flag $\qquad \triangleright$ MIOCP subproblem infeasible 4: $\quad \tilde{u}_i^c \leftarrow u_i^c - (E^+\bar{z}_i + E^-\underline{z}_i)$ and $\tilde{l}_i^c \leftarrow l_i^c - (E^+\underline{z}_i + E^-\bar{z}_i)$, ~ 735 , 736

5: $\quad u_{i,k}^c \leftarrow \infty$ if $\tilde{u}_k^c > -\epsilon, \quad \forall k = 1,\ldots,n_c$ $\qquad \triangleright$ Upper bound constraint redundant ~ 737

6: $\quad l_{i,k}^c \leftarrow -\infty$ if $\tilde{l}_k^c < \epsilon, \quad \forall k = 1,\ldots,n_c$ $\qquad \triangleright$ Lower bound constraint redundant 7: $\quad$ for $j = 1,\ldots,n_u$ do

8: $\quad\quad \tilde{D} \leftarrow \left[ \{(D_{i,j})\}_{\forall k:u_{i,k}^c < \epsilon_{max}} \quad \{(-D_{i,j})\}_{\forall k:l_{i,k}^c > -\epsilon_{max}} \right]$. ~ 740

9: $\quad\quad$ if $\|B_{i,j}\| < \epsilon \wedge \|R_{i,j}\| < \epsilon \wedge \|\tilde{u}_{i,j} - u_{i,j}\| > \epsilon$ then ~ 741 $\qquad \triangleright$ Non-redundant inequality constraints 10: $\quad\quad\quad$ if $\min_k(\tilde{D}_k) > -\epsilon \wedge r_{i,j} > -\epsilon$ then $\tilde{u}_{i,j} \leftarrow u_{i,j}$ $\qquad \triangleright$ Fixing auxiliary variable to lower bound ~ 742

11: $\quad\quad\quad$ if $\max_k(\tilde{D}_k) < \epsilon \wedge r_{i,j} < \epsilon$ then $u_{i,j} \leftarrow \tilde{u}_{i,j}$ $\qquad \triangleright$ Fixing auxiliary variable to upper bound ~ 743

12: $\quad\quad$ end if

13: $\quad$ end for

14: end for

Output: Updated bound values $[\underline{z}_i, \bar{z}_i]$ and $[l_i^c, u_i^c]$, $i \in \{0,\ldots,N\}$. ~ 745

Fig. 7C

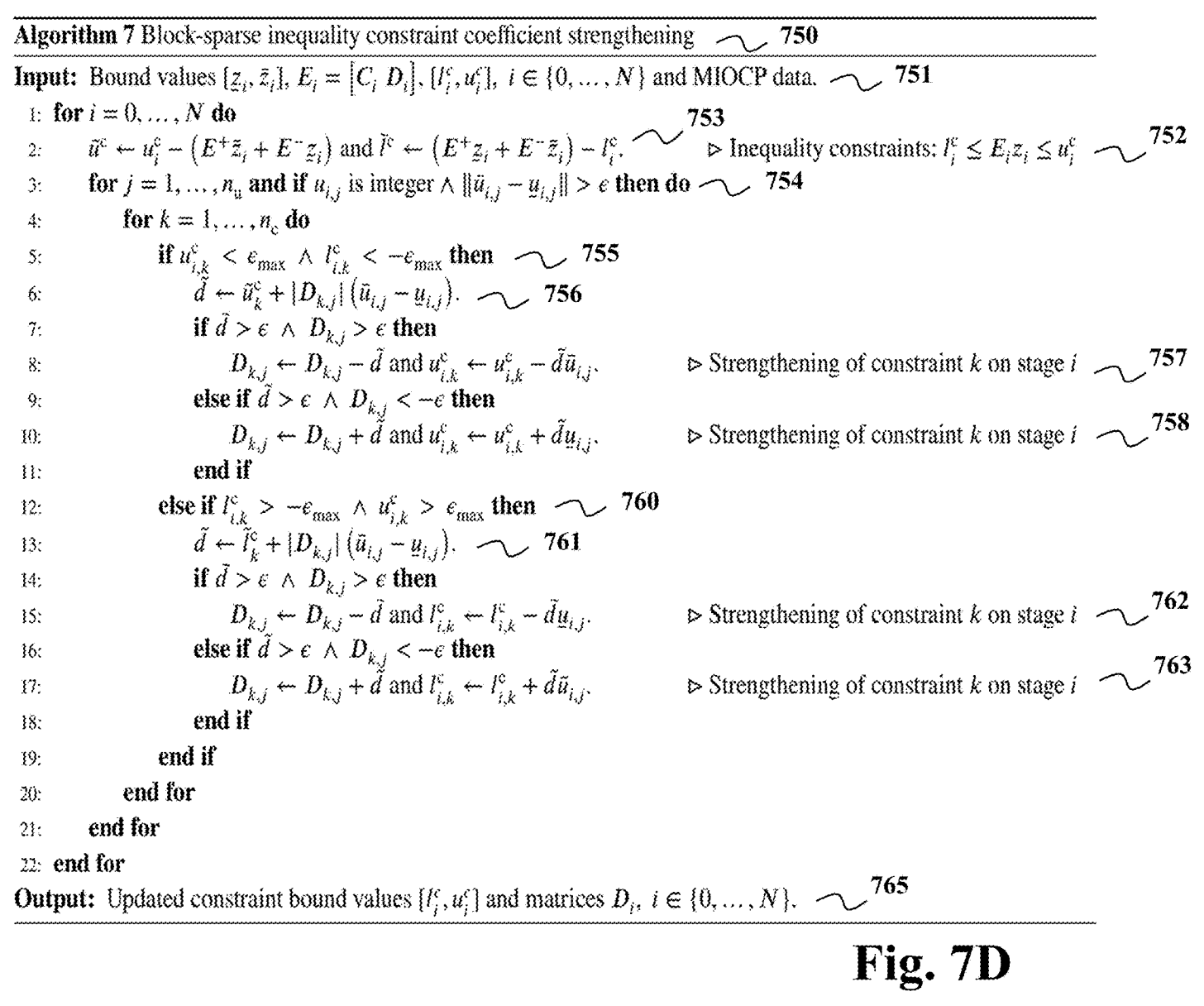

Algorithm 7 Block-sparse inequality constraint coefficient strengthening ~750

Input: Bound values $[\underline{z}_i, \bar{z}_i]$, $E_i = [C_i\ D_i]$, $[l_i^c, u_i^c]$, $i \in \{0,\ldots,N\}$ and MIOCP data. ~751

1: for $i = 0,\ldots, N$ do

2: $\quad \bar{u}^c \leftarrow u_i^c - (E^+\bar{z}_i + E^-\underline{z}_i)$ and $\bar{l}^c \leftarrow (E^+\underline{z}_i + E^-\bar{z}_i) - l_i^c$  ~753　　▷ Inequality constraints: $l_i^c \le E_i z_i \le u_i^c$  ~752

3: $\quad$ for $j = 1,\ldots, n_u$ and if $u_{i,j}$ is integer $\wedge$ $\|\bar{u}_{i,j} - u_{i,j}\| > \epsilon$ then do ~754

4: $\quad\quad$ for $k = 1,\ldots, n_c$ do

5: $\quad\quad\quad$ if $u_{i,k}^c < \epsilon_{max} \wedge l_{i,k}^c < -\epsilon_{max}$ then ~755

6: $\quad\quad\quad\quad \tilde{d} \leftarrow \bar{u}_k^c + |D_{k,j}|\,(\bar{u}_{i,j} - u_{i,j})$. ~756

7: $\quad\quad\quad\quad$ if $\tilde{d} > \epsilon < D_{k,j} > \epsilon$ then

8: $\quad\quad\quad\quad\quad D_{k,j} \leftarrow D_{k,j} - \tilde{d}$ and $u_{i,k}^c \leftarrow u_{i,k}^c - \tilde{d}\bar{u}_{i,j}$　　▷ Strengthening of constraint $k$ on stage $i$  ~757

9: $\quad\quad\quad\quad$ else if $\tilde{d} > \epsilon \wedge D_{k,j} < -\epsilon$ then

10: $\quad\quad\quad\quad\quad D_{k,j} \leftarrow D_{k,j} + \tilde{d}$ and $u_{i,k}^c \leftarrow u_{i,k}^c + \tilde{d}\bar{u}_{i,j}$　　▷ Strengthening of constraint $k$ on stage $i$  ~758

11: $\quad\quad\quad\quad$ end if

12: $\quad\quad\quad$ else if $l_{i,k}^c > -\epsilon_{max} \wedge u_{i,k}^c > \epsilon_{max}$ then ~760

13: $\quad\quad\quad\quad \tilde{d} \leftarrow \bar{l}_k^c + |D_{k,j}|\,(\bar{u}_{i,j} - u_{i,j})$. ~761

14: $\quad\quad\quad\quad$ if $\tilde{d} > \epsilon < D_{k,j} > \epsilon$ then

15: $\quad\quad\quad\quad\quad D_{k,j} \leftarrow D_{k,j} - \tilde{d}$ and $l_{i,k}^c \leftarrow l_{i,k}^c - \tilde{d}u_{i,j}$　　▷ Strengthening of constraint $k$ on stage $i$  ~762

16: $\quad\quad\quad\quad$ else if $\tilde{d} > \epsilon \wedge D_{k,j} < -\epsilon$ then

17: $\quad\quad\quad\quad\quad D_{k,j} \leftarrow D_{k,j} + \tilde{d}$ and $l_{i,k}^c \leftarrow l_{i,k}^c + \tilde{d}\bar{u}_{i,j}$　　▷ Strengthening of constraint $k$ on stage $i$  ~763

18: $\quad\quad\quad\quad$ end if

19: $\quad\quad\quad$ end if

20: $\quad\quad$ end for

21: $\quad$ end for

22: end for

Output: Updated constraint bound values $[l_i^c, u_i^c]$ and matrices $D_i$, $i \in \{0,\ldots,N\}$. ~765

Fig. 7D

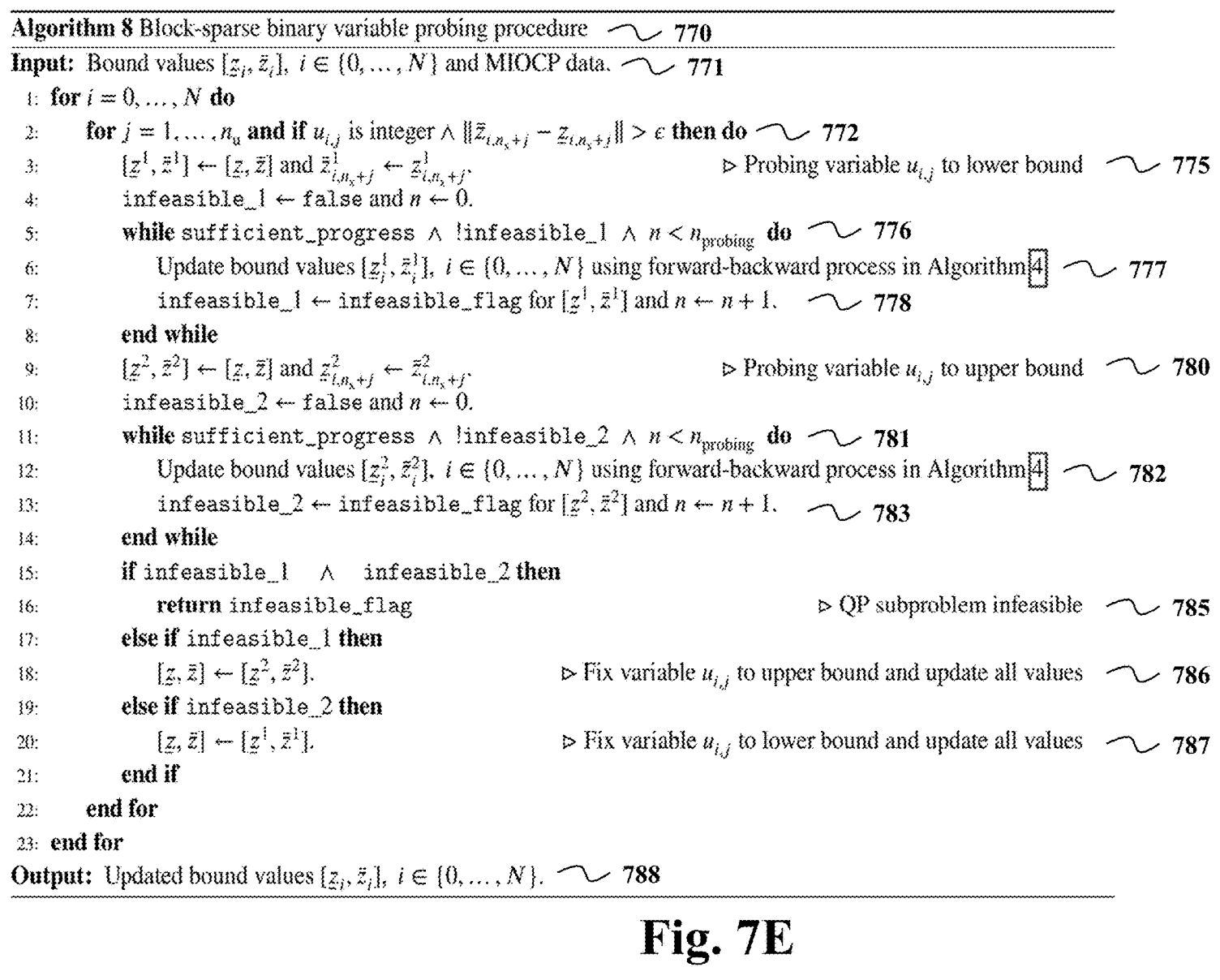

Algorithm 8 Block-sparse binary variable probing procedure  ⟞ 770

Input: Bound values $[\underline{z}_i, \bar{z}_i]$, $i \in \{0, \ldots, N\}$ and MIOCP data.  ⟞ 771

1: for $i = 0, \ldots, N$ do

2:   for $j = 1, \ldots, n_a$ and if $u_{i,j}$ is integer $\wedge \|\bar{z}_{i,n_x+j} - \underline{z}_{i,n_x+j}\| > \epsilon$ then do  ⟞ 772

3:     $[\underline{z}^1, \bar{z}^1] \leftarrow [\underline{z}, \bar{z}]$ and $\bar{z}^1_{i,n_x+j} \leftarrow \underline{z}^1_{i,n_x+j}$    ▷ Probing variable $u_{i,j}$ to lower bound  ⟞ 775

4:     infeasible_1 ← false and $n \leftarrow 0$.

5:     while sufficient_progress $\wedge$ !infeasible_1 $\wedge n < n_{probing}$ do  ⟞ 776

6:       Update bound values $[\underline{z}^1_i, \bar{z}^1_i]$, $i \in \{0, \ldots, N\}$ using forward-backward process in Algorithm 4  ⟞ 777

7:       infeasible_1 ← infeasible_flag for $[\underline{z}^1, \bar{z}^1]$ and $n \leftarrow n + 1$.  ⟞ 778

8:     end while

9:     $[\underline{z}^2, \bar{z}^2] \leftarrow [\underline{z}, \bar{z}]$ and $\underline{z}^2_{i,n_x+j} \leftarrow \bar{z}^2_{i,n_x+j}$    ▷ Probing variable $u_{i,j}$ to upper bound  ⟞ 780

10:     infeasible_2 ← false and $n \leftarrow 0$.

11:     while sufficient_progress $\wedge$ !infeasible_2 $\wedge n < n_{probing}$ do  ⟞ 781

12:       Update bound values $[\underline{z}^2_i, \bar{z}^2_i]$, $i \in \{0, \ldots, N\}$ using forward-backward process in Algorithm 4  ⟞ 782

13:       infeasible_2 ← infeasible_flag for $[\underline{z}^2, \bar{z}^2]$ and $n \leftarrow n + 1$.  ⟞ 783

14:     end while

15:     if infeasible_1 $\wedge$ infeasible_2 then

16:       return infeasible_flag    ▷ QP subproblem infeasible  ⟞ 785

17:     else if infeasible_1 then

18:       $[\underline{z}, \bar{z}] \leftarrow [\underline{z}^2, \bar{z}^2]$.    ▷ Fix variable $u_{i,j}$ to upper bound and update all values  ⟞ 786

19:     else if infeasible_2 then

20:       $[\underline{z}, \bar{z}] \leftarrow [\underline{z}^1, \bar{z}^1]$.    ▷ Fix variable $u_{i,j}$ to lower bound and update all values  ⟞ 787

21:     end if

22:   end for

23: end for

Output: Updated bound values $[\underline{z}_i, \bar{z}_i]$, $i \in \{0, \ldots, N\}$.  ⟞ 788

Fig. 7E

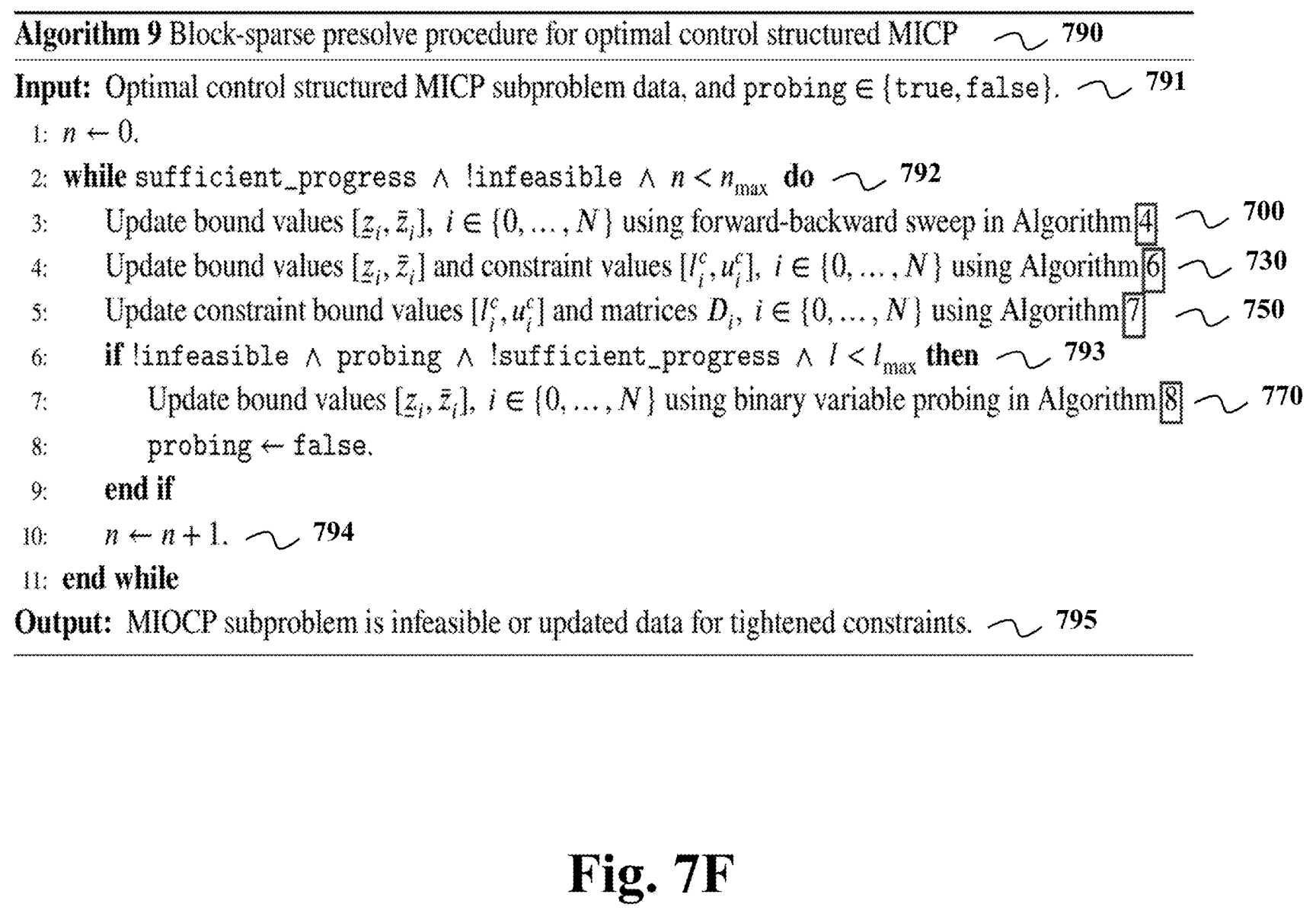

Algorithm 9 Block-sparse presolve procedure for optimal control structured MICP $\sim$ 790

Input: Optimal control structured MICP subproblem data, and probing $\in \{\texttt{true}, \texttt{false}\}$. $\sim$ 791

1: $n \leftarrow 0$.

2: while sufficient_progress $\wedge$ !infeasible $\wedge$ $n < n_{max}$ do $\sim$ 792

3:   Update bound values $[\underline{z}_i, \bar{z}_i]$, $i \in \{0, \ldots, N\}$ using forward-backward sweep in Algorithm 4 $\sim$ 700

4:   Update bound values $[\underline{z}_i, \bar{z}_i]$ and constraint values $[l_i^c, u_i^c]$, $i \in \{0, \ldots, N\}$ using Algorithm 6 $\sim$ 730

5:   Update constraint bound values $[l_i^c, u_i^c]$ and matrices $D_i$, $i \in \{0, \ldots, N\}$ using Algorithm 7 $\sim$ 750

6:   if !infeasible $\wedge$ probing $\wedge$ !sufficient_progress $\wedge$ $l < l_{max}$ then $\sim$ 793

7:     Update bound values $[\underline{z}_i, \bar{z}_i]$, $i \in \{0, \ldots, N\}$ using binary variable probing in Algorithm 8 $\sim$ 770

8:     probing $\leftarrow$ false.

9:   end if

10:   $n \leftarrow n + 1$. $\sim$ 794

11: end while

Output: MIOCP subproblem is infeasible or updated data for tightened constraints. $\sim$ 795

Fig. 7F

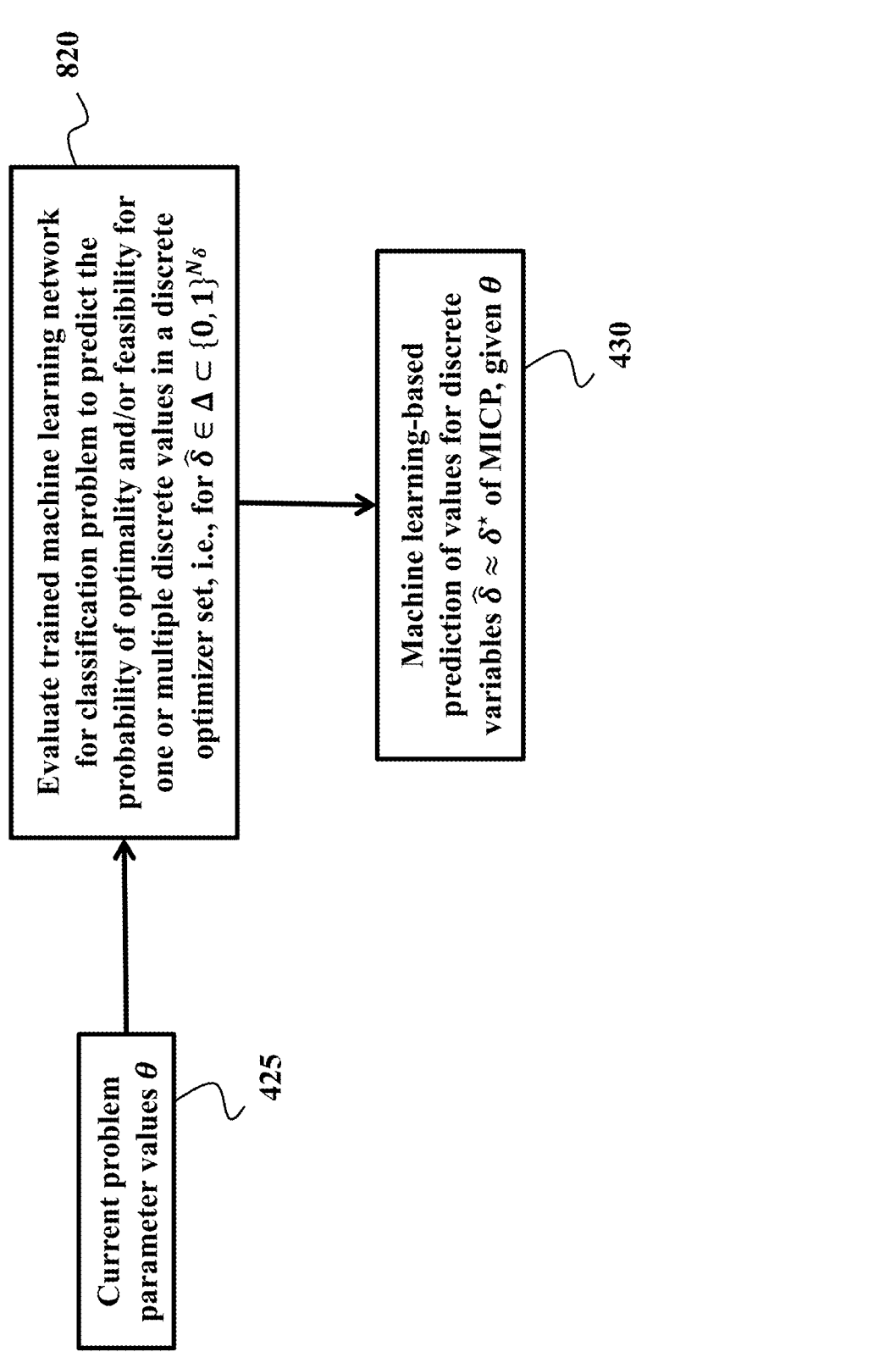

820

Evaluate trained machine learning network for classification problem to predict the probability of optimality and/or feasibility for one or multiple discrete values in a discrete optimizer set, i.e., for $\hat{\delta} \in \Delta \subset \{0,1\}^{N_\delta}$ Current problem parameter values $\theta$

425

Machine learning-based prediction of values for discrete variables $\hat{\delta} \approx \delta^\star$ of MICP, given $\theta$

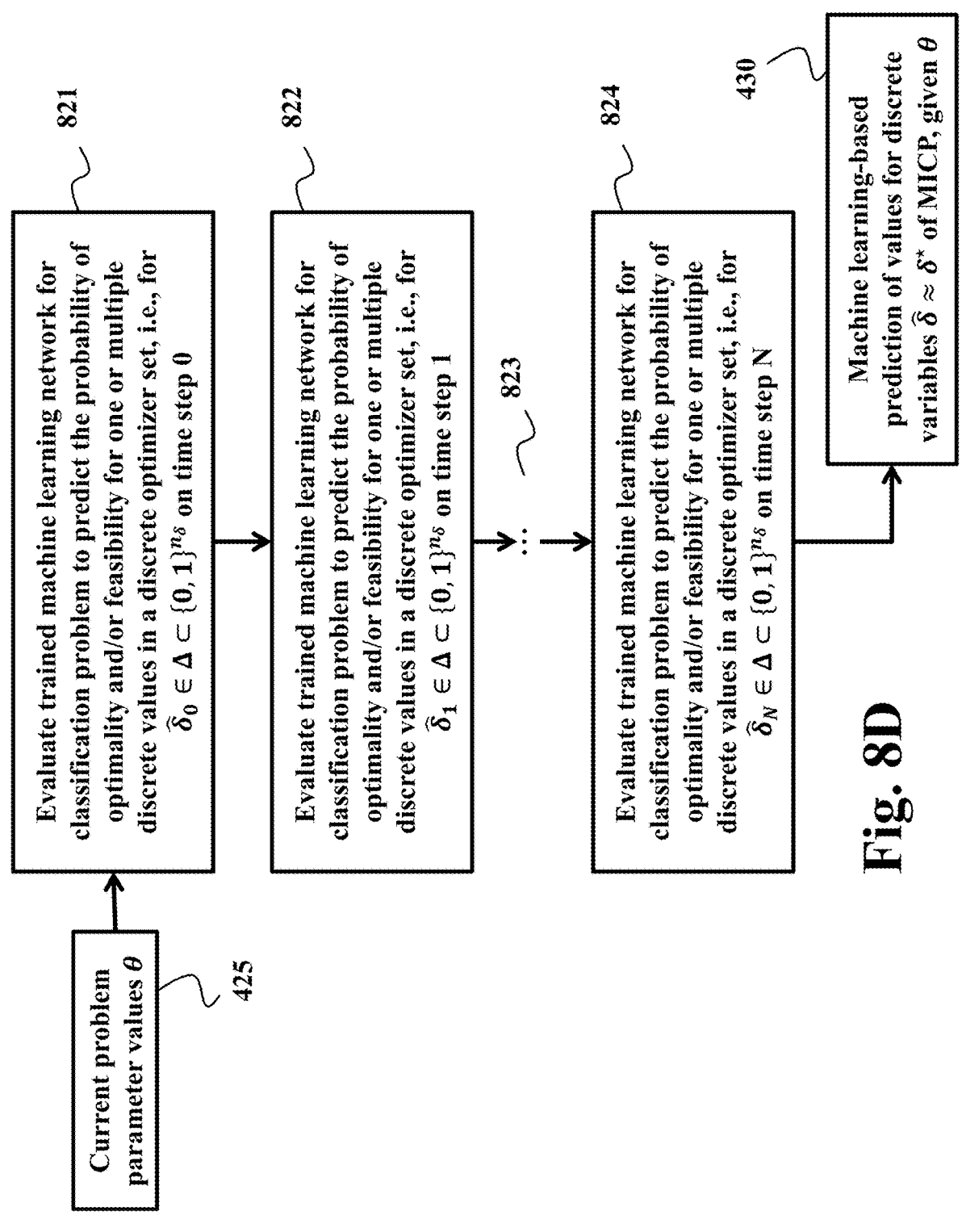

425 Current problem parameter values $\theta$

821 Evaluate trained machine learning network for classification problem to predict the probability of optimality and/or feasibility for one or multiple discrete values in a discrete optimizer set, i.e., for $\widehat{\delta}_0 \in \Delta \subset \{0, 1\}^{n_\delta}$ on time step 0

822 Evaluate trained machine learning network for classification problem to predict the probability of optimality and/or feasibility for one or multiple discrete values in a discrete optimizer set, i.e., for $\widehat{\delta}_1 \in \Delta \subset \{0, 1\}^{n_\delta}$ on time step 1

823

824 Evaluate trained machine learning network for classification problem to predict the probability of optimality and/or feasibility for one or multiple discrete values in a discrete optimizer set, i.e., for $\widehat{\delta}_N \in \Delta \subset \{0, 1\}^{n_\delta}$ on time step N

430 Machine learning-based prediction of values for discrete variables $\widehat{\delta} \approx \delta^\star$ of MICP, given $\theta$

Fig. 8D

RECURRENT PREDICTION AND ITERATIVE CORRECTION METHOD FOR FAST SOLUTION OF MIXED-INTEGER OPTIMAL CONTROL

TECHNICAL FIELD

The present disclosure relates generally to mixed-integer convex optimization-based control, and more particularly to a recurrent prediction and iterative correction method and apparatus for model predictive control of systems that are described by dynamics with continuous and discrete elements of operations.

BACKGROUND

Optimization based decision making, planning and control techniques, such as model predictive control (MPC), allow a model-based design framework in which the system dynamics, the system requirements and constraints can directly be taken into account. This framework has been extended to hybrid systems, including both continuous and discrete decision variables, which provides a powerful technique to model a large range of problems, e.g., including dynamical systems with mode switchings or systems with quantized actuation, problems with logic rules, temporal logic specifications or obstacle avoidance constraints. However, the resulting optimization problems are highly non-convex, and therefore difficult to solve in practice, because they contain variables which only take integer values. When using a linear or linear-quadratic objective in combination with linear system dynamics and linear inequality constraints, the resulting optimal control problem (OCP) can be formulated as a mixed-integer linear program (MILP) or mixed-integer quadratic program (MIQP). More general convex inequality constraints can be included such as quadratic inequality constraints, resulting in a mixed-integer quadratically constrained quadratic program (MIQCQP), or second-order cone constraints, resulting in a mixed-integer second-order cone program (MISOCP).

Decision making, planning or control for hybrid systems aims to solve such a mixed-integer program (MIP) at every sampling time instant. This is a difficult task, given that mixed-integer programming is NP-hard in general, and several methods for solving such a sequence of MIPs have been explored in the literature. These approaches can be divided in heuristic techniques, which seek to efficiently find sub-optimal solutions to the problem, and optimization algorithms which attempt to solve the MIPs to optimality. Most mixed-integer optimization algorithms are based on a variant of the branch-and-bound (B&B) technique in order to solve the MIPs to optimality. Variants of the branch-and-bound strategy have been combined with various methods for solving the relaxed convex subproblems, e.g., with dual active-set solvers, interior point algorithms, dual projected gradient methods, nonnegative least squares solvers, and the alternating direction method of multipliers (ADMM). However, the combinatorial complexity of MIPs generally leads to an exponential increase of computation time for B&B methods to solve MIPs with an increasing number of discrete decision variables, limiting the applicability of MIP-based optimal control design in practice.

Examples of heuristic techniques can be based on rounding and pumping schemes, using approximate optimization algorithms, approximate dynamic programming, or using data-based machine learning techniques, e.g., supervised learning. Using supervised learning to replicate optimal and feasible MIP solutions from B&B methods procured offline and inferring these solutions online at high speed has resulted in dramatic improvement of solution times for mixed-integer optimal control problems (MIOCPs). Alternatively, reinforcement learning techniques have been used to learn tree-search policies to accelerate B&B methods, but these approaches have a limited applicability to real-time embedded systems in practice, because they require at least one forward pass of a predictor, e.g., a neural network, at each node of the B&B tree and, more importantly, these approaches may still require enumerating the full B&B tree in the worst case.

Existing supervised learning techniques may directly approximate the mapping from the problem parameters, i.e., the current state of the controlled system and of the system's environment, to the discrete variable solution of an MIOCP. Such an approach is based on the realization that a mixed-integer convex programming (MICP) problem can be solved very efficiently as a convex program (CP) after fixing all discrete variables to a fixed set of values that is provided by the learned predictor, i.e., after fixing all binary variables to either 0 or 1 and fixing all integer variables to an integer value. Examples of such supervised learning techniques include the use of kernel and non-parametric classification methods, deep neural networks for regression, and multiclass classification. Some existing approaches are based on a supervised learner that only predicts the discrete variables associated with one or multiple of the first time steps within the control horizon of the MIOCP; however, this is likely to incur significant suboptimality in a receding horizon implementation. Alternatively, the policy induced by an exact solver for the MIOCP could be imitated directly using deep neural networks, or a value function could be learned by leveraging data obtained via offline simulations.

Existing machine learning-based approaches to compute fast MIP solutions for MIOCPs suffer from two major drawbacks. First, a learning-based prediction of the MIP solution often lacks any guarantees for finding an optimal or even a feasible but suboptimal solution, i.e., the predicted solution guess may have a high probability of being infeasible with respect to one or multiple mixed-integer inequality constraints. Second, such supervised learning techniques are effective for small-size MIP problems, but they generally do not scale well to MIOCPs with more than 100 decision variables. In particular, existing machine learning approaches for MIPs require extensive data collection or sampling of the parameter space for high-dimensional MIOCPs.

Therefore, there is a need for a high-accuracy prediction and correction method for efficient computations of a feasible but possibly suboptimal mixed-integer solution to high-dimensional MIOCP problems, which is the aim of the system and method described in the present invention.

SUMMARY

Mixed-integer programming (MIP) problems arise frequently in optimal control of hybrid systems, including both continuous and discrete elements of operation. Current state-of-the-art MIP solvers are often insufficiently fast for real-time applications of mixed-integer optimal control, limiting the applicability of MIP-based controller design in practice. Although supervised learning techniques have been proposed to speed up solution of MIPs, they generally suffer from two major drawbacks. First, a learning-based prediction of the MIP solution can have a high probability of being infeasible with respect to one or multiple mixed-integer inequality constraints. Second, such supervised learning techniques do not scale well to optimal control problems with more than 100 decision variables. This invention describes a recurrent architecture for scalable prediction of MIP solutions, exploiting the temporal structure in mixed-integer optimal control problems (MIOCPs), in combination with an iterative presolve-based correction method to increase the likelihood of feasibility for each solution guess.

Embodiments of the invention are based on the realization that a mixed-integer convex programming (MICP) problem can be transformed into a convex programming (CP) problem after fixing all discrete variables to a fixed set of values that is provided by a machine learning-based predictor, i.e., after fixing all binary variables to either 0 or 1 and fixing all integer variables to an integer value. After transforming the MICP, the resulting CP problem can be solved efficiently. Embodiments of the invention are based on a predictor that predicts the optimal values for the discrete variables $$\delta_i^*$$

at each of the time steps i=0, 1, . . . , N in the control horizon of the MIOCP, given a set of values for the problem parameters $\theta$. Examples of the problem parameters $\theta$ may include, for example, the current state of the controlled system, the goal or target state, position and/or orientation of obstacles, actuation limits, weight values in the objective function and/or bound values in the mixed-integer inequality constraints of the MIOCP.

Some embodiments are based on a recognition that the machine learning-based predictor, e.g., a parametric function such as a neural network, can be trained to predict values for a set of discrete variables in the MICP for performing the task defined by the parameters. However, these predicted values may result in the infeasible solution and/or infeasible motion trajectory of the device performing the task due to constraints imposed on the motion of the device. For example, it is recognized that while the constraints needed to be enforced as hard constraints, replacing the non-convex optimization subject to constraints with such a trained learned function is problematic because of the nature of machine learning. Specifically, machine learning is closely related to computational statistics, which is probabilistic in nature. As a result, trained parametric functions, such as neural networks are not equipped to handle hard constraints but rather designed to satisfy the constraints with some probabilities. This notion is analogous or a direct replication of the notion of soft constraints, when the violation of the constraints is penalized but not prohibited.

Hence, it is impossible or at least impractical to train a neural network that predicts discrete values of a solution of the non-convex optimization subject to hard constraints. It is possible to find such a solution with a very high likelihood but under the condition of enough offline training data closely approximating the online environment, which is impractical.

Because motion planning and control require satisfaction of the constraints, some embodiments are based on the realization that it is possible to use a learned function to find initial values of the discrete variables resulting in the transformation of the non-convex problem into the convex problem. However, such an initial prediction needs to be further processed to ensure that the final motion trajectory is feasible.

Some embodiments are based on understanding that the predicted discrete values can be checked for the feasible solution. However, such checking requires the actual solving of one or multiple convex problems which is undesirable. Hence, it is an object of some embodiments to check the feasibility of the predicted variables without finding the corresponding motion trajectory. Additionally or alternatively, it is another object of some embodiments to update the predicted discrete values to transform the non-convex into convex optimization resulting in a feasible solution.

Some embodiments are based on a recognition that the predicted discrete values can be checked against the constraints of the motion of the device that results in the constraints on the discrete variables. For example, if a constraint states that a sum of two binary variables is not larger than one, if the value of one of these variables is one, then the value of the other variable must be zero to satisfy the constraint. Notably, these checks of the constraints can be done without solving the corresponding convex problem, but only under the condition that the value of one of these variables in this example is known. These checks of the constraints, without solving the corresponding convex optimization problem, are typically referred to as presolve operations.

To that end, some embodiments fix the values of the discrete variables in the MICP problem to their predicted values and update the other values to satisfy the constraints with the given values of the fixed variables. For example, when the values of the discrete variables are predicted with confidence, the confidence level can be used to fix some variables and update the remaining variables. In such a manner, the feasibility of the solution of the MICP problem is increased without the need of solving the corresponding convex problem.

Accordingly, one embodiment discloses a controller for controlling a motion of a device to perform a task changing a state of the device subject to constraints, the controller comprising: a processor; and a memory having instructions stored thereon that, when executed by the processor, cause the controller to: collect parameters of the task, including the state of the device; input the parameters of the task to evaluate a parametric function trained to output predicted values for a set of discrete variables in a mixed-integer convex programming (MICP) problem for performing the task defined by the parameters; fix a first subset of discrete variables in the MICP to the predicted values outputted by the trained parametric function; perform a presolve-based correction configured to update at least some of the predicted values of a remaining subset of discrete variables in the MICP to values that are uniquely defined by the fixed values for the first subset of discrete variables and the constraints; transform the MICP into a convex programming (CP) problem, based on the fixed values of the first subset of discrete variables and the updated values of the remaining subset of discrete variables; solve the CP problem subject to the constraints to produce a feasible motion trajectory for performing the task defined by the parameters; and command the device to change the state according to the motion trajectory.

For example, the predicted set of discrete values $$\hat{\delta}_i \approx \delta_i^*$$

5
6 can be used by an iterative presolve-based correction method in order to compute an updated set of values $$\hat{\delta}_{PS_i} \approx \delta_i^*$$

with an increased likelihood of being feasible and/or optimal. A set of values for the discrete variables $\delta_i = \hat{\delta}_i$ is considered to be feasible, when the resulting convex optimization problem (CP) has a feasible optimal solution. Finally, the updated set of discrete values $$\hat{\delta}_{PS_i} \approx \delta_i^*$$

are used to fix each of the discrete optimization variables, and the resulting CP can be solved efficiently in order to compute a feasible optimal control solution, including a trajectory of values for the state and control input variables at each time step of the control horizon, which may be (close to) the optimal control solution for the original MIOCP.

In some embodiments of the invention, the iterative presolve-based correction method may return either one of the following results the iterative correction method detects that the predicted set of discrete values $\hat{\delta}_i$ are feasible, such that the values $$\hat{\delta}_{PS_i} = \hat{\delta}_i \approx \delta_i^*$$

are returned; the iterative correction method computes an updated set of discrete values $\hat{\delta}_{PS_i} \neq \hat{\delta}_i$ that are feasible, such that the values $$\hat{\delta}_{PS_i} \approx \delta_i^*$$

are returned; and the iterative correction method may fail to compute an updated set of discrete values that are feasible, within a predetermined time limit. Embodiments of the invention are based on the realization that the iterative presolve-based correction method may increase the likelihood of feasibility and/or optimality, e.g., when the iterative correction method removes or prunes a discrete variable for which the learning-based predictor provided an incorrect predicted value that would have resulted in an infeasible control solution.

In some embodiments of the invention, each iteration of the iterative correction method performs a single presolve step that aims to reduce the number of discrete optimization variables in the MIOCP, by fixing each of the removed or pruned variables to a value that is optimal and/or uniquely feasible. The single presolve step preserves feasibility and optimality, i.e., any feasible or optimal solution of the reduced MICP problem can be mapped to a feasible or optimal solution of the original MICP problem with identical objective values, and the reduced MICP problem is infeasible or unbounded if and only if the original MICP problem is infeasible or unbounded. Subsequently, if the single presolve step does not detect infeasibility and not all of the discrete variables have been fixed, then the iterative correction method selects one or multiple of the remaining free discrete variables to be fixed to the solution value that is provided by the learning-based predictor, and the single presolve step is performed in a next iteration of the iterative correction method. The iterative presolve-based correction method terminates, after one or multiple iterations, if all of the discrete variables have been fixed or if an infeasibility has been detected.

Some embodiments of the invention are based on the realization that an alternative control solution vector can be used to change the state of the device, if an infeasibility is detected by the iterative presolve-based correction method.

In some embodiments of the invention, a single presolve step can reuse one or multiple computation results from a previous single presolve step, in order to improve the computational efficiency of the iterative presolve-based correction method. In some embodiments of the invention, the number of iterations in the iterative correction method is limited by a predetermined upper bound, in order to improve the computational efficiency. If the predetermined upper bound on the number of iterations has been reached, and not all of the discrete variables have been fixed, then all of the remaining free discrete variables can be fixed to the solution value that is provided by the learning-based predictor.

In some embodiments of the invention, the single presolve step itself consists of an iterative procedure of one or multiple presolve operations to reduce the number of discrete and/or continuous optimization variables, tighten the bounds on optimization variables and/or tighten the bounds on one or multiple inequality constraints. The iterative procedure of the single presolve step then performs one or multiple iterations, until either the problem is detected to be infeasible, until insufficient progress has been made between two consecutive iterations or until a predetermined time limit has been reached in order to ensure computational efficiency. Examples of presolve operations include domain propagation, bound strengthening, dual fixing, implied variable substitution, coefficient strengthening, probing, detection and removal of redundant variables and/or constraints. In addition, each of the presolve operations can be executed on individual variables, individual constraints, multiple variables and/or multiple constraints.

Some embodiments of the invention are based on the realization that incorporating the temporal nature for the sequence of discrete values in the MIOCP solution into a machine learning architecture improves the performance of learning a mapping between the problem parameters $\theta$ and the discrete solution $$\delta_0^*, \delta_1^*, \ldots, \delta_N^*.$$

In some embodiments of the invention, a recurrent neural network (RNN) is used to learn a mapping between $$\theta \text{ and } \delta_i^*$$

at each of the time steps $i=0, 1, \ldots, N$ in the control horizon of the MIOCP. For example, the RNN architecture can be based on long short-term memory (LSTM) networks or gated recurrent units (GRUs). Embodiments of the invention are based on the realization that the number of target labels in supervised learning can be reduced considerably by exploiting the temporal structure of the discrete MIOCP solution, which may result in improved sampling efficiency and/or improved performance of the predictor. For example, the maximum number of target labels is $2^{(N+1)n_\delta}$, given $n_\delta$ discrete variables at each time step i=0, 1, ..., N, which can be reduced to a maximum of $2^{n_\delta}$ target labels by exploiting the temporal structure of the MIOCP.

In some embodiments of the invention, supervised learning is used for training a predictor that predicts the optimal values for the discrete variables $$\delta_i^\star$$

at each of the time steps i=0, 1, ..., N in the control horizon of the MIOCP, given a set of values for the problem parameters θ. Embodiments of the invention require a set of optimal control solutions for the MIOCPs corresponding to a set of values for the problem parameters, based on an offline data generation step. Different techniques for sampling the parameter space can be used, e.g., including uniform sampling and smart sampling techniques, such that the sampled data set of parameter values is representative of the optimal control problems that are of interest in practice. For each of these parameter values $\theta^j$, the corresponding MIOCP is solved and, if the problem is feasible, the optimal control solution is stored in the data set for supervised training of the predictor. In addition, for each parameter value $\theta^j$, a class label value $$y_i^j$$

is stored for each unique set of discrete values $$\delta_i^{j,\star}$$

∈ Δ, where Δ denotes the discrete optimizer set, i.e., the union of all optimal discrete values in the sampling-based data set.

In some embodiments of the invention, the supervised learning-based predictor is trained based on a regression problem, i.e., the predictor is trained to directly predict the optimal values of the discrete variables $$\delta_i^\star$$

at each of the time steps i=0, 1, ..., N in the control horizon of the MIOCP. In some embodiments of the invention, the predictor is an RNN, e.g., consisting of one or multiple LSTMs and/or one or multiple feedforward neural networks, with an input dimension that is equal to the number $n_\theta$ of problem parameters and the output dimension that is equal to the number $n_\delta$ of discrete variables at each time step. For example, the training loss for the regression problem can be a binary cross-entropy loss with logit activations applied to the output layer of the network. In some embodiments of the invention, the regressor is used to fix only one or multiple of the discrete variables for which the learning-based predictor has relatively high confidence, such that a reduced MIOCP needs to be solved to compute the remaining free discrete variables, in order to compute a feasible but possibly suboptimal mixed-integer solution to the high-dimensional MIOCP problem.

Some embodiments of the invention are based on the realization that a subset of the discrete variables can be fixed by a presolve-based correction method, starting from predicted values of a set of discrete variables in the MICP and, unless an infeasibility is detected by the iterative presolve-based correction, an approximation of the MICP with a reduced number of discrete optimization variables is solved subject to the constraints to produce a feasible motion trajectory with an updated set of fixed values for the subset of the discrete variables. In some embodiments of the invention, the approximation of the MICP with a reduced number of discrete optimization variables can be solved using a branch-and-bound (B&B) optimization method in combination with one or multiple tailored block-sparse presolve operations that exploit the block-structured sparsity of a MIOCP for performing the task defined by the problem parameter values.

In some embodiments of the invention, a first subset of discrete variables in the MICP are fixed to the predicted values outputted by the trained parametric function, a second subset of discrete variables in the MICP are fixed by a presolve-based correction to values that are uniquely defined by the fixed values for the first subset of discrete variables and the constraints, and a third subset of discrete variables in the MICP are selected to be free optimization variables, such that an approximation of the MICP with a reduced number of discrete optimization variables is solved subject to the constraints to produce a feasible motion trajectory, for example, using a B&B optimization method in combination with one or multiple tailored block-sparse presolve operations that exploit the block-structured sparsity of the MIOCP problem.

In some embodiments of the invention, the supervised learning-based predictor is trained based on a classification problem, i.e., the predictor is trained to select the best discrete values in the discrete optimizer set, i.e., $\hat{\delta}_i \in \Delta$. In some embodiments of the invention, the predictor is an RNN, e.g., consisting of one or multiple LSTMs and/or one or multiple feedforward neural networks, with an input dimension that is equal to the number $n_\theta$ of problem parameters and the output dimension that is equal to the number $|\Delta|$ of unique discrete values in the data set. For example, the training loss for the classification problem can be a cross-entropy loss. In some embodiments of the invention, the classifier is used to select one or multiple discrete solution candidates corresponding to the highest confidence for feasibility and optimality, and the iterative presolve-based correction method can be used to potentially correct one or multiple of these discrete solution candidates, in order to compute a feasible but possibly suboptimal mixed-integer solution to the high-dimensional MIOCP problem.

BRIEF DESCRIPTION OF THE DRAWINGS

FIG. 4C is a pseudo code of an offline data generation procedure, based on MICP solutions for a set of sampled problem parameter values, and a supervised learning procedure to train a learning-based predictor, according to some embodiments.

FIG. 4E is a pseudo code of an online variable fixing procedure, based on a prediction and an iterative presolve-based correction step, and a CP solution procedure to compute a feasible MICP solution, according to some embodiments.

FIG. 5C is a pseudo code of an iterative presolve-based correction procedure to compute a fixed set of values for the discrete variables of the MICP solution, according to some embodiments of the invention.

FIG. 6B illustrates an example of redundant inequality constraint detection and dual fixing of MICP optimization variables, which can be used in an iterative presolve-based correction procedure, according to some embodiments.

FIG. 6C illustrates an example of inequality constraint coefficient strengthening corresponding to MICP discrete optimization variables, which can be used in an iterative presolve-based correction procedure, according to some embodiments.

FIG. 7A is a pseudo code of block-sparse forward-backward operations to implement a domain propagation and bound strengthening procedure, which can be used in an iterative presolve-based correction, according to some embodiments.

FIG. 7B is a pseudo code of an efficient block-sparse computation of optimization-based bound tightening for MICP optimization variables, which can be used in an iterative presolve-based correction procedure, according to some embodiments.

FIG. 7C is a pseudo code of block-sparse redundant inequality constraint detection and dual fixings of MICP optimization variables, which can be used in an iterative presolve-based correction procedure, according to some embodiments.

FIG. 7D is a pseudo code of block-sparse inequality constraint coefficient strengthening corresponding to MICP discrete variables, which can be used in an iterative presolve-based correction procedure, according to some embodiments.

FIG. 7E is a pseudo code of a block-sparse binary variable probing procedure for MICP discrete variables, which can be used in an iterative presolve-based correction procedure, according to some embodiments.

FIG. 7F is a pseudo code of a single block-sparse presolve step, based on one or multiple presolve operations, which can be used in an iterative presolve-based correction procedure, according to some embodiments.

FIG. 8C illustrates a block diagram of a machine learning prediction method, based on classification to predict the probability for one or multiple discrete values in a discrete optimizer set to be the MICP solution, according to some embodiments.

FIG. 8D illustrates a block diagram of a machine learning prediction with time decomposition method, based on classification to predict the probability for one or multiple discrete values in a discrete optimizer set on one or multiple time steps of the MICP solution, according to some embodiments of the invention.

DETAILED DESCRIPTION

Some embodiments of the present disclosure provide a system and a method for controlling an operation of a system or a system using a predictive controller. An example of the predictive controller is a mixed-integer model predictive controller (MIMPC) determining control inputs based on a dynamical model of the controlled system having continuous and discrete elements of operations.

Figure 1A:
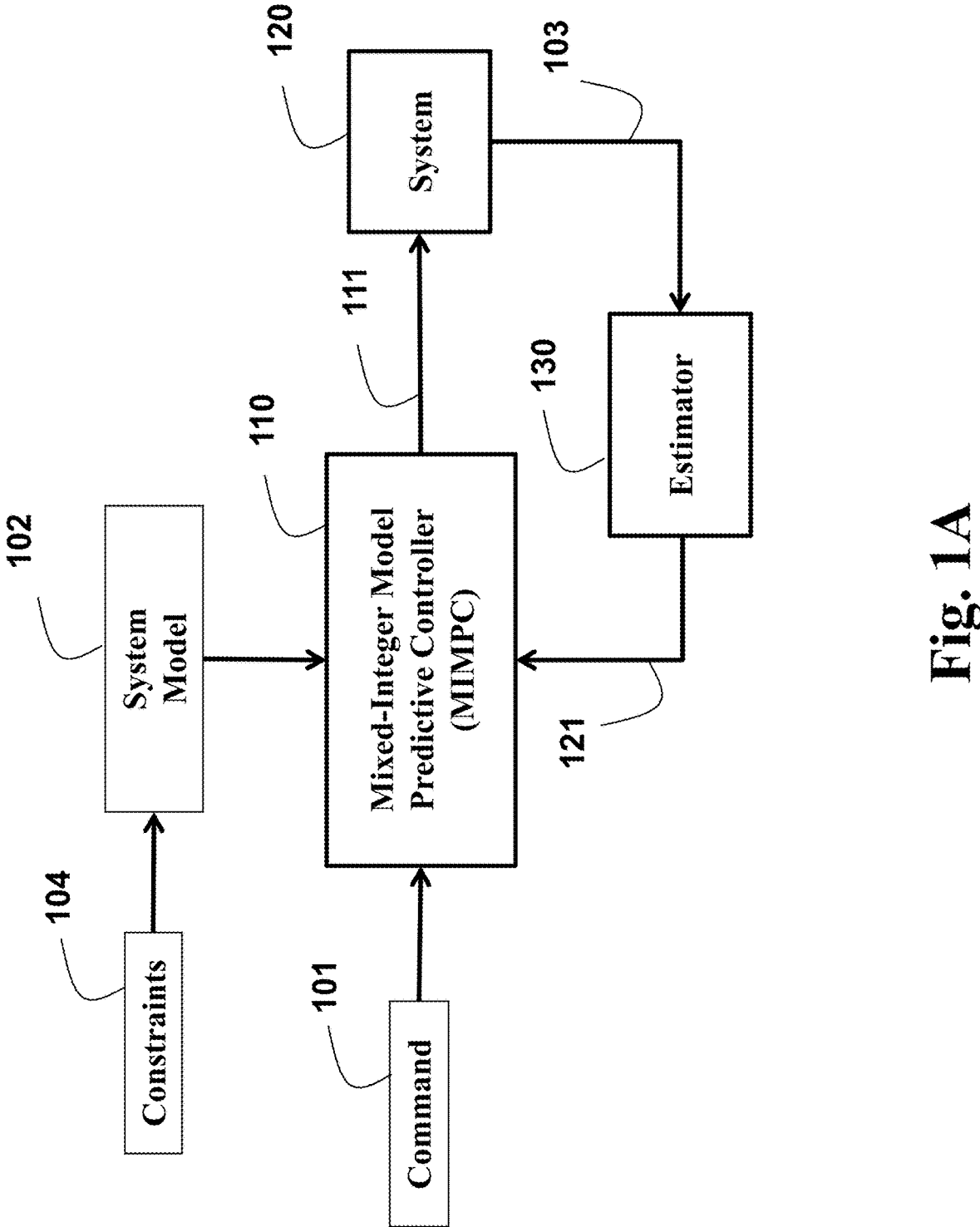
FIG. 1A illustrates a block diagram of a mixed-integer model predictive controller and feedback system, according to some embodiments.

FIG. 1A illustrates a block diagram of a predictive controller 110 and feedback system 120, according to some embodiments. FIG. 1A shows an example feedback system (or system) 120 connected to the predictive controller 110 (or controller) via a state estimator 130 according to some embodiments. In some implementations, the predictive controller 110 is an MIMPC controller programmed according to a dynamical model 102 (or system model) of the system 120. The system model 102 can be a set of equations representing changes of the state and output 103 of the system 120 over time as functions of current and previous inputs 111 and previous outputs 103. The system model 102 can include constraints 104 that represent physical and operational limitations of the system 120. During the operation, the controller 110 receives a command 101 indicating the desired behavior of the system 120. The command can be, for example, a motion command. In response to receiving the command 101, the controller 110 generates a control signal 111 that serves as an input for the system 120 including both continuous and discrete elements of operation. In response to the input, the system updates the output 103 of the system 120. Based on measurements of the output 103 of the system 120, the estimator 130 updates the estimated state 121 of the system 120. This estimated state 121 of the system 120 provides the state feedback to the predictive controller 110. Thus, the predictive controller initially accepts feedback signal 121 of the system 120, via the estimator 130, where the feedback signal 121 includes measurements of a state of the system 120.

The system 120, as referred herein, can be any machine or device controlled by certain manipulation input signals, e.g., control signal 111 (inputs). The control input signal can possibly include continuous elements such as voltages, pressures, forces, torques, steering angles, velocities, and temperatures, as well as discrete elements such as energy levels, quantized valve inputs, gear shifts, on/off actuation, lane selection, and obstacle avoidance decision variables. The system 120 returns some controlled output signals 103 (outputs), possibly including continuous elements such as currents, flows, velocities, positions, temperatures, heading and steering angles, as well as discrete elements such as energy levels, quantized valve states, gear status, on/off status, and lane position, etc. The output values are related in part to previous output values of the system, and in part to previous and current input values. The dependency on previous inputs and previous outputs is encoded in the state of the system. The operation of the system, e.g., a motion of components of the system, can include a sequence of output values generated by the system following the application of certain input values.

The system model 102 may include a set of mathematical equations that describe how the system outputs change over time as functions of current and previous inputs, and the previous outputs. The mathematical equations can include one or multiple smooth equations depending on continuous variables as well as one or multiple mixed-integer equations depending on both continuous and discrete variables. Each function in the mathematical equations can be either a linear or a piecewise linear function. The state of the system 120 is any set of information, in general time varying, for instance an appropriate subset of current and previous inputs and outputs, that, together with the model of the system and future inputs, can uniquely define the future motion of the system.

The system 120 can be subject to physical limitations and specification constraints 104 limiting the range where the outputs, the inputs, and also possibly the states of the system 120 are allowed to operate. The constraints can include one or multiple smooth equations depending on continuous variables as well as one or multiple mixed-integer equations depending on both continuous and discrete variables. The constraint functions can be either linear or piecewise linear functions, or they can include one or multiple convex inequality constraint functions such as, for example, convex quadratic inequality constraints, second-order cone constraints or convex cone constraints. Some embodiments of the invention are based on the realization that a mixed-integer convex programming (MICP) problem can be solved very efficiently as a convex program (CP), subject to the system model 102 and the constraints 104, after fixing all discrete variables to a fixed set of values that is provided by a predictor, i.e., after fixing all binary variables to either 0 or 1 and fixing all integer variables to an integer feasible value.

The predictive controller 110 can be implemented in hardware or as a software program executed in a processor, e.g., a microprocessor, which at fixed or variable control period sampling intervals receives the estimated state 121 of the system 120 and the desired motion command 101 and determines, using this information, the inputs, e.g., the control signal 111, for operating the system 120. The predictive controller 110 further solves an optimal control structured mixed-integer convex programming (MICP) problem using a recurrent machine learning-based prediction and iterative presolve-based correction method. Some embodiments of the invention are based on the realization that a prediction and correction method can be used to efficiently compute a feasible but possibly suboptimal solution of the MICP to produce a control signal 111, using a computation time that is considerably smaller than the time needed to solve the MICP exactly. Accordingly, the processor achieves fast processing speed with high accuracy. The predictive controller 110, further, controls the system 120 based on the control signal 111 to change the state of the system 120.

The estimator 130 can be implemented in hardware or as a software program executed in a processor, either the same or a different processor from the controller 110, which at fixed or variable control period sampling intervals receives the outputs of the system 103 and determines, using the new and the previous output measurements, the estimated state 121 of the system 120.

Figure 1B:
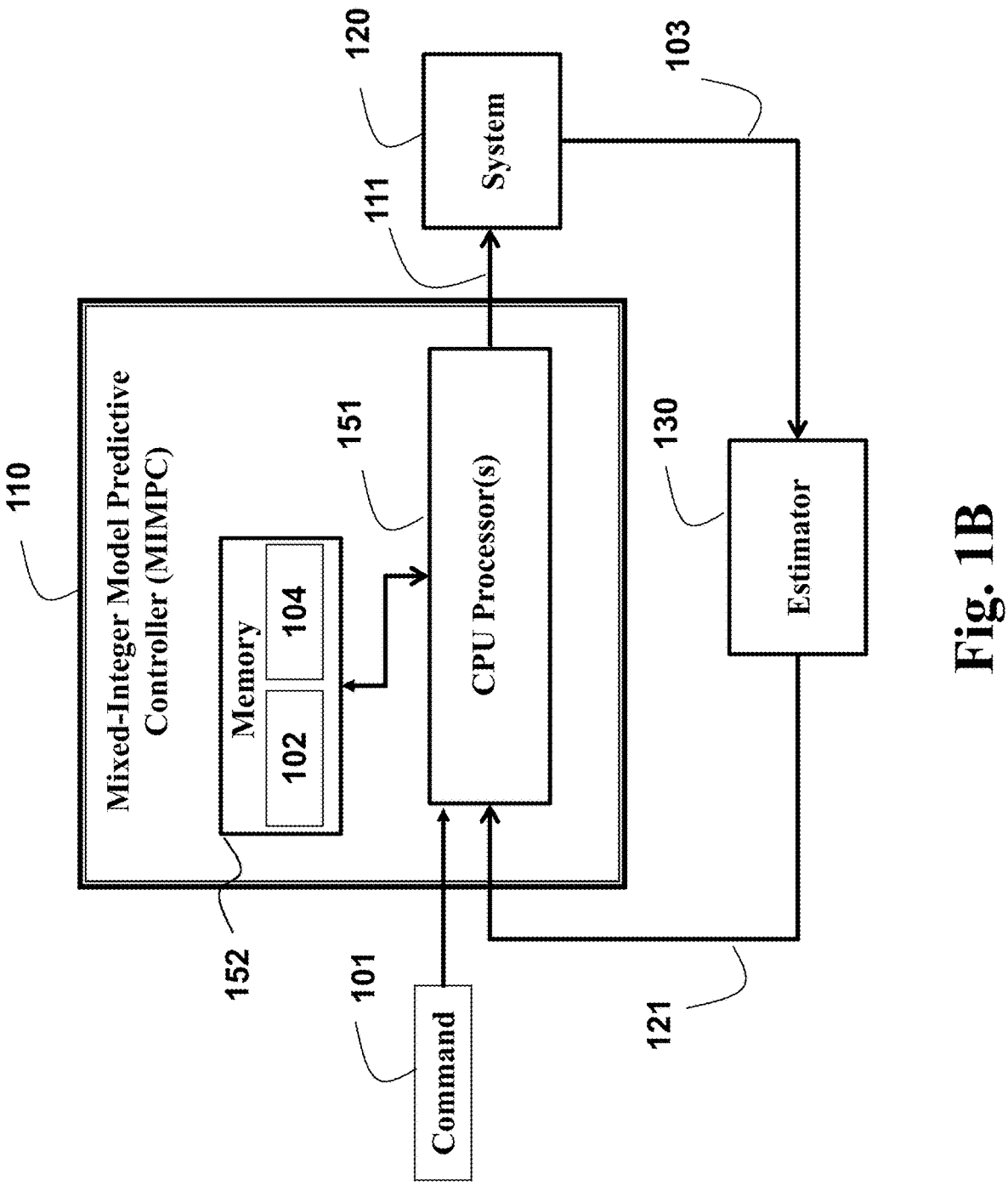
FIG. 1B illustrates a block diagram of the mixed-integer model predictive controller and the feedback system, according to some embodiments.

FIG. 1B illustrates a block diagram of the mixed-integer model predictive controller (MIMPC) 110 and the feedback system 120, according to some embodiments. The predictive controller 110 actuates the system 120 such that the estimated state 121 of the system 120 and output 103 follow the command 101. The controller 110 includes a computer, e.g., in the form of a single central processing unit (CPU) or multiple CPU processors 151 connected to memory 152 for storing the system model 102 and the constraints 104 on the operation of the system 120. The CPU processors 151 may be comprised of a single core processor, a multi-core processor, a computing cluster, or any number of other configurations. The memory 152 may include random access memory (RAM), read only memory (ROM), flash memory, or any other suitable memory systems.

Figure 1C:
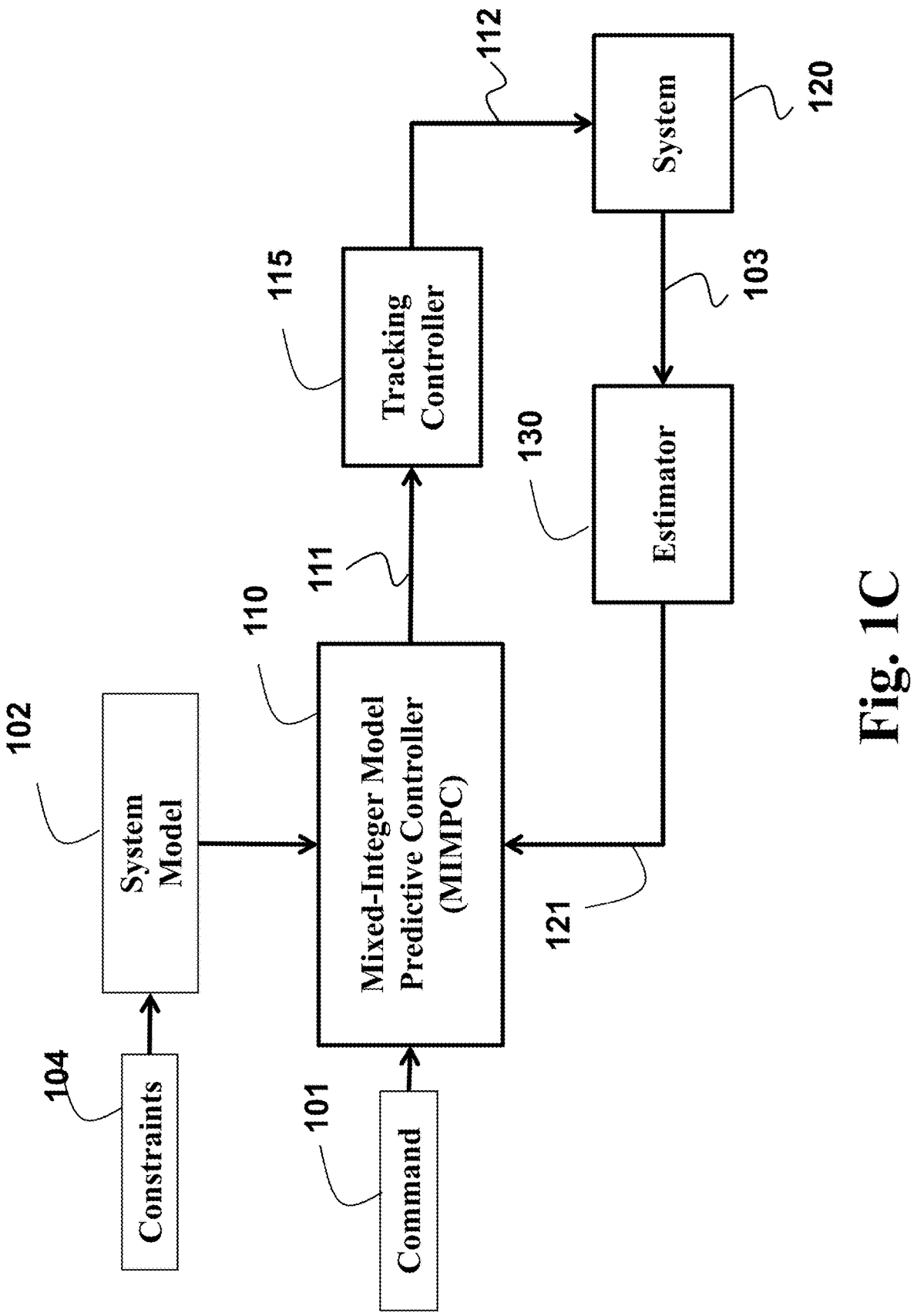
FIG. 1C illustrates a block diagram of a hierarchical integration between the mixed-integer model predictive controller and a tracking controller to control the feedback system, according to some embodiments.

FIG. 1C illustrates a block diagram of a hierarchical integration between a mixed-integer model predictive controller 110 to compute a high-level control signal 111 and a tracking controller 115 that aims to track the high-level control signal 111 and to compute a low-level control signal 112 to directly control the feedback system 120, according to some embodiments of the invention. For example, the predictive controller 110 can be a MIMPC controller to compute a reference motion trajectory based on a dynamical model of the controlled system having continuous and discrete elements of operations, and the tracking controller 115 aims to execute (part of) the reference motion trajectory by directly sending control inputs 112 to the actuators of the controlled system.

An example of a tracking controller 115 can be based on a proportional—integral—derivative (PID) controller to track the time-varying reference motion trajectory that is computed by the MIMPC controller 110. In some embodiments of the invention, the tracking controller 115 can be based on a model predictive controller (MPC) with only continuous decision variables, and therefore requiring a relatively small computational complexity to solve the optimal control problem. For example, the MPC tracking controller 115 can be based on a linear-quadratic objective function, linear dynamical model and linear equality and inequality constraints, which requires the solution of a convex linear programming (LP) or a convex quadratic programming (QP) problem that is computationally much easier to solve than the MICP that is solved by the MIMPC controller 110.

Some embodiments of the invention are based on the realization that a relatively long prediction horizon can be used for the mixed-integer model predictive controller 110 and a relatively short prediction horizon can be used for the tracking controller 115, such that a relatively fast sampling rate can be used for the tracking controller, e.g., with a sampling period of 10-100 milliseconds, while a relatively slow sampling rate can be used for the mixed-integer model predictive controller 110, e.g., with a sampling period of 0.2-2 seconds.

Some embodiments of the invention are based on the realization that a relatively high-level, low-accuracy dynamical model 102 and constraints 104 can be used in the MICP formulation of the mixed-integer model predictive controller 110, due to the computational complexity of solving MICPs, while a relatively low-level, high-accuracy dynamical model 102 and constraints 104 can be used in the design and formulation of the computationally cheap tracking controller 115.

Figure 2A:
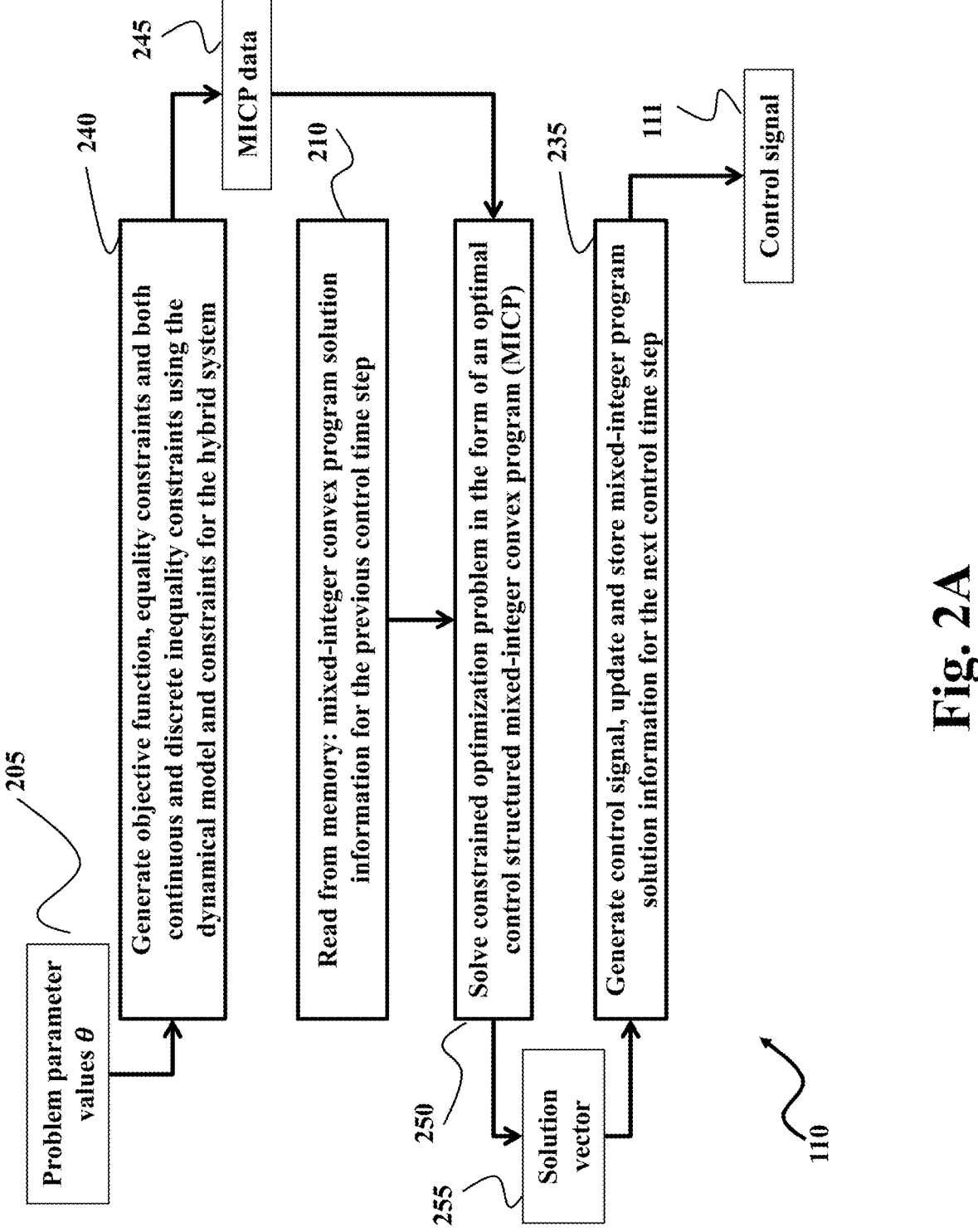
FIG. 2A illustrates a block diagram of a method for mixed-integer model predictive control (MIMPC) to implement the predictive controller that computes the control signal, given the current problem parameter values, and the control command, according to some embodiments.

FIG. 2A illustrates a block diagram of a system and a method for mixed-integer model predictive control (MIMPC) to implement the predictive controller 110 that computes the control signal 111, given the current problem parameter values 205 and the control command 101, according to some embodiments. In some embodiments of the invention, the problem parameters θ include, for example, the current state of the controlled system 121, the goal or target state, position, dimensions and/or orientation of obstacles, actuation limits, weight values in the objective function and/or bound values in the mixed-integer inequality constraints of the mixed-integer optimal control problem (MIOCP). Specifically, MIMPC computes a control solution, e.g., a solution vector 255 that can include a sequence of future optimal discrete and continuous control inputs over a prediction time horizon of the system 120, by solving a constrained mixed-integer convex programming (MICP) problem 250 at each control time step. The MICP data 245 of the objective function, equality constraints, and discrete, continuous, and mixed-integer inequality constraints in this optimization problem 250 depends on the dynamical model, the system constraints 240, the current problem parameter values 205, objectives of control and the control command 101.

In some embodiments of the invention, the solution of this inequality constrained MICP problem 250 uses one or multiple state and control values over a prediction time horizon, and potentially other MICP solution information from the previous control time step 210, which can be read from the memory. This concept is called warm- or hot-starting of the optimization algorithm and it can reduce the required computational effort of the MIMPC controller in some embodiments of the invention. In a similar fashion, the corresponding solution vector 255 can be used to update and store in memory a sequence of one or multiple optimal state and control values over a prediction time horizon, and potentially other MICP solution information for the next control time step 235.

Figure 2B:
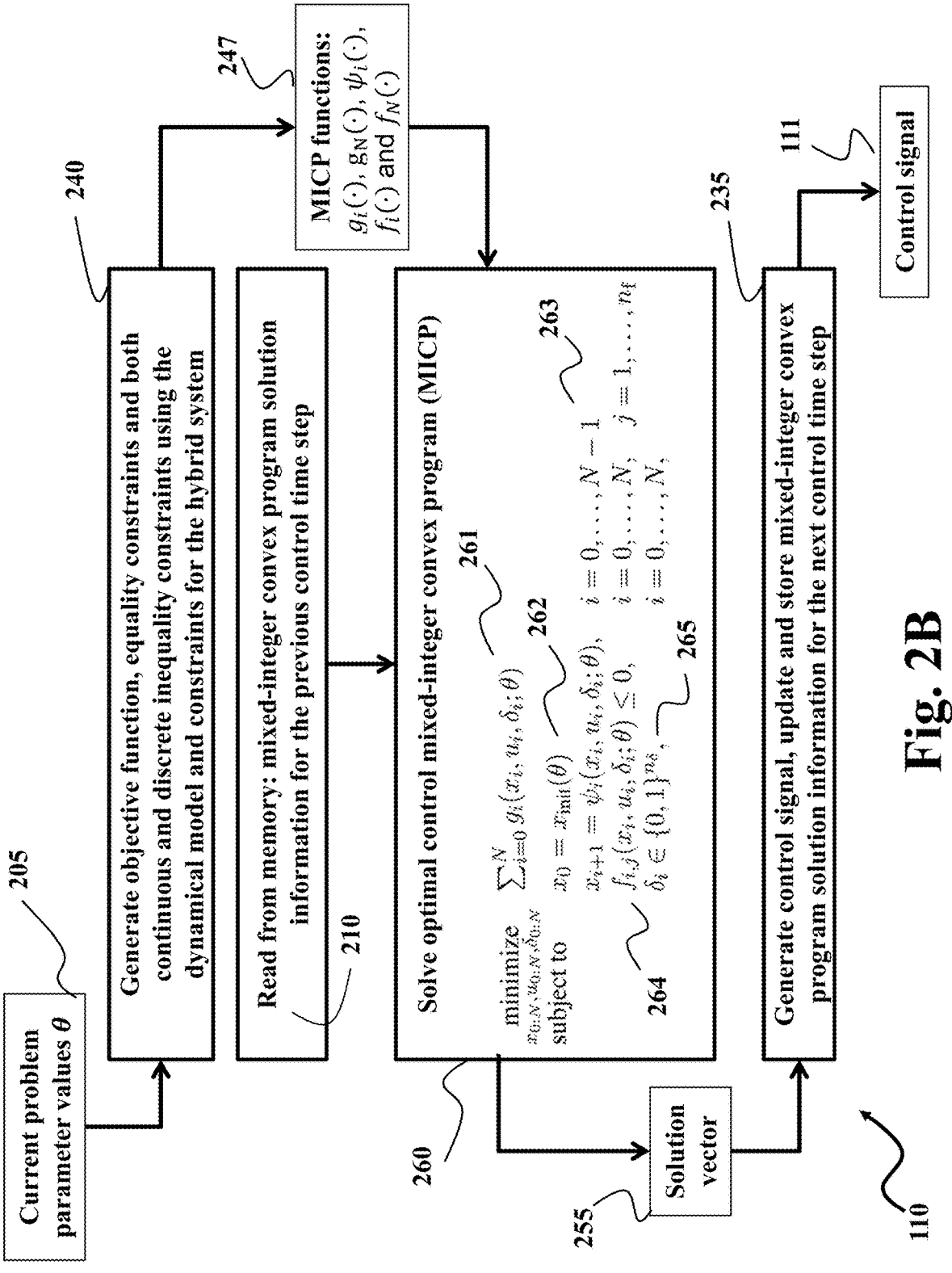
FIG. 2B illustrates a block diagram of an MIMPC method that solves an optimal control structured mixed-integer convex program (MICP), given the current problem parameter values, according to some embodiments.

FIG. 2B illustrates a block diagram of an MIMPC method that aims to find a feasible but possibly suboptimal solution vector 255 for the optimal control structured MICP 260 in order to compute the control signal 111 at each control time step, given the current problem parameter values 205 and the command 101. The optimal control structured MICP 260 includes the minimization or maximization of a sum of stage cost functions 261 $g_0(x_0, u_0, \delta_0; \theta)$, $g_1(x_1, u_1, \delta_1; \theta)$, . . . , $g_{N-1}(x_{N-1}, u_{N-1}, \delta_{N-1}; \theta)$ and of a terminal cost function $g_N(x_N, u_N, \delta_N; \theta)$ over a prediction time horizon, which depend on the state variables $x_{0:N}=x_0, x_1, \ldots, x_N$, the continuous control input variables $u_{0:N}=u_0, u_1, \ldots, u_N$, the discrete control variables $\delta_{0:N}=\delta_0, \delta_1, \ldots, \delta_N$ and the problem parameter variables $\theta$. In some embodiments of the invention, the state variables $x_{0:N}$ are continuous optimization variables, the control input variables $u_{0:N}$ are continuous optimization variables, and the discrete variables $\delta_{0:N}$ include binary and/or integer optimization variables.

In some embodiments of the invention, the constraints of the optimal control structured MICP 260 includes an equality constraint on the initial state variable $x_0=x_{init}(\theta)$ 262, where the current state value of the system can be computed by a state estimator 130 and can depend on one or multiple problem parameters. In other embodiments of the invention, the initial state variable is free and the equality constraint 262 can be omitted. In some embodiments of the invention, the constraints of the optimal control structured MICP 260 includes a sequence of equality constraints to define the state variables at a next time step based on the state and control variables at a previous time step in the prediction time horizon, for example, a sequence of equality constraints $x_1=\psi_0(x_0, u_0, \delta_0; \theta)$, $x_2=\psi_1(x_1, u_1, \delta_1; \theta)$, . . . , $x_N=\psi_{N-1}(x_{N-1}, u_{N-1}, \delta_{N-1}; \theta)$ 263, based on a dynamical model 102 of the controlled system. In some embodiments of the invention, the constraints of the optimal control structured MICP 260 includes a sequence of inequality constraints on one or multiple combinations of state and/or control variables at each time step in the prediction time horizon, for example, a sequence of inequality constraints $f_{0,1}(x_0, u_0, \delta_0; \theta) \leq 0$, . . . , $f_{0,n_f}(x_0, u_0, \delta_0; \theta) \leq 0$, $f_{1,1}(x_1, u_1, \delta_1; \theta) \leq 0$, . . . , $f_{N,n_f}(x_N, u_N, \delta_N; \theta) \leq 0$ over a prediction time horizon N, and where $n_f$ is the number of inequality constraints at each time step.

In some embodiments of the invention, one or multiple of the discrete variables are binary optimization variables, i.e., $\delta_{i,j} \in \{0,1\}$ 265 for i=0, 1, . . . , N and j in an index set of binary optimization variables. In other embodiments of the invention, one or multiple of the discrete variables are integer optimization variables, i.e., $\delta_{i,j} \in \mathbb{Z}$ for i=0, 1, . . . , N and j in an index set of integer optimization variables. Some embodiments of the invention are based on the realization that the optimal control structured MICP 260 can be solved relatively efficiently if the MICP functions 247 are convex functions, i.e., the stage cost functions $g_i(\cdot)$ 261 are convex, the dynamical model functions $\psi_i(\cdot)$ 263 are linear or piecewise linear, and the inequality constraint functions $f_{i,j}(\cdot)$ 264 are convex.

Some embodiments of the invention are based on the realization that the optimal control structured MICP 260 can be formulated as a mixed-integer convex linear program (MILP) if the stage cost functions $g_i(\cdot)$ 261 are linear, the dynamical model functions of $\psi_i(\cdot)$ 263 are linear or piecewise linear, and the inequality constraint functions $f_{i,j}(\cdot)$ 264 are linear or piecewise linear. Some embodiments of the invention are based on the realization that the optimal control structured MICP 260 can be formulated as a mixed-integer convex quadratic program (MIQP) if the stage cost functions $g_i(\cdot)$ 261 are linear-quadratic, the dynamical model functions of $\psi_i(\cdot)$ 263 are linear or piecewise linear, and the inequality constraint functions $f_{i,j}(\cdot)$ 264 are linear or piecewise linear.

In some embodiments of the invention, one or multiple of the inequality constraint functions $f_{i,j}(\cdot)$ 264 are convex quadratic inequality constraints, such that the optimal control structured MICP 260 can be formulated as a mixed-integer quadratically constrained quadratic program (MIQCQP). In some embodiments of the invention, one or multiple of the inequality constraint functions $f_{i,j}(\cdot)$ 264 are convex second-order cone constraints, such that the optimal control structured MICP 260 can be formulated as a mixed-integer second-order cone program (MISOCP). Some embodiments of the invention are based on the realization that MICP problems, including MILPs, MIQPs, MIQCQPs or MISOCPs, can be solved relatively efficiently, for example, using branch-and-bound methods, branch-and-cut methods, branch-and-price methods or any other variant of a tree search-based optimization algorithm. However, some embodiments of the invention are based on the realization that the combinatorial complexity of MICPs generally leads to an exponential increase of computation time for optimization algorithms to solve MICPs with an increasing number of discrete decision variables, limiting the applicability of MICP-based optimal control design in practice.

Figure 2C:
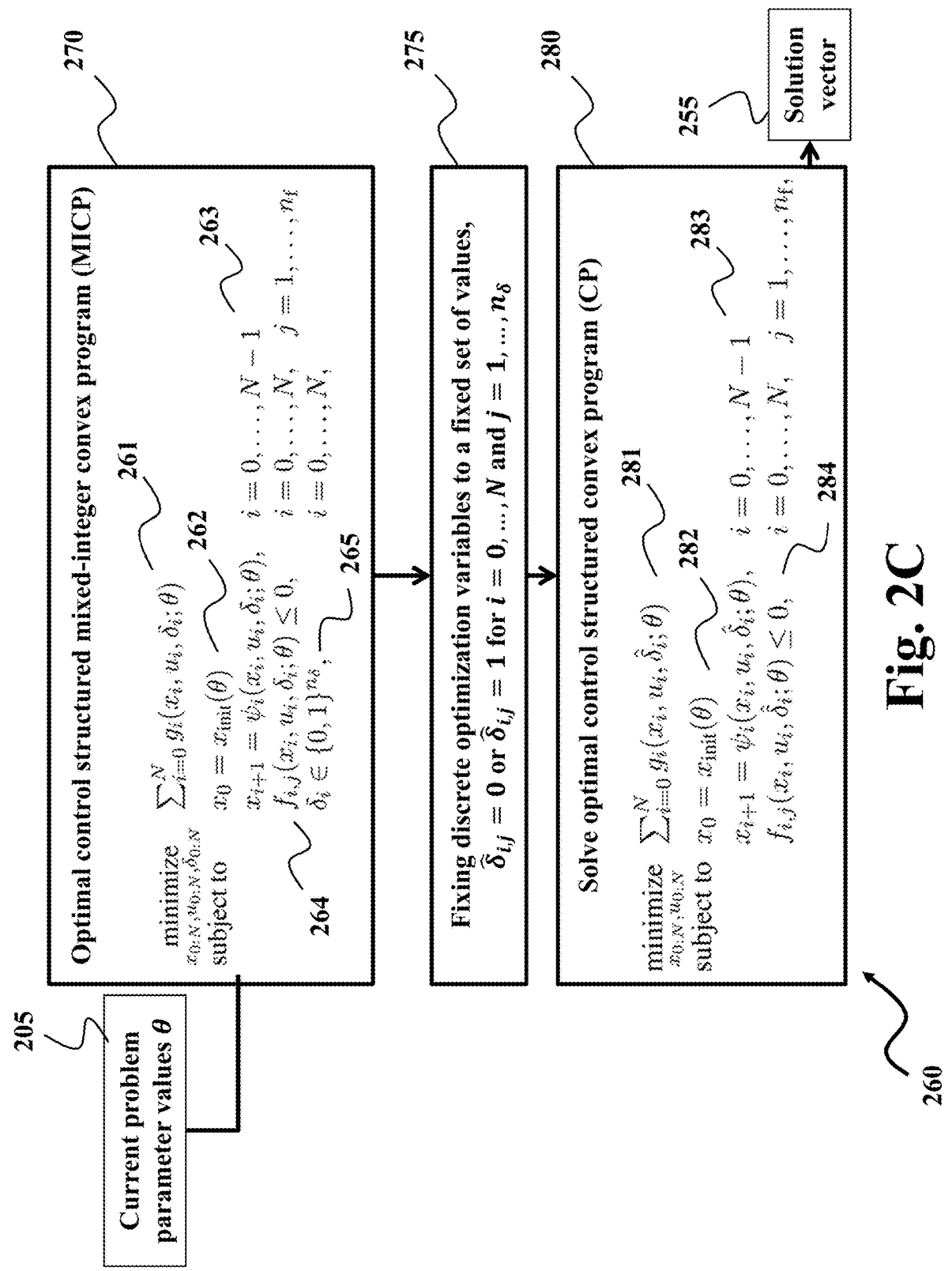
FIG. 2C illustrates that an optimal control structured MICP problem can be transformed and solved very efficiently as an optimal control structured convex programming (CP) problem after fixing all discrete variables to a fixed set of values, according to some embodiments.

FIG. 2C illustrates that an optimal control structured MICP problem 270 can be transformed and solved 260 as an optimal control structured convex program (CP) 280 after fixing all discrete variables to a fixed set of values 275, i.e., after fixing all binary variables to either 0 or 1 and/or fixing all integer variables to an integer feasible value. Embodiments of the invention are based on the realization that the optimal state and control solution $$x_{0:N}^{\star}, u_{0:N}^{\star}$$

of the optimal control structured CP 280 is equal to the optimal state and control solution $$x_{0:N}^{\star}, u_{0:N}^{\star}$$

of the optimal control structured MICP 270 to compute the solution vector 255, after fixing the discrete variables to the optimal discrete solution $$\delta_{0:N}^{\star}$$

that can be obtained by solving the original MICP 270. Therefore, the MICP problem 270 can be solved 260 by solving a CP 280 instead, which is computationally much cheaper to solve, by accurately predicting the optimal discrete solution $$\delta_{0:N}^{\star}$$

when fixing the discrete optimization variables 275. In some embodiments of the invention, the fixed set of values for the discrete variables 275 are computed by a recurrent machine learning-based prediction and iterative presolve-based correction method to compute a feasible but possibly suboptimal solution vector 255.

The optimal control structured CP 280 is based on a minimization or maximization of a sum of stage cost functions 281, and the constraints can include an equality constraint on the initial state variable 282, state dynamic equality constraints 283 and one or multiple inequality constraints 284, based on the MICP functions 247 $g_0, g_1, \ldots, g_N, \psi_0, \psi_1, \ldots, \psi_{N-1}$, and $f_{0,1}, f_{0,2}, f_{0,n_f}, f_{1,1}, \ldots, f_{N,n_f}$, where each of the discrete optimization variables $\delta_{i,j}$ is fixed to a predicted value $\delta_{i,j} = \hat{\delta}_{i,j}$ 275 for i=0, ..., N and j=1, ..., $n_\delta$. Note that the discrete optimization variables $\delta_{0:N}$ and the discrete feasibility constraints 265 are removed from the optimal control structured CP 280, after fixing the discrete variables 275. In some embodiments of the invention, the optimal control structured CP can be solved efficiently using a convex optimization algorithm including, for example, active-set methods, interior point methods, gradient-based methods, operator splitting methods or the alternating direction method of multipliers (ADMM).

Some embodiments of the invention are based on the realization that the CP 280 is a convex linear program (LP) if the MICP 270 can be formulated as an MILP Some embodiments of the invention are based on the realization that the CP 280 is a convex quadratic program (QP) if the MICP 270 can be formulated as an MIQP. Some embodiments of the invention are based on the realization that the CP 280 is a convex quadratically constrained quadratic program (QCQP) if the MICP 270 can be formulated as an MIQCQP. Some embodiments of the invention are based on the realization that the CP 280 is a convex second-order cone program (SOCP) if the MICP 270 can be formulated as an MISOCP.

Figure 3A:
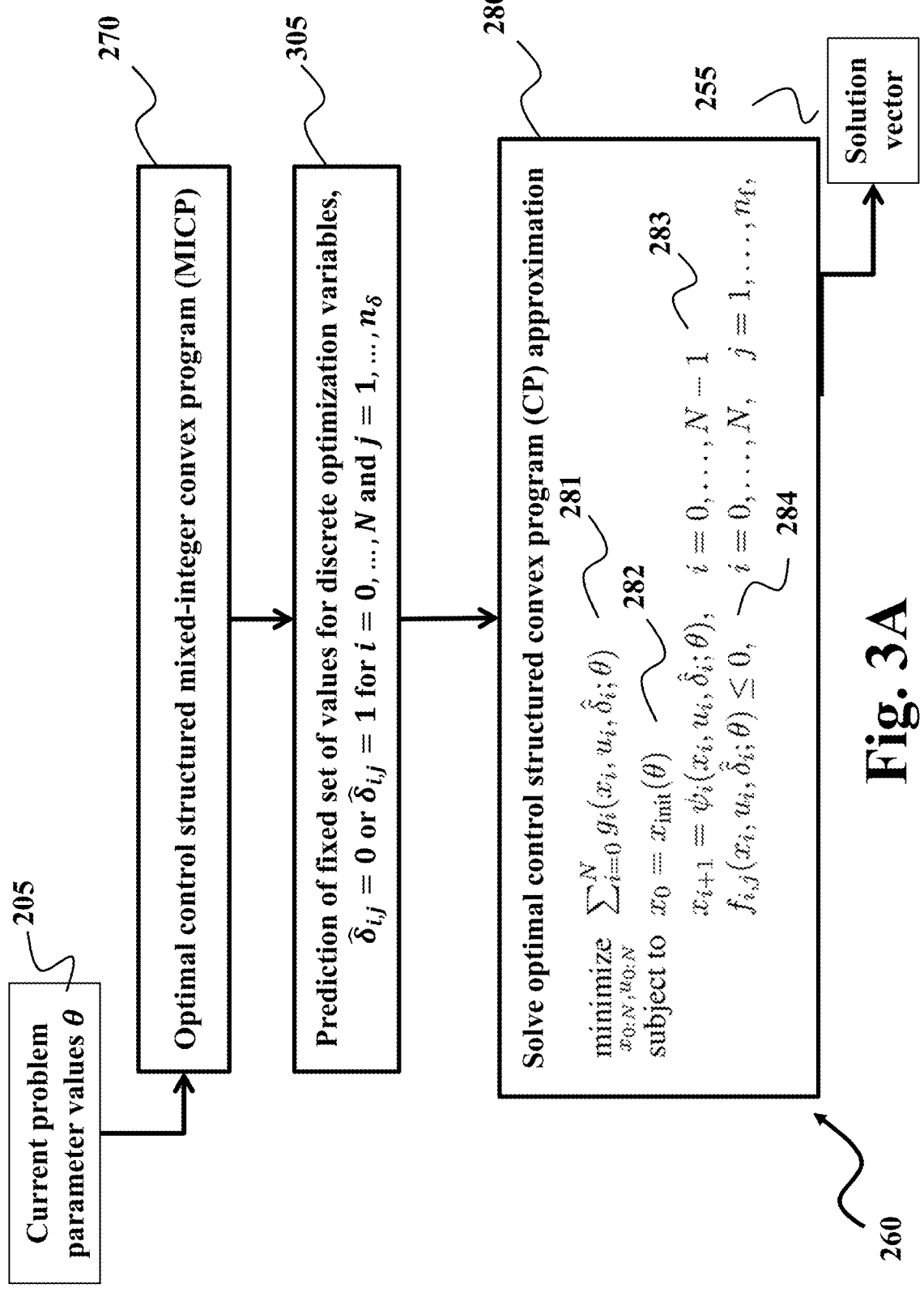
FIG. 3A illustrates a block diagram of an MICP solution method, based on a prediction of a fixed set of discrete values and the solution of an optimal control structured CP, according to some embodiments.

FIG. 3A illustrates a block diagram of an MICP solution method 260, given the current problem parameter values $\theta$ 205, based on a prediction of a fixed set of values for the discrete optimization variables 305 and the solution of an optimal control structured CP approximation 280 to compute a feasible but possibly suboptimal solution vector 255 that defines the control signal 111. In some embodiments of the invention, the prediction of the fixed set of values for the discrete optimization variables 305, given the current problem parameter values $\theta$ 205, is based on a parametric function approximation of the mapping between the problem parameters $\theta$ 205 and the discrete values of the optimal MICP solution 260. Some embodiments of the invention are based on the realization that the discrete values of the optimal MICP solution 260 are equal to either 0 or 1 if all the discrete optimization variables are binary optimization variables. In some embodiments of the invention, the prediction method 305 is based on a parametric function approximation of the mapping between the problem parameters $\theta$ 205 and a value of $\hat{\delta}_{i,j}=0$ or $\hat{\delta}_{i,j}=1$ for each of the binary optimization variables i=0, 1, . . . , N and j=1, 2, . . . , $n_\delta$ in the optimal MICP solution 260.

In some embodiments of the invention, the prediction model may be deterministic, for example, including multilayer perceptrons, convolutional neural networks (CNNs), recurrent neural networks (RNNs), kernel regression, support vector machines, and other machine learning algorithms or any combination of such deterministic prediction models. Alternatively, in some embodiments of the invention, the prediction model may be stochastic, for example, including Bayesian neural networks, neural processes, Gaussian processes, Kriging interpolation, and other machine learning algorithms or any combination of such deterministic and/or stochastic prediction models.

Figure 3B:
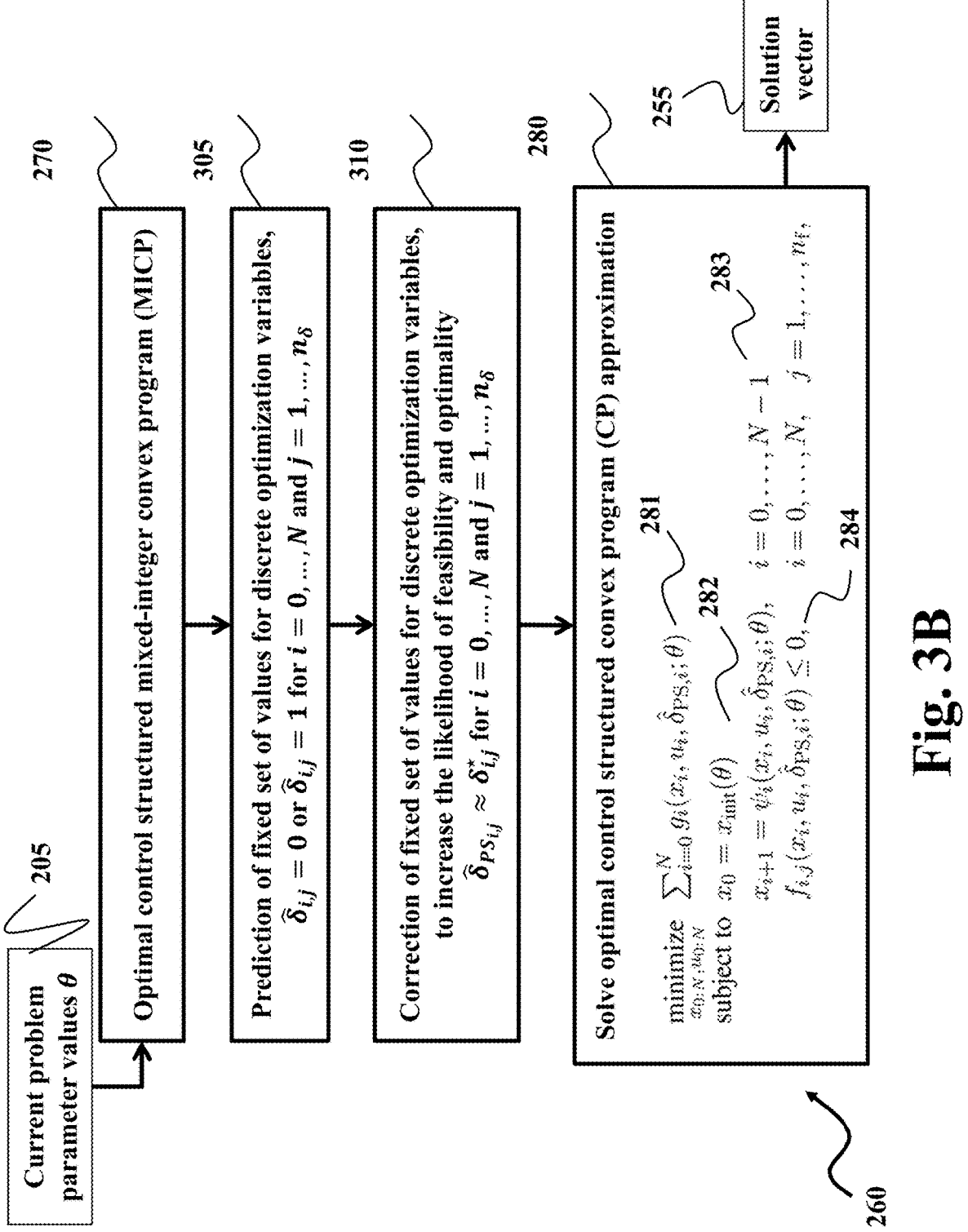
FIG. 3B illustrates a block diagram of an MICP solution method, based on a prediction, followed by a correction of the fixed set of discrete values and the solution of an optimal control structured CP, according to some embodiments.

FIG. 3B illustrates a block diagram of an MICP solution method 260, given the current problem parameter values $\theta$ 205, based on a prediction of a fixed set of values for the discrete optimization variables 305, followed by a correction of the fixed set of values for the discrete optimization variables to increase the likelihood of feasibility and optimality 310, and followed by the solution of an optimal control structured CP approximation 280 to compute a feasible but possibly suboptimal solution vector 255 that defines the control signal 111. The prediction method 305 can be implemented as a parametric function approximation of the mapping between the problem parameters $\theta$ 205 and a value of $\hat{\delta}_{i,j}=0$ or $\hat{\delta}_{i,j}=1$ for each of the binary optimization variables i=0, 1, . . . , N and j=1, 2, . . . , $n_\delta$ in the optimal MICP solution 260. However, some embodiments of the invention are based on the realization that the predicted values of $\hat{\delta}_{i,j}=0$ or $\hat{\delta}_{i,j}=1$ 305 can result in a relatively low likelihood of feasibility and/or optimality in practice for the solution vector 255 that is computed from the solution of the CP approximation 280.

In some embodiments of the invention, the correction method 310 does not adjust the predicted values of $\delta_{i,j}=0$ or $\hat{\delta}_{i,j}=1$ 305 if the fixed set of values for the discrete optimization variables leads to a CP solution 280 that is feasible and/or optimal for the original MICP optimization problem 270. A set of values for the discrete variables $\delta_i = \hat{\delta}_i$ is considered to be feasible, when the resulting convex optimization problem (CP) has a feasible optimal solution. Alternatively, if the CP problem 280 is infeasible after fixing the discrete optimization variables to the predicted set of values 305, then the correction method can adjust one or multiple of the predicted values to better approximate the optimal discrete solution $$\hat{\delta}_{PS_{i,j}} \approx \delta^*_{i,j}$$

for each of the binary optimization variables i=0, 1, . . . , N and j=1, 2, . . . , $n_\delta$ in the optimal MICP solution 260, and therefore to increase the likelihood of feasibility and optimality 310 according to embodiments of the invention.

Finally, the updated set of discrete values $$\hat{\delta}_{PS_{i,j}} \approx \delta^*_{i,j}$$

are used to fix each of the discrete optimization variables 310, and the resulting CP 280 can be solved efficiently in order to compute a feasible optimal control solution vector 255, including a trajectory of values for the state and control input variables at each time step of the prediction time horizon, which may be (close to) the optimal control solution for the original MIOCP 270.

In some embodiments of the invention, the correction method 310 is an iterative presolve-based correction method that is based on an iterative procedure in which each iteration performs a single presolve step followed by fixing one or multiple discrete optimization variables to a predicted set of fixed values 305. In some embodiments of the invention, the single presolve step itself consists of an iterative procedure of one or multiple presolve operations to reduce the number of discrete and/or continuous optimization variables, tighten the bounds on optimization variables and/or tighten the bounds on one or multiple inequality constraints. The iterative procedure of the single presolve step then performs one or multiple iterations, until either the problem is detected to be infeasible, until insufficient progress has been made between two consecutive iterations or until a predetermined time limit has been reached in order to ensure computational efficiency. Examples of presolve operations include domain propagation, bound strengthening, dual fixing, implied variable substitution, coefficient strengthening, probing, detection and removal of redundant variables and/or constraints. In addition, each of the presolve operations can be executed on individual variables, individual constraints, multiple variables and/or multiple constraints.

Figure 3C:
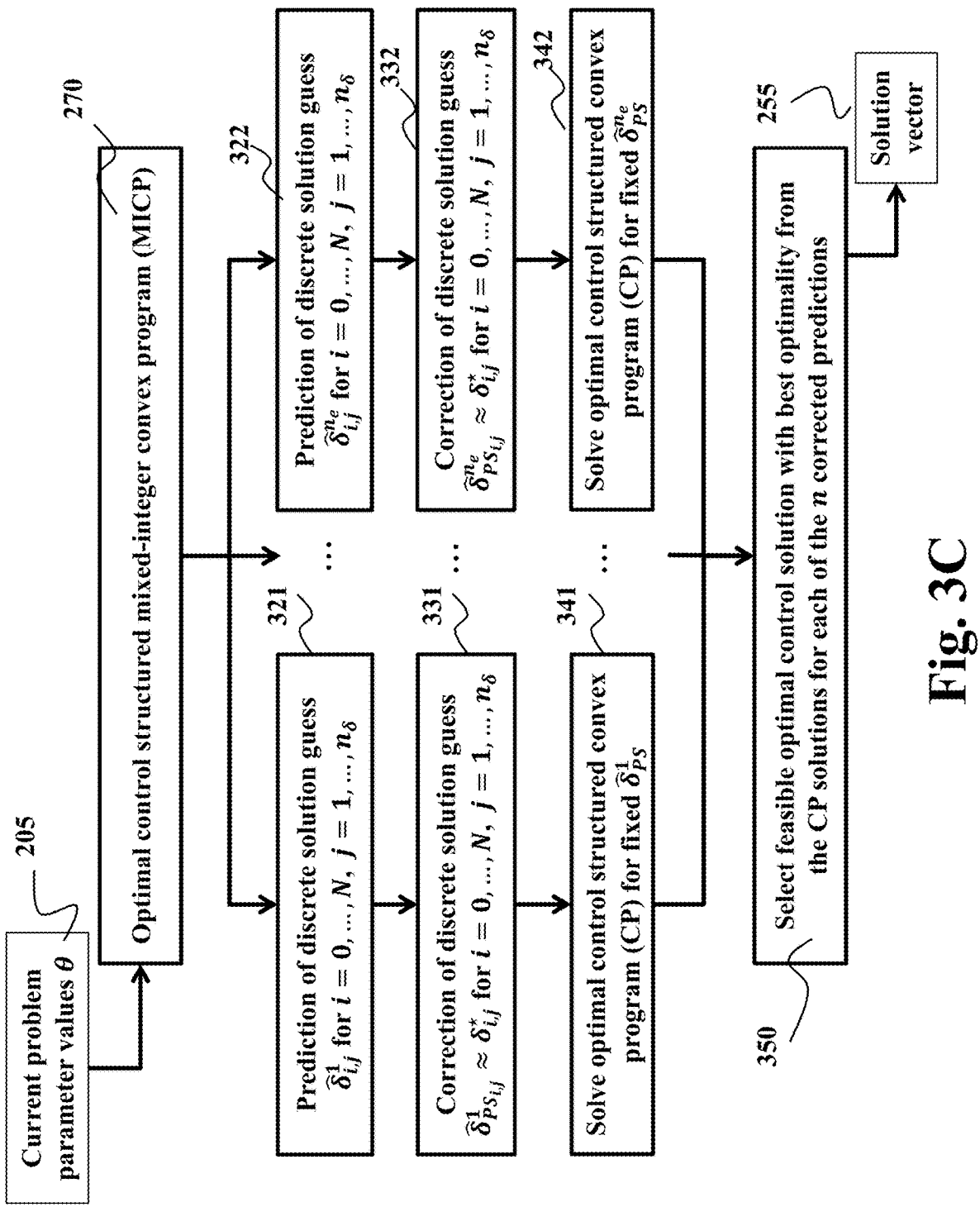
FIG. 3C illustrates a block diagram of an MICP solution method, based on multiple predictions, each followed by a correction of the fixed set of discrete values and the solution of an optimal control structured CP, according to some embodiments.

FIG. 3C illustrates a block diagram of an MICP solution method 260, given the current problem parameter values θ 205, based on multiple different predictions 321-322 of a fixed set of values for the discrete optimization variables, each followed by a correction step 331-332 of the fixed set of values for the discrete optimization variables to increase the likelihood of feasibility and optimality, and each followed by the solution of an optimal control structured CP approximation 341-342 to compute a feasible but possibly suboptimal solution vector 255 by selecting the feasible control solution with best optimality from the CP solutions for each of the n corrected discrete solution predictions 350. In some embodiments, the computations for each of the discrete solution predictions can be performed in parallel. For example, the first prediction of a discrete solution guess $\hat{\delta}^1$ 321 can be computed in parallel with one or multiple other predictions of a discrete solution guess $\hat{\delta}^k$ for k=2, . . . , $n_e$ 322. Similarly, the correction step for the first prediction of a discrete solution guess $$\hat{\delta}^1_{PS} \approx \delta^\star 331$$

can be computed in parallel with one or multiple correction steps for other predictions $$\hat{\delta}^k_{PS} \approx \delta^\star$$

for k=2, . . . , $n_e$ 332. Finally, the optimal control structured CP solution for fixed $$\hat{\delta}^1_{PS}$$

341 can be computed in parallel with one or multiple CP solutions for fixed sets of values $$\hat{\delta}^k_{PS} \text{ for } k = 2, \dots ,$$

342, in order to select the best optimal control solution 350 to compute the MICP solution vector 255.

Figure 3D:
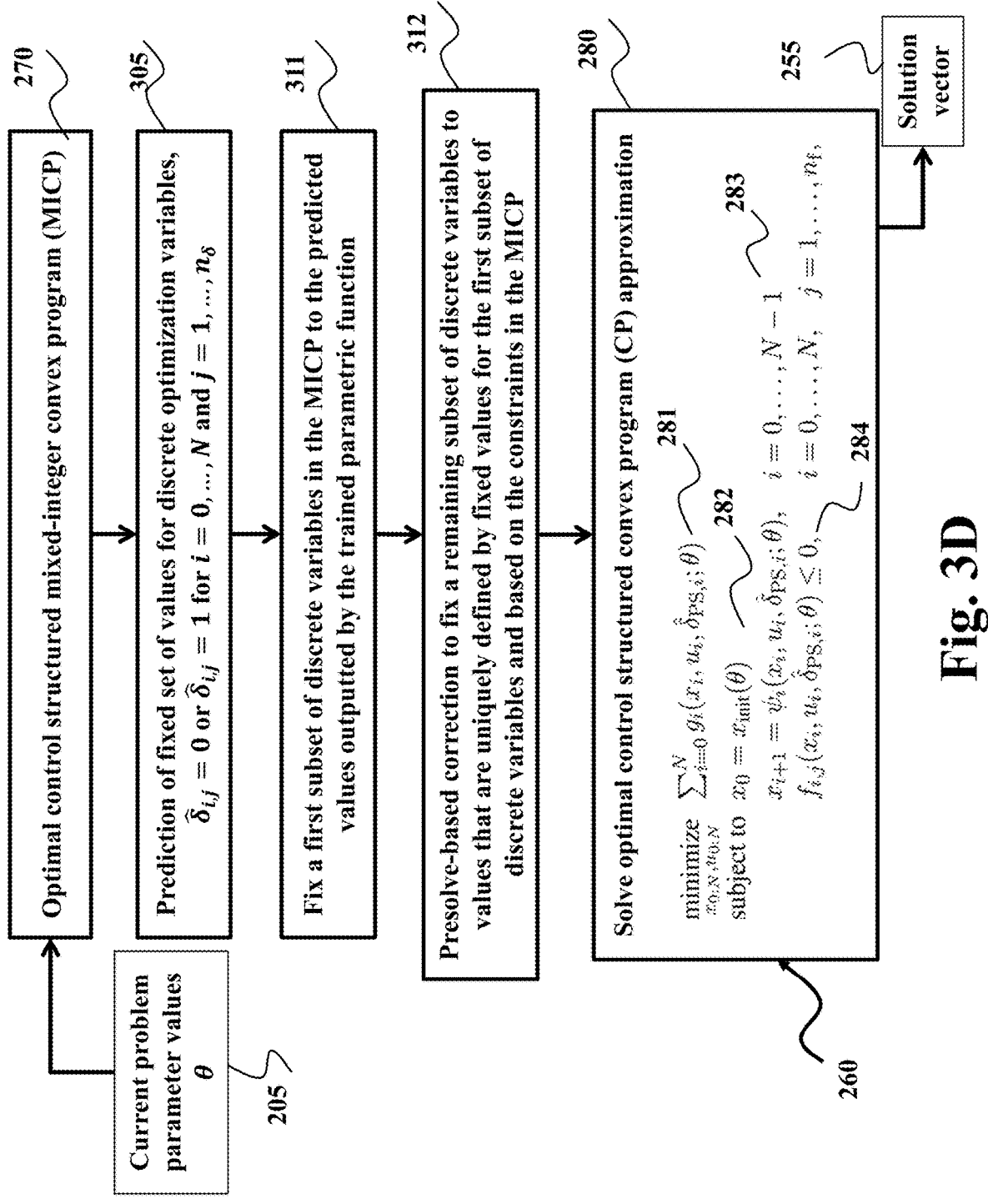
FIG. 3D illustrates a block diagram of an MICP solution method, based on a prediction that is used to fix a first subset of discrete variables, followed by a presolve-based correction to fix a remaining subset of discrete variables, and the solution of an optimal control structured CP, according to some embodiments.

FIG. 3D illustrates a block diagram of an MICP solution method 260, given the current problem parameter values θ 205, based on a prediction of a fixed set of values for the discrete optimization variables 305, which is used to fix a first subset of discrete variables in the MICP to the predicted values outputted by the trained parametric function 311, followed by a presolve-based correction to fix a remaining subset of discrete variables to values that are uniquely defined by fixed values for the first subset of discrete variables and based on the constraints in the MICP 312, to increase the likelihood of feasibility and optimality for the updated set of fixed values of the discrete variables 310, and followed by the solution of an optimal control structured CP approximation 280 to compute a feasible but possibly suboptimal solution vector 255 that defines the control signal 111.

Figure 4A:
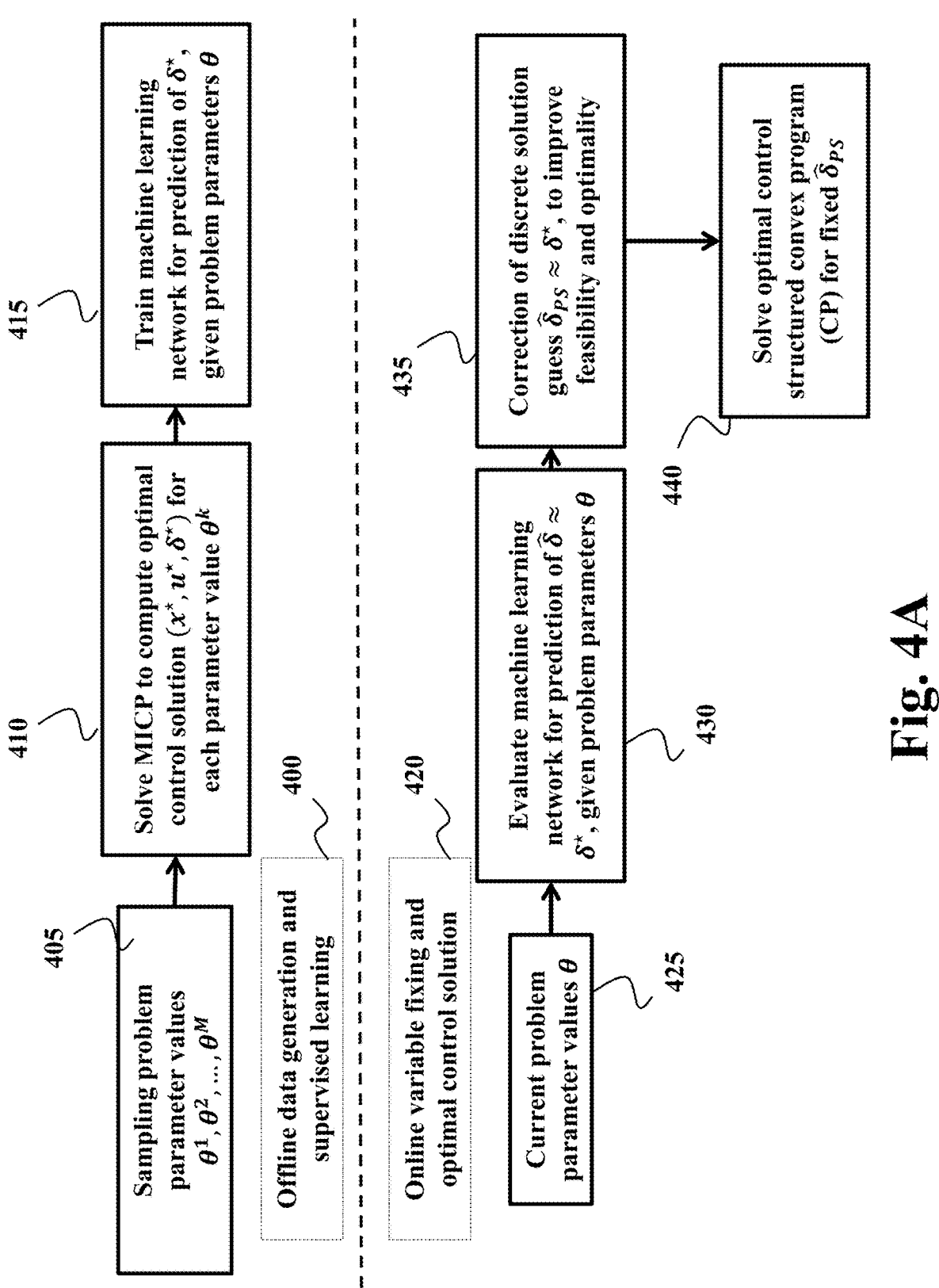
FIG. 4A illustrates a block diagram of an offline data generation and supervised learning procedure to train a machine learning-based predictor, which is used in an online variable fixing and optimal control solution procedure to solve the MICP.

FIG. 4A illustrates a block diagram of an offline data generation and supervised learning procedure 400 to train a machine learning-based predictor 415, and the machine learning-based predictor is then used in an online variable fixing and optimal control solution procedure 420 to compute a solution vector 255 for the optimal control structured MICP, according to some embodiments of the invention. The offline data generation and supervised learning procedure 400 consists of a first step of sampling problem parameter values $\theta^1$, $\theta^2$, . . . , $\theta^M$ 405, which are representative of the MICP problems that need to be solved online for real-time predictive control of the hybrid system. For example, if the problem parameters include the current state of the controlled system, then the data sampling step 405 ensures that a sufficiently large number of sampled parameter values are located in one or multiple regions of the feasible state space of the controlled system.

The offline data generation and supervised learning procedure 400 consists of a second step that solves an MICP to compute the optimal control solution (x*, u*, δ*) 410 for each sampled problem parameter value $\theta^1$, $\theta^2$, . . . , $\theta^M$ 405. In some embodiments of the invention, each of the MICPs can be solved exactly 410, for example, using branch-and-bound (B&B), branch-and-cut, branch-and-price methods or any other variant of a tree search-based optimization algorithm. Alternatively, in some embodiments of the invention, each of the MICPs can be solved approximately 410, for example, based on rounding and pumping schemes, using approximate optimization algorithms, approximate dynamic programming, or using sequential convex programming (SCP) techniques.

The offline data generation and supervised learning procedure 400 consists of a third step of training the machine learning network using supervised learning, based on a training data set of sampled parameter values 405 and corresponding MICP solutions 410, for machine learning-based prediction of the discrete optimal solution δ*, given a new set of problem parameter values 415. In some embodiments of the invention, training of the machine learning network involves the computation of network weights φ that minimize a training loss function, for example, using stochastic gradient descent, Adam, AdaGrad, RMSProp or any other variant of gradient-based or gradient-free optimization algorithm.

The online variable fixing and optimal control solution procedure 420 consists of a first step to evaluate the machine learning-based predictor to compute $\hat{\delta} \approx \delta^*$ 430, given the current problem parameter values θ 425. Given the predicted discrete solution guess $\hat{\delta} \approx \delta^*$ 430, the online variable fixing and optimal control solution procedure 420 consists of a second step that performs a correction of the discrete solution guess, resulting in an updated solution guess $\hat{\delta}_{PS} \approx \delta^*$ 435 to improve feasibility and/or optimality. Finally, a third step is based on the solution of an optimal control structured CP for fixed discrete values $\delta = \hat{\delta}_{PS}$ 440. In some embodiments of the invention, the correction method 435 is an iterative presolve-based correction method that is based on an iterative procedure in which each iteration performs a single presolve step followed by fixing one or multiple discrete optimization variables to a predicted set of fixed values 430.

Some embodiments of the invention are based on the realization that the offline data generation and supervised learning procedure 400 can be performed offline on a high-performance computer and therefore it does not have strict requirements on computational complexity and worst-case computation time. On the other hand, embodiments of the invention are based on the realization that the online variable fixing and optimal control solution procedure 420 needs to be performed online with strict requirements on the computational complexity and worst-case computation time, and the online procedure is typically executed on an embedded microprocessor with limited memory and limited computational capabilities, e.g., using the embedded control unit (ECU) of a vehicle.

Figure 4B:
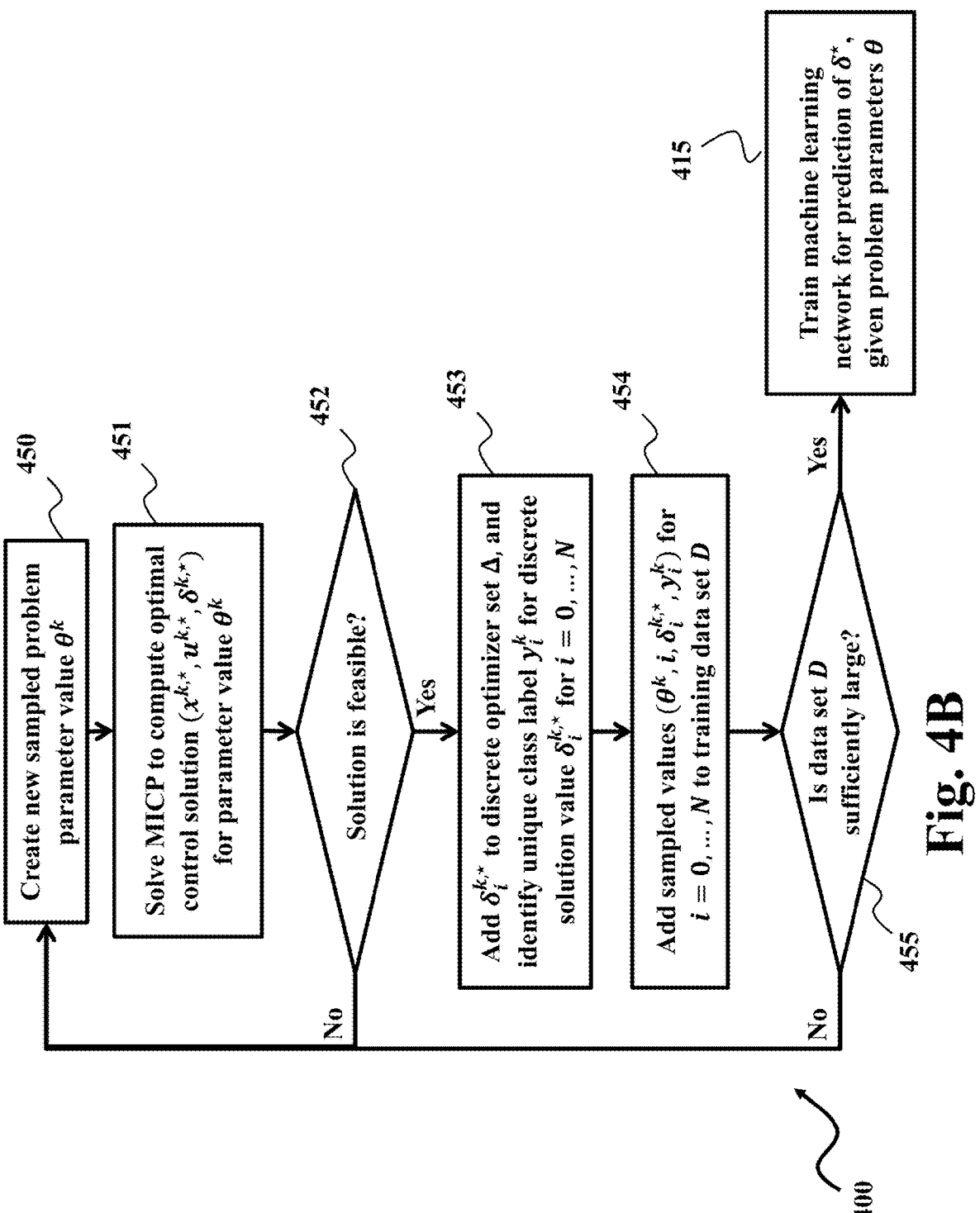
FIG. 4B illustrates a flow diagram of an offline data generation procedure, based on MICP solutions for a set of sampled problem parameter values, and a supervised learning procedure to train a machine learning-based predictor.

FIG. 4B and FIG. 4C illustrate a flow diagram and a pseudo code, respectively, of an offline data generation procedure 400, based on MICP solutions 410 for a set of sampled problem parameter values 405, and a supervised learning procedure to train a machine learning-based predictor 415, based on a discrete optimizer set $\Delta$ 453 and a training data set D 454. In some embodiments of the invention, the offline data generation 400 is an iterative procedure that checks whether the training data set D is sufficiently large 455. If the training data set D is sufficiently large 455, then the procedure initiates training of the machine learning-based predictor 415, i.e., the computation of network weights $\phi$ that minimize a training loss function, using stochastic gradient descent, Adam, AdaGrad, RMSProp or any other variant of gradient-based or gradient-free optimization algorithm. In some embodiments of the invention, the offline data generation procedure 400 returns the trained machine learning network $h_\phi$ and a discrete optimizer set $\Delta$ 456.

If the training data set D is not sufficiently large 455, then the data generation 400 proceeds by computing a new sampled problem parameter value Ok 450 and an MICP problem is solved to compute the optimal control solution $(x^{k,*}, u^{k,*}, \delta^{k,*})$ 451 for the new sampled problem parameter value $\theta^k$. If the MICP solution 451 is not feasible 452, then a new sampled problem parameter value $\theta^k$ 450 needs to be computed. In some embodiments of the invention, a new sampled problem parameter value $\theta^k$ 450 can be selected from a precomputed batch of problem parameter values $\{\theta^k\}_{k=1,\ldots,M}$ 445. At the start of the offline data generation procedure 400, a binary optimizer set $\Delta$ and a training data set D are each initialized to be equal to an empty set 401.

If the MICP solution 451 is feasible 452, then the data generation 400 proceeds by adding the optimal discrete solution values $$\delta_i^{k,*}$$

to a discrete optimizer set $\Delta$ and a unique class label $$y_i^k$$

is identified for the optimal discrete solution values $$\delta_i^{k,*}$$

for each time step i=0, . . . , N in the prediction time horizon 453. In some embodiments of the invention, if the MICP solution 451 is feasible 452, then the offline data generation 400 proceeds by adding the sampled solution values $$(\theta^k, i, \delta_i^{k,*}, y_i^k)$$

for each time step i=0, . . . , N to the training data set D 454.

Some embodiments of the invention are based on the realization that two or more sampled problem parameter values $\theta^k$ and $\theta^l$ can result in optimal discrete solution values that are equal, i.e., $$\delta_i^{k,*} = \delta_i^{l,*}$$

for one or multiple time steps i$\in$ {0, 1, . . . , N} in the prediction time horizon, in which case the corresponding class labels are equal $$y_i^k = y_i^l$$

to each other, because the class label value is a unique identifier of the discrete optimal solution value in the discrete optimizer set $\Delta$.

Some embodiments of the invention are based on the realization that the number of target class labels in supervised learning can be reduced considerably by exploiting the temporal structure of the discrete MIOCP solution, which may result in improved sampling efficiency and/or improved performance of the machine learning-based predictor. For example, the maximum number of target class label values is $2^{(N+1)n_\delta}$, given $n_\delta$ discrete variables at each time step i=0, 1, . . . , N, which can be reduced to a maximum of $2^{n_\delta}$ target class label values per time step by exploiting the temporal structure of the MIOCP. In addition, some embodiments of the invention are based on the realization that the number of unique discrete values $$\delta_i^k \in \Delta$$

can be considerably smaller than the theoretical maximum number of target class label values, due to a sampling of problem parameter values that are representative of the optimal control problems which are of interest in practice and due to the constraints on feasibility of the MIOCP problem.

Figure 4D:
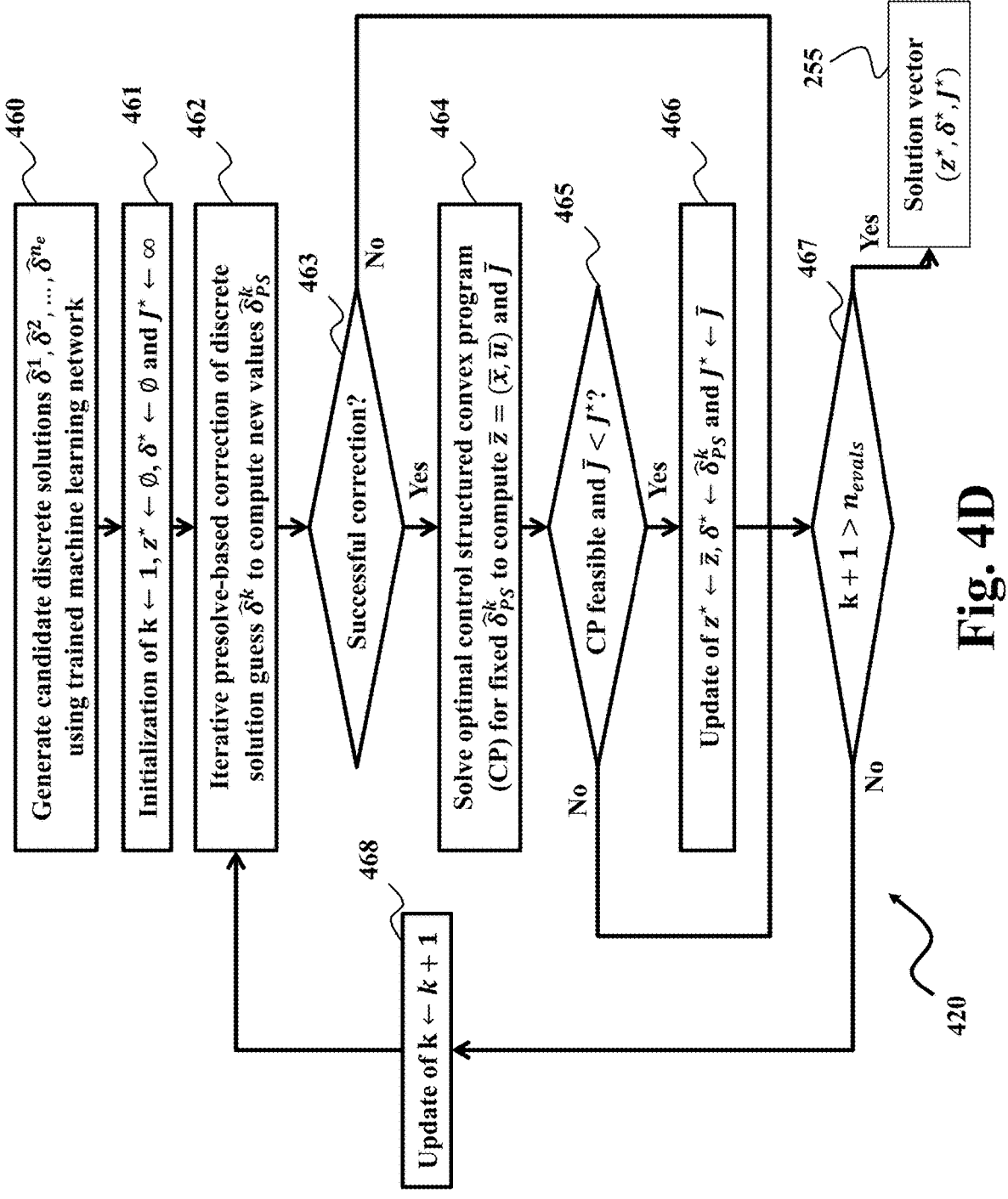
FIG. 4D illustrates a flow diagram of an online variable fixing procedure, based on a prediction and an iterative presolve-based correction step, and an optimal control structured CP solution procedure to compute a feasible MICP solution.

FIG. 4D and FIG. 4E illustrate a flow diagram and a pseudo code, respectively, of an online variable fixing procedure 420, based on a prediction 430 and an iterative presolve-based correction step 435, and an optimal control structured CP solution procedure 440 to compute a feasible MICP solution vector 255, according to some embodiments of the invention. In some embodiments of the invention, the trained machine learning network 415 can be used to predict one or multiple candidate discrete solutions $\hat{\delta}^1, \hat{\delta}^1, \ldots, \hat{\delta}^{n_c}$

460, given the problem parameter values θ, the discrete optimizer set Δ, the trained machine learning network $h_\phi$ and a maximum number of evaluations $n_{evals}$ 470. At the start of the online variable fixing and optimal control solution procedure 420, an initialization step 461 sets $k \leftarrow 1$, the optimal control solution $z^* = (x^*, u^*)$ and $\delta^*$ are each set equal to an empty set and the optimal objective value is set to infinity $J^* \leftarrow \infty$.

In some embodiments of the invention, the online variable fixing 420 is an iterative procedure and each iteration consists of an iterative presolve-based correction step based on a discrete solution guess $\hat{\delta}^k$ to compute new discrete solution values $$\hat{\delta}^k_{PS}$$

462. If the correction is not successful 463, for example, because no feasible solution could be found using the predicted discrete solution guess $\hat{\delta}^k$, then the procedure continues with the next iteration and the iteration number can be updated $k \leftarrow k+1$ 468. If the correction successfully computes new values $$\hat{\delta}^k_{PS}$$

462, with an increased likelihood of feasibility and/or optimality, then the online variable fixing procedure 420 proceeds by solving the optimal control structured CP for fixed discrete values $$\delta = \hat{\delta}^k_{PS}$$

to compute a feasible and optimal control solution $\bar{z} = (\bar{x}, \bar{u})$ and corresponding objective value $\bar{J}$ 464.

In case no feasible solution of the optimal control structured CP for fixed discrete values $$\delta = \hat{\delta}^k_{PS}$$

exists or if the corresponding objective value is larger than the current optimal objective value $\bar{J} > J^*$ 465, then the procedure continues with the next iteration and the iteration number can be updated $k \leftarrow k+1$ 468. If a feasible solution of the optimal control structured CP for fixed discrete values $$\delta = \hat{\delta}^k_{PS}$$

exists and if the corresponding objective value is smaller than the current optimal objective value $\bar{J} < J^*$ 465, then the procedure updates the optimal control solution $z^* \leftarrow \bar{z}$, it updates the optimal discrete solution $$\delta^* \leftarrow \hat{\delta}^k_{PS}$$

and it updates the optimal objective value $J^* \leftarrow \bar{J}$ 466. In some embodiments of the invention, a maximum number of evaluations, $n_{evals}$, is defined in order to terminate the online variable fixing procedure 420 if the maximum number of evaluations has been reached $k+1 > n_{evals}$ 467, in order to limit the total computation time of the online variable fixing and optimal control solution procedure.

If a maximum number of evaluations has not been reached 467, then the procedure continues with the next iteration and the iteration number can be updated $k \leftarrow k+1$ 468. If the maximum number of evaluations has been reached 467, then the optimal control solution vector $(z^*, \delta^*, J^*)$ 255 can be used to implement the predictive controller according to embodiments of the invention.

In some embodiments of the invention, the iterative presolve-based correction method 462 can return either one of the following results the iterative correction method detects that the predicted set of discrete values $\hat{\delta}^k$ are feasible, such that the values $$\hat{\delta}^k_{PS} = \hat{\delta}^k \approx \delta^*$$

are returned;

the iterative correction method computes an updated set of discrete values $$\hat{\delta}^k_{PS} \neq \hat{\delta}^k$$

that are feasible, such that the values $$\hat{\delta}^k_{PS} \approx \delta^*$$

are returned;

the iterative correction method may fail to compute an updated set of discrete values that are feasible, within a predetermined time limit.

Embodiments of the invention are based on the realization that the iterative presolve-based correction method may increase the likelihood of feasibility and/or optimality, e.g., when the iterative correction method removes or prunes a discrete variable for which the machine learning-based predictor provided an incorrect predicted value that would have resulted in an infeasible control solution.

Figure 5A:
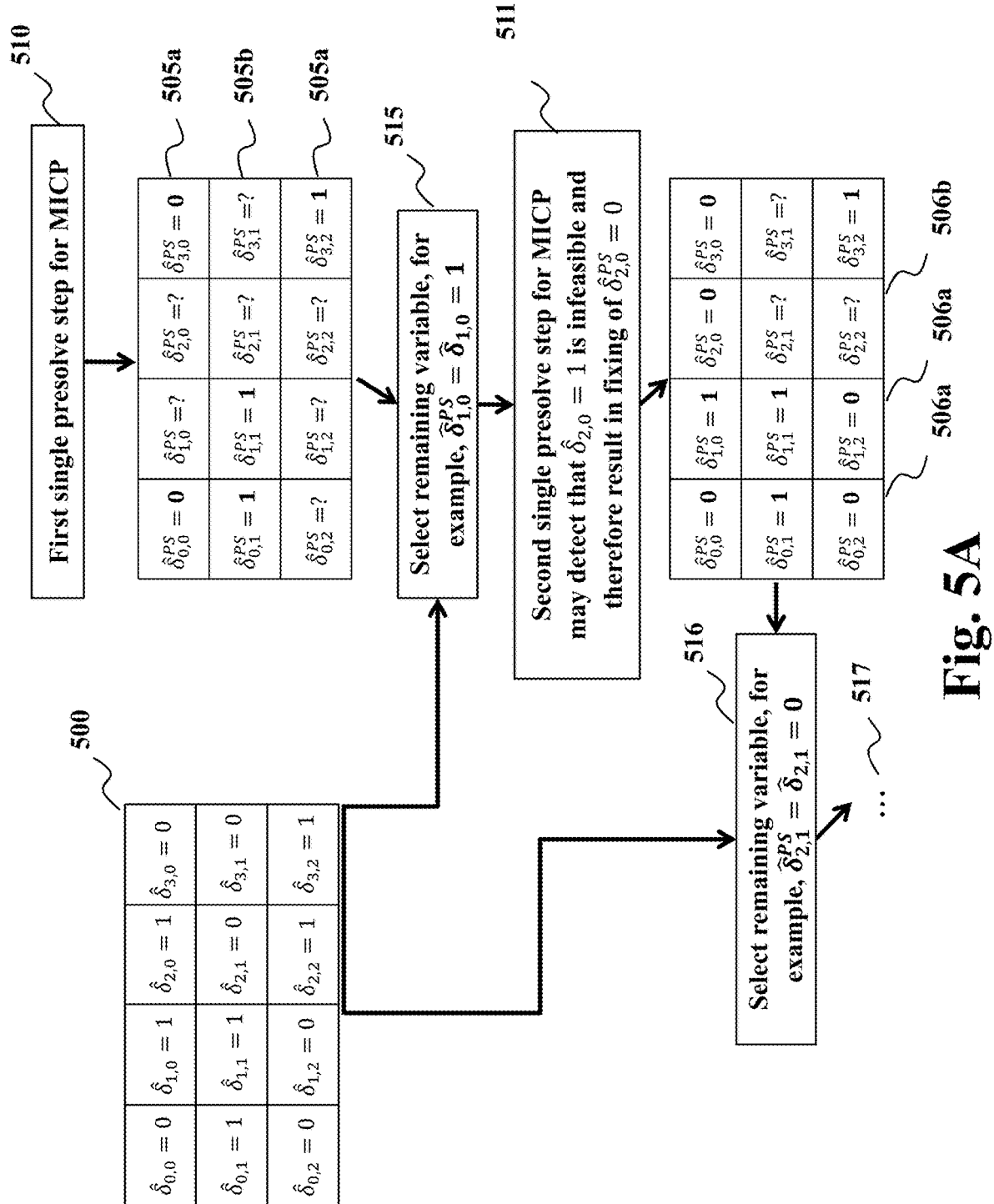
FIG. 5A illustrates an example of an online variable fixing procedure, based on a prediction and a correction step that involves one or multiple presolve-based iterations to compute a fixed set of values for the discrete variables of the MICP.

FIG. 5A illustrates an example of the iterative presolve-based correction procedure 462, according to some embodiments of the invention. The online variable fixing and optimal control solution procedure 420 consists of a first step to evaluate the machine learning-based predictor to compute $\hat{\delta} \approx \delta^*$ 430, given the current problem parameter values θ 425 for the MICP, resulting in one or multiple candidate binary solutions 500 as illustrated in FIG. 5A. In some embodiments of the invention, the iterative presolve-based correction procedure 462 starts with a first single presolve step for the MICP 510, which may result in one or multiple fixings or prunings of discrete optimization variables. For example, in FIG. 5A, the first single presolve step 510 results in the fixed discrete variables $$\hat{\delta}^{PS}_{0,0} = 0, \hat{\delta}^{PS}_{0,1} = 1, \hat{\delta}^{PS}_{1,1} = 1, \hat{\delta}^{PS}_{3,0} = 0 \text{ and } \hat{\delta}^{PS}_{3,2} = 1, \quad \text{505a}$$

but the free remaining discrete variables are not yet fixed, i.e., $$\hat{\delta}_{0,2}^{PS} = ? \in \{0, 1\}, \hat{\delta}_{1,0}^{PS} = ? \in \{0, 1\}, \hat{\delta}_{1,2}^{PS} = ? \in \{0, 1\},$$  505b $$\hat{\delta}_{2,0}^{PS} = ? \in \{0, 1\} \hat{\delta}_{2,1}^{PS} = ? \in \{0, 1\}, \hat{\delta}_{2,2}^{PS} = ? \in \{0, 1\} \text{ and } \hat{\delta}_{3,1}^{PS} = ? \in \{0,1\}.$$

After fixing one or multiple discrete optimization variables, based on the first single presolve step 510, the iterative presolve-based correction procedure 462 continues by selecting a free remaining discrete variable and fixing it according to the predicted binary solution guess 500, for example, $$\hat{\delta}_{1,0}^{PS} = \hat{\delta}_{1,0} = 1$$

515. If no free remaining discrete variable exists, then a complete updated binary solution guess has been found 463. After fixing the discrete variable $$\hat{\delta}_{1,0}^{PS} = \hat{\delta}_{1,0} = 1,$$  515 in some embodiments of the invention, the iterative presolve-based correction procedure 462 continues with a second single presolve step for the MICP 511. After the second single presolve step 511, all discrete variables that were fixed by the first single presolve step 510, i.e., $$\hat{\delta}_{0,0}^{PS} = 0, \hat{\delta}_{0,1}^{PS} = 1, \hat{\delta}_{1,1}^{PS} = 1, \hat{\delta}_{3,0}^{PS} = 0 \text{ and } \hat{\delta}_{3,2}^{PS} = 1$$

505a remain fixed, and additionally the discrete variable $$\hat{\delta}_{1,0}^{PS} = \hat{\delta}_{1,0} = 1$$

515 has been fixed by the machine learning-based predictor, and the second single presolve step 511 can lead to additional fixed discrete variables, e.g., $$\text{e.g., } \hat{\delta}_{0,2}^{PS} = 0, \hat{\delta}_{1,2}^{PS} = 0, \hat{\delta}_{2,0}^{PS} = 0$$

506a. For example, the second single presolve step may detect that the predicted solution guess $\hat{\delta}_{2,0}{}^{PS}=1$ is infeasible and it is therefore guaranteed that this discrete variable can be fixed to $$\hat{\delta}_{2,0}^{PS} = 0.$$  511

For the example of FIG. 5A, the free remaining discrete variables are not yet fixed, i.e., $$\hat{\delta}_{2,1}^{PS} = ? \in \{0, 1\}, \hat{\delta}_{2,2}^{PS} = ? \in \{0, 1\} \text{ and } \hat{\delta}_{3,1}^{PS} = ? \in \{0,1\}.$$  506b After the second single presolve step 511, the iterative presolve-based correction procedure 462 continues by selecting another free remaining discrete variable and fixing it according to the predicted binary solution guess 500, for example, $$\hat{\delta}_{2,1}^{PS} = \hat{\delta}_{2,1} = 0.$$  516

If no free remaining discrete variable exists, then a complete updated binary solution guess has been found 463. After fixing the discrete variable $$\hat{\delta}_{2,1}^{PS} = \hat{\delta}_{2,1} = 0,$$  516 then the iterative presolve-based correction procedure 462 continues with one or multiple additional single presolve steps and variable fixings in a similar fashion 517 until a complete updated binary solution guess is found 463.

Some embodiments of the invention are based on the realization that any single presolve step may detect an infeasible solution, in which case the iterative presolve-based correction procedure 462 can be terminated immediately without a successful correction 463 to reduce the total computation time.

In some embodiments of the invention, each iteration of the iterative correction method performs a single presolve step that aims to reduce the number of discrete optimization variables in the MIOCP, by fixing each of the removed or pruned variables to a value that is optimal and/or uniquely feasible. The single presolve step preserves feasibility and optimality, i.e., any feasible or optimal solution of the reduced MICP problem can be mapped to a feasible or optimal solution of the original MICP problem with identical objective values, and the reduced MICP problem is infeasible or unbounded if and only if the original MICP problem is infeasible or unbounded. Subsequently, if the single presolve step does not detect infeasibility and not all of the discrete variables have been fixed, then the iterative correction method selects one or multiple of the remaining free discrete variables to be fixed to the solution value that is provided by the machine learning-based predictor, and the single presolve step is performed in a next iteration of the iterative correction method. The iterative presolve-based correction method terminates, after one or multiple iterations, if all of the discrete variables have been fixed or if an infeasibility has been detected.

Some embodiments of the invention are based on the realization that an alternative control solution vector can be used to change the state of the device, if an infeasibility is detected by the iterative presolve-based correction method.

In some embodiments of the invention, a single presolve step can reuse one or multiple computation results from a previous single presolve step, in order to improve the computational efficiency of the iterative presolve-based correction method. In some embodiments of the invention, the number of iterations in the iterative correction method is limited by a predetermined upper bound, in order to improve the computational efficiency. If the predetermined upper bound on the number of iterations has been reached, and not all of the discrete variables have been fixed, then all of the remaining free discrete variables can be fixed to the solution value that is provided by the machine learning-based predictor.

Figure 5B:
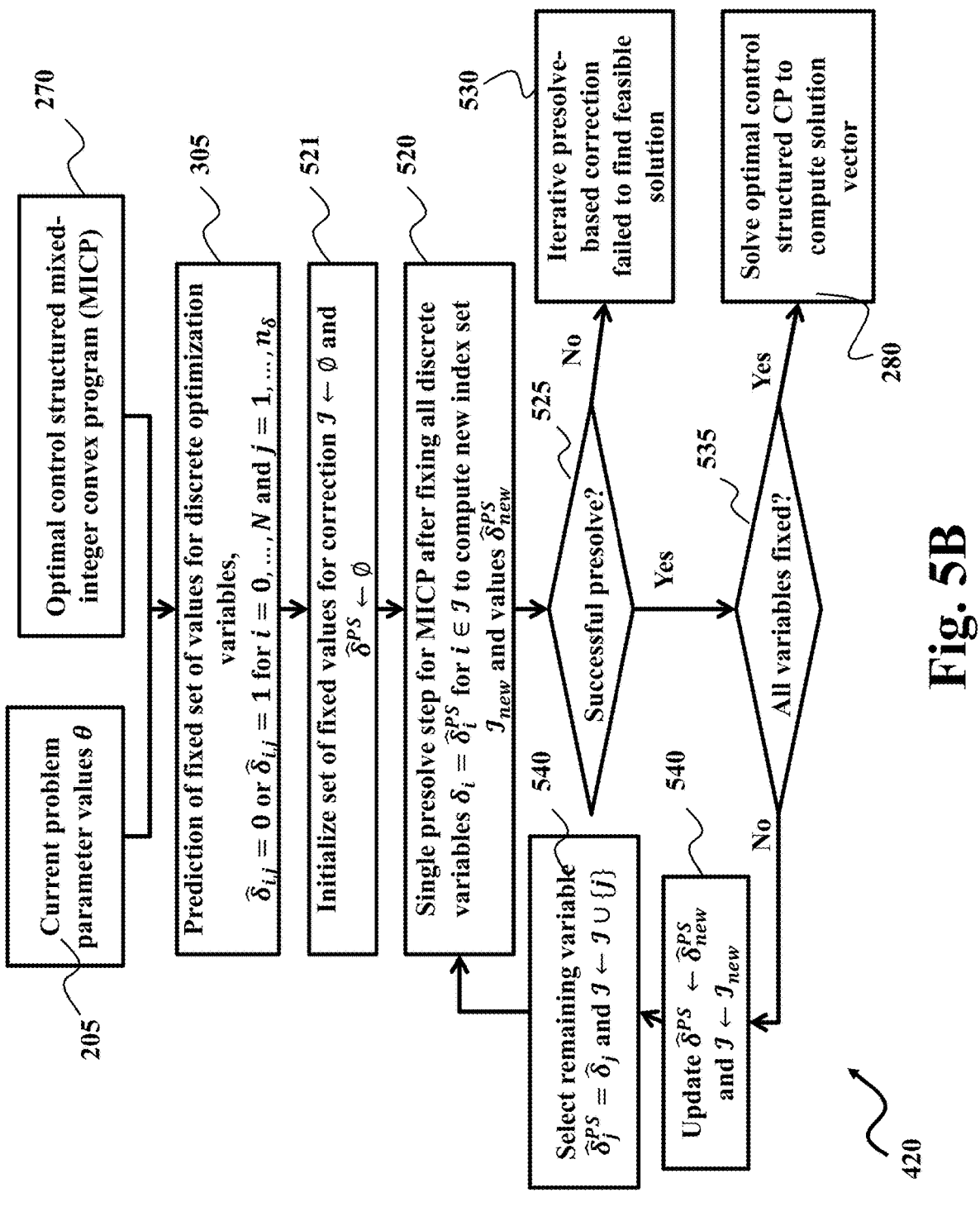
FIG. 5B illustrates a flow diagram of an online variable fixing procedure, based on a prediction and a correction step that involves one or multiple presolve-based iterations to compute a fixed set of values for the discrete variables of the MICP.

FIG. 5B and FIG. 5C illustrate a flow diagram and a pseudo code of an online variable fixing and optimal control solution procedure 420, using a prediction 305 and a correction step based on one or multiple single presolve steps 520 to compute a solution vector 255 for the optimal control structured MICP 270, given the current problem parameter values θ 205, according to some embodiments of the invention. The first step of the online variable fixing procedure is to initialize the index set $\mathcal{I} \leftarrow \varnothing$ and the set of discrete values $$\hat{\delta}^{PS} \leftarrow \varnothing$$

to an empty set 521. In some embodiments of the invention, each iteration of the iterative presolve-based correction procedure performs a single presolve step for the MICP 520, given the fixed set of discrete variables $$\delta_i = \hat{\delta}_i^{PS}$$

for $i \in \mathcal{I}$ and in order to compute an updated index set $\mathcal{I}_{new}$ and an updated set of discrete values $$\hat{\delta}_{new}^{PS}$$

Some embodiments of the invention are based on the realization that the updated index set and updated set of discrete values must include at least the original index set and the original set of discrete values, because each single presolve step can only result in the fixing or pruning of more discrete optimization variables.

If the single presolve step was not successful 525, for example, if the single presolve step results in an infeasible solution, then the iterative presolve-based correction failed to find a feasible solution 530. Alternatively, if the single presolve step was successful 525 and all discrete optimization variables have been fixed 535, then the resulting optimal control structured CP is solved to compute the optimal control solution vector 280 based on the successful correction of the fixed discrete values 536. Alternatively, if the single presolve step was successful 525 but not all discrete optimization variables have been fixed 535, then the procedure continues by updating the index set $\mathcal{I} \leftarrow \mathcal{I}_{new}$ and the values $$\hat{\delta}^{PS} \leftarrow \hat{\delta}_{new}^{PS} \; \mathbf{541},$$

and a remaining free variable is selected to be fixed according to the machine learning-based prediction 540, i.e., $$\hat{\delta}_j^{PS} = \hat{\delta}_j$$

and the index set is updated $\mathcal{I} \leftarrow \mathcal{I} \cup \{j\}$. After fixing a remaining free variable 540, in some embodiments of the invention, the iterative presolve-based correction continues by performing one or multiple additional iterations, and each iteration can include another single presolve step 520 and a variable selection and fixing step 540.

Some embodiments of the invention are based on the realization that a maximum number of single presolve steps 520 can be performed in the iterative presolve-based correction method, after which all remaining free variables are fixed to the machine learning-based predicted discrete solution guess 540, in order to limit the maximum computation time for the online variable fixing and optimal control solution procedure 420 and to allow for a real-time implementation of the predictive controller according to embodiments of the invention.

Figure 6A:
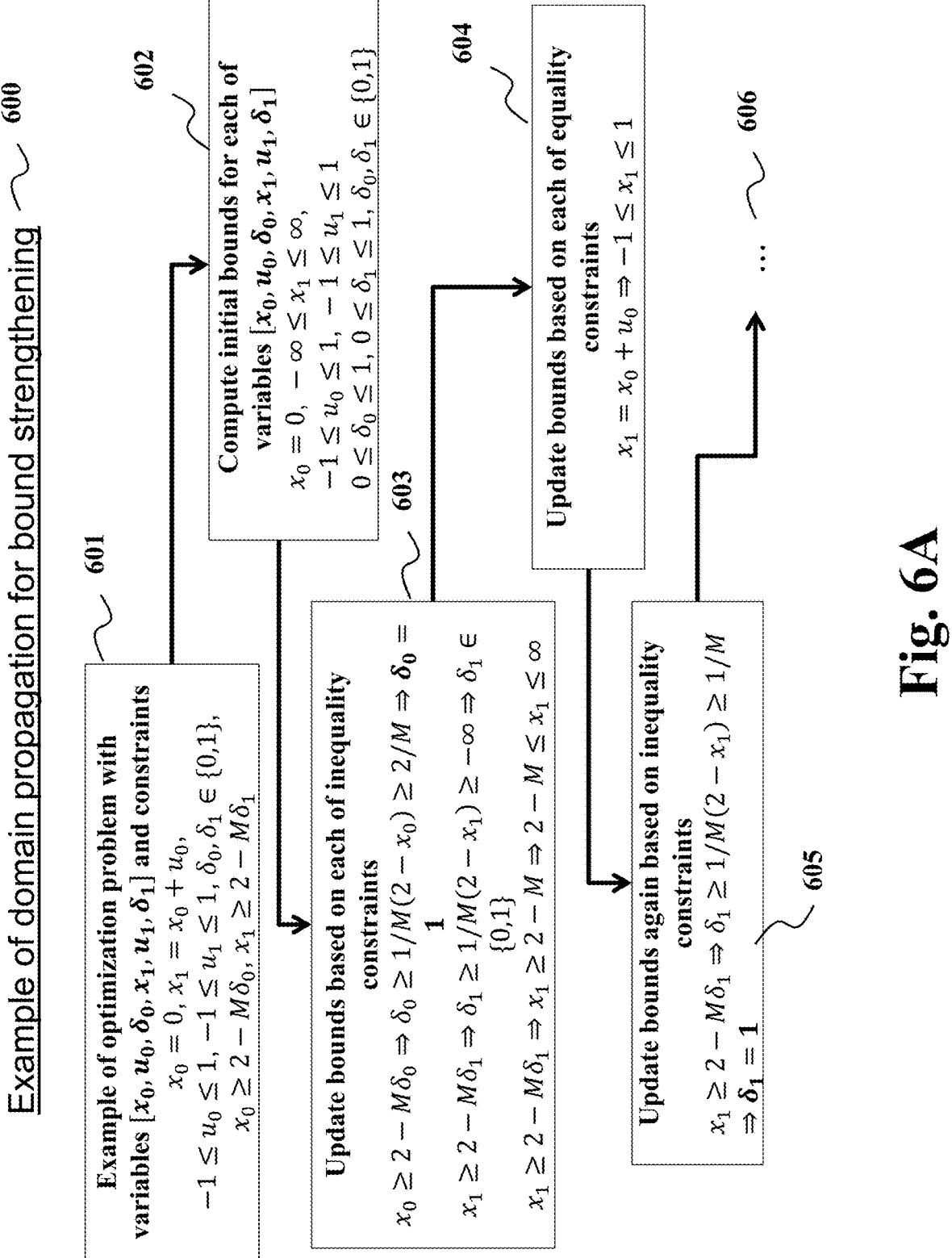
FIG. 6A illustrates an example of domain propagation for bound strengthening of MICP optimization variables, which can be used in an iterative presolve-based correction procedure, according to some embodiments.

Some embodiments of the invention are based on the realization that a trained parametric function approximation architecture can provide a probability or confidence level for the predicted value for each of the discrete variables in the MICP solution, such that a remaining free discrete variable can be selected 540 for which the probability or confidence level of the trained parametric function approximation architecture is maximized. Alternatively, in some embodiments of the invention, a remaining free discrete variable can be selected 540 randomly. FIG. 6A illustrates an example of domain propagation for bound strengthening of optimization variables in the MICP problem 270, which can be used within a single presolve step 520 of an iterative presolve-based correction procedure 435, according to some embodiments of the invention. FIG. 6A shows an example of an MICP optimization problem with decision variables $[x_0, u_0, \delta_0, x_1, u_1, \delta_1]$ and multiple equality and inequality constraints 601. The variables $\delta_0$, $\delta_1$ are assumed to be binary decision variables, i.e., $\delta_0$, $\delta_1 \in \{0,1\}$. A first step of domain propagation 600 is to compute initial bounds for each of the optimization variables 602, for example, $0 \leq \delta_0 \leq 1$, $0 \leq \delta_1 \leq 1$ because they are binary decision variables $\delta_0$, $\delta_1 \in \{0,1\}$. In some embodiments of the invention, domain propagation is an iterative procedure and each iteration performs an update to the variable bounds based on each of the inequality constraints 603 and an update to the variable bounds based on each of the equality constraints 604, followed by another update to the variable bounds based on each of the inequality constraints 605 and this procedure continues 606 until a termination condition is satisfied.

For example, in some embodiments of the invention, the iterative procedure of domain propagation 600 terminates when either all of the discrete optimization variables are fixed, or when the MICP problem is detected to be infeasible, or when insufficient progress is made from one iteration to a next iteration or when a maximum computation time is reached. The progress of domain propagation from one iteration to the next iteration can be measured based on a tightening of one or multiple variable bounds from one iteration to the next iteration. For example, in FIG. 6A, progress is made by domain propagation in the first update of the variable bounds based on each of the inequality constraints 603, leading to fixing of the binary decision variable $\delta_0 = 1$. In addition, the second update of the variable bounds based on each of the equality constraints 604 leads to a tightening of the variable bounds from $-\infty \leq x_1 \leq \infty$ to the updated variable bounds $-1 \leq x_1 \leq 1$. Similarly, the third update of the variable bounds based on each of the inequality constraints 605 leads to fixing of the binary decision variable $\delta_1 = 1$.

FIG. 6B illustrates an example of redundant inequality constraint detection and dual fixing 630 of optimization variables in the MICP problem 270, which can be used within a single presolve step 520 of an iterative presolve-based correction procedure 435, according to some embodiments of the invention. Some embodiments of the invention are based on the realization that a detection and removal of redundant inequality constraints, and dual fixing of optimization variables, can result in additional fixings of discrete variables and/or it can reduce the computational cost of a single presolve step 520 of an iterative presolve-based correction procedure 435. In some embodiments of the invention, redundant inequality constraint detection and dual fixing of variables 630 can be used in combination with domain propagation for bound strengthening 600 and/or in combination with one or multiple other presolve operations within a single presolve step 520 of an iterative presolve-based correction procedure 435.

FIG. 6B shows an example of an MICP optimization problem with decision variables $[x_0, u_0, \delta_0]$, where the variable $\delta_0 \in \{0,1\}$ is a binary decision variable, and including multiple inequality constraints 631. Since $u_0 \leq 1$ and $\delta_0 \leq 1$, the following inequality constraint $u_0 + \delta_0 \leq 2$ can be detected to be redundant 632 and therefore the latter inequality constraint can be removed from the MICP optimization problem, in order to reduce the computational cost of a single presolve step 520 of an iterative presolve-based correction procedure 435. After removing redundant inequality constraints, dual fixing can be used to fix the discrete variable $\delta_0 = 1$ 633, if the discrete variable does not appear in equality constraints and it appears with the same sign in all inequality constraints, for example, $2 \leq x_0 + M\delta_0$. In addition, this example of dual fixing assumes that the variable $\delta_0$ does not appear in the cost function or it appears as a maximization for the value of $\delta_0 \in \{0,1\}$. In some embodiments of the invention, redundant inequality constraint detection and dual fixing of optimization variables 630 is an iterative procedure that continues 634 until either all of the discrete optimization variables are fixed, or until the MICP problem is detected to be infeasible, or until insufficient progress is made from one iteration to a next iteration or until a maximum computation time is reached.

FIG. 6C illustrates an example of inequality constraint coefficient strengthening 650 for the MICP optimization problem 270, which can be used within a single presolve step 520 of an iterative presolve-based correction procedure 435, according to some embodiments of the invention. Some embodiments of the invention are based on the realization that an inequality constraint coefficient strengthening can result in additional fixings of discrete variables and/or it can reduce the computational cost of a single presolve step 520 of an iterative presolve-based correction procedure 435. In some embodiments of the invention, inequality constraint coefficient strengthening 650 can be used in combination with domain propagation for bound strengthening 600, in combination with redundant inequality constraint detection and dual fixing of variables 630 and/or in combination with one or multiple other presolve operations within a single presolve step 520 of an iterative presolve-based correction procedure 435.

FIG. 6C shows an example of an MICP optimization problem with decision variables $[x_0, u_0, \delta_0]$, where the variable $\delta_0 \in \{0,1\}$ is a binary decision variable, and including multiple inequality constraints 651. Using the inequality constraint $x_0 \geq 1$ and using the bounds for the discrete variable $0 \leq \delta_0 \leq 1$, the following inequality constraint $2 \leq x_0 + 100\delta_0$ can be replaced by the following dominating inequality constraint $2 \leq x_0 + \delta_0$ 652 without removing any feasible solutions of the original MICP optimization problem. More specifically, it can be shown that any feasible MICP solution that satisfies the original inequality constraint $2 \leq x_0 + 100\delta_0$ additionally satisfies the more tight inequality constraint $2 \leq x_0 + \delta_0$ 652. The inequality constraint coefficient strengthening 652 results in a reduction of the feasible space for the relaxed optimization problem, after relaxing the discrete variable $\delta_0 \in \{0,1\}$ to $0 \leq \delta_0 \leq 1$, and the resulting inequality constraint $2 \leq x_0 + \delta_0$ is therefore considered a dominating inequality constraint. In some embodiments of the invention, inequality constraint coefficient strengthening is an iterative procedure that continues 653 until either all of the discrete optimization variables are fixed, or until the MICP problem is detected to be infeasible, or until insufficient progress is made from one iteration to a next iteration or until a maximum computation time is reached.

Some embodiments of the invention are based on the realization that inequality constraint coefficient strengthening can be used to replace one or multiple inequality constraints by one or multiple dominating inequality constraints, and the dominating inequality constraints can be used to reduce the feasible search space of the relaxed problem without removing an integer-feasible solution of the MICP.

Figure 6D:
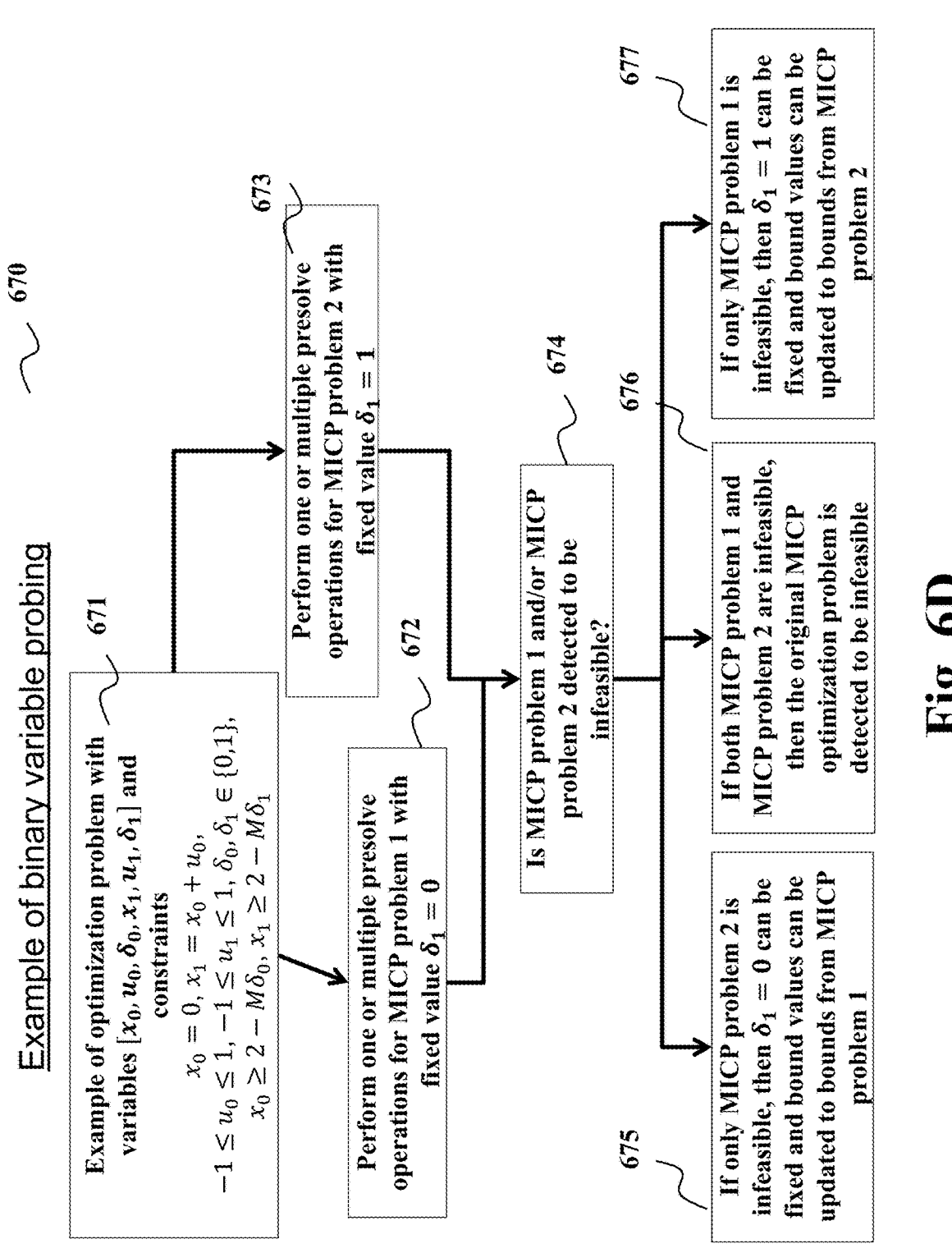
FIG. 6D illustrates an example of a binary variable probing procedure for MICP discrete optimization variables, which can be used in an iterative presolve-based correction procedure, according to some embodiments.

FIG. 6D illustrates an example of binary variable probing 670 for the MICP optimization problem 270, which can be used within a single presolve step 520 of an iterative presolve-based correction procedure 435, according to some embodiments of the invention. Some embodiments of the invention are based on the realization that binary variable probing 670 can result in additional fixings of discrete optimization variables and it can therefore increase the efficiency and/or it can reduce the computational cost of a single presolve step 520 of an iterative presolve-based correction procedure 435. In some embodiments of the invention, binary variable probing 670 can be used in combination with domain propagation for bound strengthening 600, in combination with redundant inequality constraint detection and dual fixing of variables 630, in combination with inequality constraint coefficient strengthening 650 and/or in combination with one or multiple other presolve operations within a single presolve step 520 of an iterative presolve-based correction procedure 435.

FIG. 6D shows an example of an MICP optimization problem with decision variables $[x_0, u_0, \delta_0, x_1, u_1, \delta_1]$, where the variables $\delta \in \{0,1\}$ and $\delta_1 \in \{0,1\}$ are binary decision variables, and including multiple equality constraints and multiple inequality constraints 671. In some embodiments of the invention, binary variable probing 670 selects a binary variable, e.g., $\delta_1 \in \{0,1\}$, and the procedure performs one or multiple presolve operations for an MICP subproblem 1 with fixed discrete value $\delta_1 = 0$ 672, and it additionally performs one or multiple presolve operations for an MICP subproblem 2 with fixed discrete value $\delta_1 = 1$ 673. Some embodiments of the invention are based on the realization that one or multiple presolve operations for MICP subproblem 1 672 and for MICP subproblem 2 673 can be used to detect MICP subproblem 1 and/or MICP subproblem 2 to be infeasible 674. If only MICP subproblem 2 is detected to be infeasible 674, then $\delta_1 = 0$ can be fixed 675 and bound values for each of the optimization variables and constraints can be updated to the bound values from the presolve operations for MICP subproblem 1 672. If only MICP subproblem 1 is detected to be infeasible 674, then $\delta_1 = 1$ can be fixed 677 and bound values for each of the optimization variables and constraints can be updated to the bound values from the presolve operations for MICP subproblem 2 673. If both MICP subproblem 1 and MICP subproblem 2 are detected to be infeasible 674, then the original MICP optimization problem is detected to be infeasible 676.

Some embodiments of the invention are based on the realization that binary variable probing 670 can be performed for one or multiple remaining free discrete variables in a single presolve step 520 of an iterative presolve-based correction procedure 435. In some embodiments of the invention, the number of binary variable probing 670 iterations is limited and the number of presolve operations in each iteration of binary variable probing 670 is limited, in order to limit the maximum computation time for the online variable fixing and optimal control solution procedure 420 and to allow for a real-time implementation of the predictive controller according to embodiments of the invention.

Some embodiments of the invention are based on the realization that one or multiple presolve operations within a single presolve step 520 of an iterative presolve-based correction procedure 435 can lead to an optimal control structured CP 440 that is computationally much cheaper to solve, due to a reduced number of optimization variables, a reduced number of constraints and/or a reduction in the feasible space of the optimization problem, for example, due to a combination of bound strengthening and constraint tightening.

Some embodiments of the invention are based on the realization that each iteration of the single presolve step 520 can comprise one or multiple tailored block-sparse presolve operations that exploit the block-structured sparsity of a mixed-integer optimal control problem (MIOCP) for performing the task defined by the problem parameters.

FIG. 7A is a pseudo code of block-sparse forward-backward operations to implement a domain propagation and bound strengthening procedure 600, which can be used within a single presolve step 520 of an iterative presolve-based correction procedure 435. The inputs 701 to the domain propagation procedure 700 can include the current bound values for each of the optimization variables and the constraints, as well as the block-sparse matrices and vectors in the MIOCP data. In some embodiments of the invention, one iteration of a block-sparse domain propagation procedure 700 consists of a forward domain propagation procedure 705 for each time step i=0, 1, . . . , N over the prediction time horizon and a backward domain propagation procedure 715 for each time step i=N−1, N−2, . . . , 0 over the prediction time horizon.

Let us use the compact notation for the optimization variables $z_i$, including all the state variables $x_i$, all the control input variables $u_i$ and all the discrete variables $\delta_i$ for each time step i=0, 1, . . . , N over the prediction time horizon. In some embodiments of the invention, each iteration of the forward domain propagation procedure 705 can use the affine inequality constraints $$l_i^c \le E_i z_i \le u_i^c \ \textbf{706}$$

to perform an optimization-based tightening of the bound values for each of the optimization variables $z_{i,j}$, j=1, . . . , $n_z$ for each time step i=0, 1, . . . , N over the prediction time horizon. Specifically, the affine inequality constraints $$l_i^c \le E_i z_i \le u_i^c \ \textbf{706},$$

in combination with the bound values $\underline{z}_i \le z_i \le \overline{z}_i$ and in combination with the constraints $z_{i,k} \in \{0,1\}$ for each of the binary variables k∈$B_i$, can be used to compute a minimum $\underline{z}_{i,j}$ 707 and a maximum $\overline{z}_{i,j}$ 708 bound value for each of the optimization variables $\underline{z}_{i,j}$, j=1, . . . , $n_z$ for each time step i=0, 1, . . . , N over the prediction time horizon. Some embodiments of the invention are based on the realization that the MIOCP subproblem can be detected to be infeasible if $\overline{z}_{i,j}-\underline{z}_{i,j}<-\in$ 709 for any of the optimization variables $z_{i,j}$, j=1, . . . , $n_z$ for each time step i=0, 1, . . . , N over the prediction time horizon.

In addition, each iteration of the forward domain propagation procedure 705 for each time step i=0, 1, . . . , N−1 over the prediction time horizon can use the state dynamic equality constraints $x_{i+1}=a_i+F_i z_i$ 710 to perform an optimization-based tightening of the bound values for each of the optimization variables $x_{j+1}$, j=1, . . . , $n_x$ for each time step i=0, 1, . . . , N−1 over the prediction time horizon. Specifically, the state dynamic equality constraints $x_{i+1}=a_i+F_i z_i$ 710, in combination with the bound values $\underline{x}_{i+1} \le x_{i+1} \le \overline{x}_{i+1}$, can be used to compute a minimum $\underline{x}_{i+1,j}$ and a maximum $\overline{x}_{i+1,j}$ 711 bound value for each of the optimization variables $x_{i+1,j}$, j=1, . . . , $n_x$ for each time step i=0, 1, . . . , N−1 over the prediction time horizon. Some embodiments of the invention are based on the realization that the MIOCP subproblem can be detected to be infeasible if $\overline{x}_{i+1,j}-\underline{x}_{i+1,j}<-\in$ 712 for any of the optimization variables $x_{i+1,j}$, j=1, . . . , $n_x$ for each time step i=0, 1, . . . , N−1 over the prediction time horizon.

In some embodiments of the invention, each iteration of the backward domain propagation procedure 715 can use the state dynamic equality constraints $x_{i+1}=a_i+F_i z_i$ 710 to perform an optimization-based tightening of the bound values for each of the optimization variables $z_{i,j}$, j=1, . . . , $n_z$ for each time step i=N−1, N−2, . . . , 0 over the prediction time horizon. Specifically, the state dynamic equality constraints $x_{i+1}=a_i+F_i z_i$ 710, in combination with the bound values $\underline{z}_i \le z_i \le \overline{z}_i$ and in combination with the constraints $z_{i,k} \in \{0,1\}$ for each of the binary variables k∈$B_i$, can be used to compute a minimum $\underline{z}_{i,j}$ 716 and a maximum $\overline{z}_{i,j}$ 717 bound value for each of the optimization variables $z_{i,j}$, j=1, . . . , $n_z$ for each time step i=N−1, N−2, . . . , 0 over the prediction time horizon. Some embodiments of the invention are based on the realization that the MIOCP subproblem can be detected to be infeasible if $\overline{z}_{i,j}-\underline{z}_{i,j}<-\in$ 718 for any of the optimization variables $z_{i,j}$, j=1, . . . , $n_z$ for each time step i=N−1, N−2, . . . , 0 over the prediction time horizon.

In some embodiments of the invention, the outputs of the domain propagation procedure can include the updated bound values $\underline{z}_i$ and $\overline{z}_i$ 719 for each time step i=0, 1, . . . , N over the prediction time horizon.

FIG. 7B is a pseudo code of an efficient block-sparse computation of optimization-based bound tightening 720 for MICP optimization variables, which can be used as an essential computational step in one or multiple presolve operations within a single presolve step 520 of an iterative presolve-based correction procedure 435. For example, in some embodiments of the invention, an efficient block-sparse computation of optimization-based bound tightening 720 can be used to compute a minimum $\underline{z}_{i,j}$ bound value 707-716 and a maximum $\overline{z}_{i,j}$ bound value 708-717 for each of the optimization variables $z_{i,j}$, j=1, . . . , $n_z$ for each time step i=0, 1, . . . , N over the prediction time horizon. The inputs 721 to the block-sparse computation of optimization-based bound tightening 720 can include the current bound values for each of the optimization variables and the constraints, as well as the block-sparse matrices and vectors in the MIOCP data.

Some embodiments of the invention are based on the realization that an efficient block-sparse computation of optimization-based bound tightening 720 considers each of the affine inequality constraints $$l_{i,k}^c \le E_{i,k,:} z_i \le u_{i,k}^c \quad 722$$

individually for k=1, 2, . . . , $n_c$, in order to compute updated bound values $$\underline{z}_{i,j}^+$$

and $$\bar{z}_{i,j}^+ \quad 726$$

for each of the optimization variables $z_{i,j}$, j=1, . . . , $n_z$ for each time step i=0, 1, . . . , N over the prediction time horizon. For each of the individual affine inequality constraints $$l_{i,k}^c \le E_{i,k,:} z_i \le u_{i,k}^c \quad 722$$

and for each of the optimization variables $z_{i,j}$, the efficient block-sparse computation of optimization-based bound tightening 720 computes intermediate bound values $\underline{d}_k$, $\bar{d}_k$ if $E_{k,j}>\in$ 723 or $\underline{d}_k$, $\bar{d}_k$ if $E_{k,j}<-\in$ 724 as illustrated in the pseudo code of FIG. 7B. Note that the intermediate bound values $\underline{d}_k=-\infty$, $\bar{d}_k=\infty$ if $|E_{k,j}|<\in$ 728, where $\in >0$ is defined as a small threshold value. In some embodiments of the invention, a rounding step 725 of the intermediate bound values $\bar{d}_k \leftarrow \lceil \underline{d}_k \rceil$ and $\bar{d}_k \leftarrow \lfloor d_k \rfloor$ is performed if the optimization variable $z_{i,j}$ is an integer variable, for example, if the optimization variable is a binary variable $z_{i,j} \in \{0,1\}$.

Some embodiments of the invention are based on the realization that the updated bound values $$\underline{z}_{i,j}^+ \text{ and } \bar{z}_{i,j}^+ \quad 726$$

are potentially conservative lower and upper bounds, respectively, for the minimum $\underline{z}_{i,j}$ bound value 707-716 and the maximum $\bar{z}_{i,j}$ bound value 708-717 for each of the optimization variables $z_{i,j}$, j=1, . . . , $n_z$ for each time step i=0, 1, . . . , N over the prediction time horizon 727. FIG. 7C is a pseudo code of block-sparse redundant inequality constraint detection and dual fixings 730 of MICP optimization variables, which can be used within a single presolve step 520 of an iterative presolve-based correction procedure 435, according to some embodiments. The inputs 731 to the block-sparse redundant inequality constraint detection and dual fixings 730 can include the current bound values for each of the optimization variables $\underline{z}_i$, $\bar{z}_i$ and the current bound values for each of the constraints $$l_i^c, u_i^c$$

for each time step i=0, 1, . . . , N over the prediction time horizon, as well as the block-sparse matrices and vectors in the MIOCP data.

In some embodiments of the invention, each iteration of the block-sparse redundant inequality constraint detection and dual fixings 730 procedure can use the affine inequality constraints $$l_i^c \le E_i z_i \le u_i^c \quad 732$$

to compute the intermediate bound values $\tilde{u}^c$ and $\tilde{l}^c$ as illustrated in 733 of the pseudo code of FIG. 7C. Some embodiments of the invention are based on the realization that the MIOCP can be detected to be infeasible 734 if either $$\min_k (\tilde{u}_k^c) < -\epsilon$$

or if $$\max_k (\tilde{l}_k^c) > \epsilon,$$

based on the computation of the intermediate bound values in 733. In some embodiments of the invention, each iteration of the block-sparse redundant inequality constraint detection and dual fixings 730 procedure can use the affine inequality constraints $$l_i^c \le E_i z_i \le u_i^c \quad 732$$

to compute another intermediate bound values $\tilde{u}^c$ and $\tilde{l}^c$ as illustrated in 735 of the pseudo code of FIG. 7C, which can be used to detect that the upper bound constraint is redundant 736 and/or to detect that the lower bound constraint is redundant 737, i.e., such that the corresponding constraint bound values can be updated to $$u_{i,k}^c \leftarrow \infty \text{ and/or } l_{i,k}^c \leftarrow -\infty,$$

respectively.

In some embodiments of the invention, each iteration of the block-sparse redundant inequality constraint detection and dual fixings 730 procedure can use the resulting nonredundant inequality constraints for a dual fixing step. For example, dual fixing can lead to fixing an optimization variable to its lower bound value 742 or to fixing an optimization variable to its upper bound value 743, if the optimization variable does not appear in any equality constraints, and it does not appear in a quadratic objective function and it appears with the same sign in all inequality constraints 741 as illustrated in the pseudo code of FIG. 7C. The outputs 745 from the block-sparse redundant inequality constraint detection and dual fixings 730 can include the updated bound values for each of the optimization variables $\underline{z}_i$, $\bar{z}_i$ and the updated bound values for each of the constraints $$l_i^c, u_i^c$$

for each time step i=0, 1, . . . , N over the prediction time horizon.

FIG. 7D is a pseudo code of block-sparse inequality constraint coefficient strengthening 750 corresponding to discrete optimization variables in the MICP problem 270, which can be used within a single presolve step 520 of an iterative presolve-based correction procedure 435, according to some embodiments. The inputs 751 to the block-sparse inequality constraint coefficient strengthening 750 can include the current bound values for each of the optimization variables $\underline{z}_i$, $\bar{z}_i$ and the current bound values for each of the constraints $$l_i^c, u_i^c$$

for each time step i=0, 1, . . . , N over the prediction time horizon, as well as the block-sparse matrices and vectors in the MIOCP data.

In some embodiments of the invention, each iteration of the block-sparse inequality constraint coefficient strengthening 750 procedure can use the affine inequality constraints $$l_i^c \le E_i z_i \le u_i^c \ 752$$

to compute the intermediate bound values $\tilde{u}^c$ and $\tilde{l}^c$ as illustrated in 753 of the pseudo code of FIG. 7D. Some embodiments of the invention are based on the realization that the block-sparse inequality constraint coefficient strengthening 750 can be performed for each of the integer or discrete optimization variables that is not yet fixed to a fixed value, i.e., $\|\bar{\delta}_{i,j} - \underline{\delta}_{i,j}\| > \in$ 754. In some embodiments of the invention, block-sparse inequality constraint coefficient strengthening 750 can be performed for each of the affine inequality constraints $$l_i^c \le E_i z_i \le u_i^c 752,$$

if either the lower bound is redundant $$l_{i,k}^c < -\epsilon_{max}$$

and the upper bound is non-redundant $$u_{i,k}^c < \epsilon_{max} 755,$$

or if the upper bound is redundant $$u_{i,k}^c > \epsilon_{max}$$

and the lower bound is non-redundant $$l_{i,k}^c > -\epsilon_{max} 760$$

instead.

If only the upper bound is non-redundant $$u_{i,k}^c < \epsilon_{max} 755,$$

then an intermediate value $\tilde{d}$ can be computed as illustrated in 756, which can be used to strengthen the inequality constraint coefficient value $D_{k,j}$ and the upper bound value $$u_{i,k}^c$$

as illustrated in 757-758 of the pseudo code of FIG. 7D, depending on whether $D_{k,j} > \in$ is positive or whether $D_{k,j} < -\in$ is negative, respectively. If only the lower bound is non-redundant $$l_{i,k}^c > -\epsilon_{max} 760,$$

then an intermediate value $\tilde{d}$ can be computed as illustrated in 761, which can be used to strengthen the inequality constraint coefficient value $D_{k,j}$ and the lower bound value $$l_{i,k}^c$$

as illustrated in 762-763 of the pseudo code of FIG. 7D, depending on whether $D_{k,j} > \in$ is positive or whether $D_{k,j} < -\in$ is negative, respectively. The outputs 765 from the block-sparse inequality constraint coefficient strengthening 750 can include the updated bound values for each of the constraints $$l_i^c, u_i^c$$

and constraint matrices $D_i$ for each time step i=0, 1, . . . , N over the prediction time horizon.

FIG. 7E is a pseudo code of a block-sparse binary variable probing procedure 770 for discrete optimization variables in the MICP problem 270, which can be used within a single presolve step 520 of an iterative presolve-based correction procedure 435, according to some embodiments. The inputs 771 to the block-sparse binary variable probing procedure 770 can include the current bound values for each of the optimization variables $\underline{z}_i, \bar{z}_i$ for each time step i=0, 1, . . . , N over the prediction time horizon, as well as the block-sparse matrices and vectors in the MIOCP data. Some embodiments of the invention are based on the realization that the block-sparse binary variable probing procedure 770 can be performed for each of the integer or discrete optimization variables that is not yet fixed to a fixed value, i.e., $\|\bar{\delta}_{i,j} - \underline{\delta}_{i,j}\| > \in$ for j=1, 2, . . . , $n_\delta$ and for each time step i=0, 1, . . . , N over the prediction time horizon 772.

In some embodiments of the invention, each iteration of the block-sparse binary variable probing procedure 770 performs probing of a binary optimization variable $\delta_{i,j} \in \{0,1\}$ to the lower bound value 775 and to the upper bound value 780, based on one or multiple forward-backward operations 777-782 of a domain propagation and bound strengthening procedure 700, in order to detect infeasibility 785 or to fix the binary optimization variable to the upper bound $\delta_{i,j}=1$ 786 or to fix the binary optimization variable to the lower bound $\delta_{i,j}=0$ 787.

In some embodiments of the invention, after probing a binary optimization variable $\delta_{i,j} \in \{0,1\}$ to the lower bound value 775, the block-sparse binary variable probing procedure 770 performs one or multiple iterations of presolve operations 777 to update intermediate bound values $$\underline{z}_i^1, \overline{z}_i^1$$

for each time step i=0, 1, . . . , N over the prediction time horizon. For example, each iteration 777 can include a forward-backward domain propagation and bound strengthening procedure 700, after which an infeasibility flag and an iteration number n←n+1 is updated 778. Some embodiments of the invention are based on the realization that the iterative procedure can continue until either insufficient progress is made from one iteration to a next iteration, until an infeasibility is detected by the presolve operations or until a maximum computation time is reached, for example, until $n \geq n_{probing}$ where $n_{probing}$ is a maximum iteration limit 776.

In some embodiments of the invention, after probing a binary optimization variable $\delta_{i,j} \in \{0,1\}$ to the upper bound value 780, the block-sparse binary variable probing procedure 770 performs one or multiple iterations of presolve operations 782 to update intermediate bound values $$\underline{z}_i^2, \overline{z}_i^2$$

for each time step i=0, 1, . . . , N over the prediction time horizon. For example, each iteration 782 can include a forward-backward domain propagation and bound strengthening procedure 700, after which an infeasibility flag and an iteration number n←n+1 is updated 783. Some embodiments of the invention are based on the realization that the iterative procedure can continue until either insufficient progress is made from one iteration to a next iteration, until an infeasibility is detected by the presolve operations or until a maximum computation time is reached, for example, until $n \geq n_{probing}$ where $n_{probing}$ is a maximum iteration limit 781.

Some embodiments of the invention are based on the realization that the MICP problem is detected to be infeasible 785 if an infeasibility is detected both after probing the binary optimization variable $\delta_{i,j} \in \{0,1\}$ to the lower bound 775 and after probing the binary optimization variable $\delta_{i,j} \in \{0,1\}$ to the upper bound 780. Some embodiments of the invention are based on the realization that the binary optimization variable can be fixed to the upper bound $\delta_{i,j}=1$ and all bound values can be updated to the intermediate bound values $$\underline{z}_i^2, \overline{z}_i^2$$

for each time step i=0, 1, . . . , N over the prediction time horizon 786, if an infeasibility is detected after probing the binary optimization variable $\delta_{i,j} \in \{0,1\}$ to the lower bound value 775. Some embodiments of the invention are based on the realization that the binary optimization variable can be fixed to the lower bound $\delta_{i,j}=0$ and all bound values can be updated to the intermediate bound values $$\underline{z}_i^1, \overline{z}_i^1$$

for each time step i=0, 1, . . . , N over the prediction time horizon 787, if an infeasibility is detected after probing the binary optimization variable $\delta_{i,j} \in \{0,1\}$ to the upper bound value 780. The outputs 788 from the block-sparse binary variable probing procedure 770 can include the updated bound values for each of the optimization variables $\underline{z}_i, \overline{z}_i$ for each time step i=0, 1, . . . , N over the prediction time horizon.

FIG. 7F is a pseudo code of a single block-sparse presolve step 790, based on one or multiple presolve operations, which can be used in an iterative presolve-based correction procedure 435, according to some embodiments. The inputs 791 to the block-sparse presolve step 790 can include the block-sparse matrices and vectors in the MIOCP problem data and possibly one or multiple flags to enable or disable one or multiple presolve operations, for example, a flag to enable or disable the block-sparse binary variable probing procedure 770. The outputs 795 from the block-sparse presolve step 790 can include an infeasibility detection flag, updated bound values for each of the optimization variables updated bound values for each of the constraints $$l_i^c, u_i^c$$

and updated constraint matrices $D_i$ for each time step i=0, 1, . . . , N over the prediction time horizon in the MIOCP problem data.

In some embodiments of the invention, a single block-sparse presolve step 790 is an iterative procedure 794 that can continue until either insufficient progress is made from one iteration to a next iteration, until an infeasibility is detected by the presolve operations or until a maximum computation time is reached, for example, until $n \geq n_{max}$ where $n_{max}$ is a maximum iteration limit 792. In some embodiments of the invention, each iteration of the single block-sparse presolve step 790 can include a forward-backward domain propagation and bound strengthening procedure 700, a block-sparse redundant inequality constraint detection and dual fixings 730, a block-sparse inequality constraint coefficient strengthening 750 and/or a block-sparse binary variable probing procedure 770. In some embodiments of the invention, the block-sparse binary variable probing procedure 770 is executed only if the MICP is not detected to be infeasible, a probing flag is enabled, insufficient progress is made from one iteration to the next and an iteration number is below a threshold value 793, in order to reduce the total computation time for the single block-sparse presolve step 790. In some embodiments of the invention, progress of a single block-sparse presolve step 790 from one iteration to the next iteration can be measured based on a tightening of one or multiple variable bounds from one iteration to the next iteration.

Figure 8A:
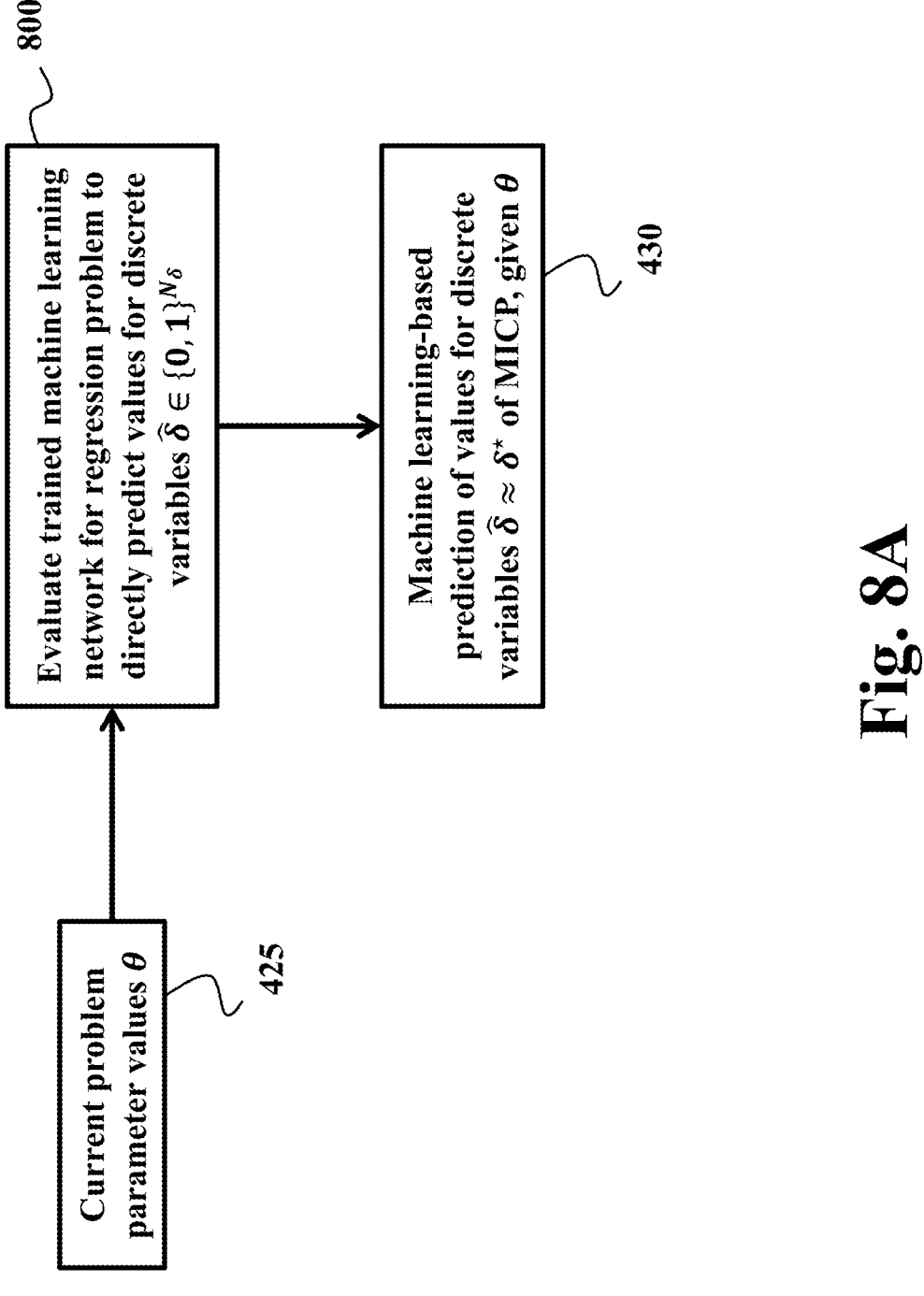
FIG. 8A illustrates a block diagram of a machine learning prediction method, based on regression to directly predict all discrete values of the MICP solution, according to some embodiments.

FIG. 8A illustrates a block diagram of a machine learning-based prediction method 800, based on regression to directly predict all discrete values $\hat{\delta} \approx \delta^* \in \{0,1\}^{N_\delta}$ 430 of the MICP solution, given the current problem parameter values $\theta$ 425, according to some embodiments of the invention.

In some embodiments of the invention, the supervised learning-based predictor 800 is trained 415 based on a regression problem, i.e., the predictor is trained to directly predict the optimal values of the discrete variables $$\hat{\delta}_i \approx \delta_i^\star$$

at each of the time steps i=0, 1, . . . , N in the prediction time horizon of the MIOCP. In some embodiments of the invention, the predictor is a recurrent neural network (RNN), e.g., consisting of one or multiple long short-term memory (LSTM) networks, gated recurrent units (GRUs) and/or one or multiple feedforward neural networks, with an input dimension that is equal to the number $n_\theta$ of problem parameter values 425 and an output dimension that is equal to the total number $N_\delta = N \times n_\delta$ of discrete variables in the prediction time horizon of the MIOCP.

For example, in some embodiments of the invention, the training loss for the regression problem can be a binary cross-entropy loss with logit activations applied to the output layer of a parametric function approximation architecture, e.g., a neural network. The resulting optimization problem, to compute network weights that minimize the training loss function, can be solved using stochastic gradient descent, Adam, AdaGrad, RMSProp or any other variant of gradient-based or gradient-free optimization algorithm. In some embodiments of the invention, the regression-based predictor 800 is used to fix only one or multiple of the discrete variables for which the learning-based predictor has relatively high confidence, such that a reduced MIOCP needs to be solved to compute the remaining free discrete variables, in order to compute a feasible but possibly suboptimal mixed-integer solution to the original high-dimensional MIOCP problem.

Figure 8B:
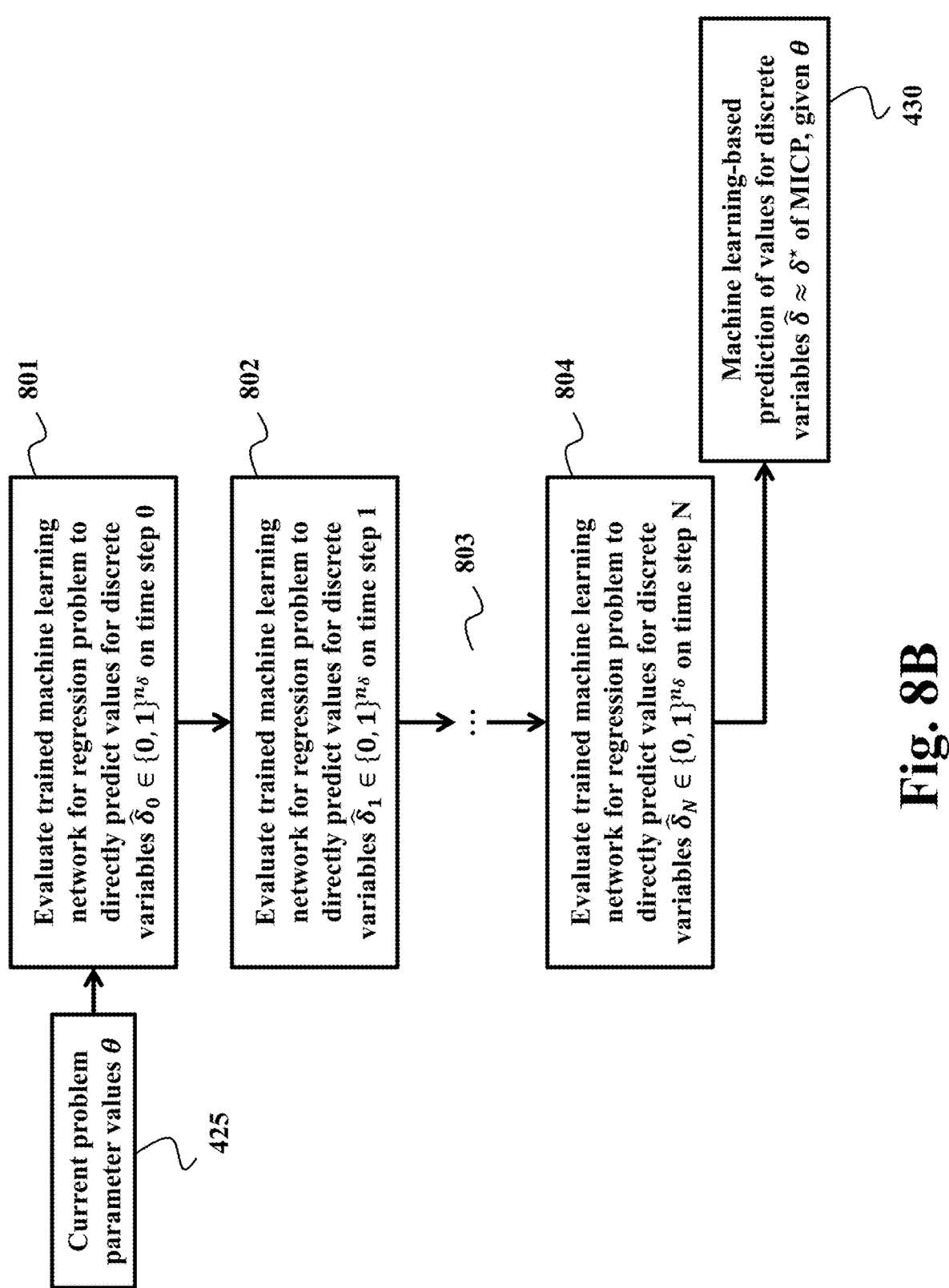
FIG. 8B illustrates a block diagram of a machine learning prediction with time decomposition method, based on regression to directly predict discrete values on one or multiple time steps of the MICP solution, according to some embodiments.

FIG. 8B illustrates a block diagram of a machine learning-based prediction with time decomposition method 801-804, based on regression to directly predict discrete values on one or multiple time steps of the prediction time horizon, i.e., $$\hat{\delta}_0 \approx \delta_0^\star \in \{0, 1\}^{n_\delta}, \hat{\delta}_1 \approx \delta_1^\star \in \{0, 1\}^{n_\delta}, \dots, \hat{\delta}_N \approx \delta_N^\star \in \{0, 1\}^{n_\delta} \mathbf{430}$$

of the MICP solution, given the current problem parameter values $\theta$ 425, according to some embodiments. In some embodiments of the invention, each machine learning-based prediction step provides a prediction of the discrete values at one time step in the prediction time horizon. In other embodiments of the invention, each machine learning-based prediction step provides a prediction of the discrete values at multiple consecutive time steps in the prediction time horizon.

Specifically, in some embodiments of the invention, the machine learning-based prediction 430 consists of multiple evaluations, either sequentially or in parallel, of a machine learning network for solving a regression problem in order to predict the values for discrete variables $\hat{\delta}_0 \in \{0,1\}^{n_\delta}$ on time step 0 801, in order to predict the values for discrete variables $\hat{\delta}_1 \in \{0,1\}^{n_\delta}$ on time step 1 802, and this procedure continues 803, until the prediction of the values for discrete variables $\hat{\delta}_N \in \{0,1\}^{n_\delta}$ on time step N 804. In some embodiments of the invention, the predictor for each of the time steps is an RNN, e.g., consisting of one or multiple LSTM networks, GRUs and/or one or multiple feedforward neural networks, with an input dimension that is equal to the number $n_\theta$ of problem parameter values 425 and an output dimension that is equal to the number $n_\delta$ of discrete variables in each time step of the prediction time horizon of the MIOCP.

Some embodiments of the invention are based on the realization that hidden states of a RNN architecture can be used as a memory in the machine learning-based prediction to encode the temporal structure of the discrete solution $$\delta_0^\star, \delta_1^\star, \dots, \delta_N^\star$$

of the MIOCP, given the problem parameter values $\theta$.

Some embodiments of the invention are based on the realization that a subset of the discrete variables can be fixed by a presolve-based correction method, starting from predicted values of a set of discrete variables in the MICP for which the learning-based predictor has relatively high confidence and, unless an infeasibility is detected by the iterative presolve-based correction, an approximation of the MICP with a reduced number of discrete optimization variables is solved subject to the constraints to produce a feasible motion trajectory with an updated set of fixed values for the subset of the discrete variables.

In some embodiments of the invention, an approximation of the MICP with a reduced number of discrete optimization variables can be solved using a branch-and-bound (B&B) optimization method in combination with one or multiple tailored block-sparse presolve operations that exploit the block-structured sparsity of a mixed-integer optimal control problem (MIOCP) for performing the task defined by the problem parameter values. The block-sparse presolve operations can be used to tighten a convex relaxation and/or to speedup solution of a convex relaxation in the root node of the B&B optimization method and/or in one or multiple nodes of the B&B search tree, by reducing the number of optimization variables and reducing the number of constraints and by tightening bound values for optimization variables and constraints.

In some embodiments of the invention, a first subset of discrete variables in the MICP are fixed to the predicted values outputted by the trained parametric function, a second subset of discrete variables in the MICP are fixed by a presolve-based correction to values that are uniquely defined by the fixed values for the first subset of discrete variables and the constraints, and a third subset of discrete variables in the MICP are selected to be free optimization variables, such that an approximation of the MICP with a reduced number of discrete optimization variables is solved subject to the constraints to produce a feasible motion trajectory, for example, using a B&B optimization method in combination with one or multiple tailored block-sparse presolve operations that exploit the block-structured sparsity of the MIOCP problem.

FIG. 8C illustrates a block diagram of a machine learning-based prediction method 820, based on classification to predict the probability of optimality and/or feasibility for one or multiple discrete values in a discrete optimizer set, i.e., for $\hat{\delta} \in \Delta \subset \{0,1\}^{N_\delta}$, which can be used to predict the values of the discrete variables $\hat{\delta} \approx \delta^\star \in \{0,1\}^{N_\delta}$ 430 of the MICP solution, given the current problem parameter values $\theta$ 425, according to some embodiments of the invention.

In some embodiments of the invention, the supervised learning-based predictor 820 is trained 415 based on a multi-class classification problem, i.e., the predictor is trained to select one or multiple of the best discrete values in a discrete optimizer set, i.e., $\hat{\delta}_i \in \Delta$ at each of the time steps i=0, 1, . . . , N in the prediction time horizon of the MIOCP. In some embodiments of the invention, the predictor is an RNN, e.g., consisting of one or multiple LSTMs, GRUs and/or one or multiple feedforward neural networks, with an input dimension that is equal to the number $n_\theta$ of problem parameter values 425 and an output dimension that is equal to the number $|\Delta|$ of unique discrete values in the training data set for all discrete variables $(\delta_0, \delta_1, . . . , \delta_N)$ in the prediction time horizon of the MIOCP.

For example, in some embodiments of the invention, the training loss for the multi-class classification problem can be a cross-entropy loss applied to the output layer of a parametric function approximation architecture, e.g., a neural network. The resulting optimization problem, to compute network weights that minimize the training loss function, can be solved using stochastic gradient descent, Adam, AdaGrad, RMSProp or any other variant of gradient-based or gradient-free optimization algorithm. In some embodiments of the invention, the classifier 820 is used to select one or multiple discrete solution candidates 460 corresponding to the highest confidence for feasibility and optimality, i.e., the highest values for each of the classes from the output layer of the network, and the iterative presolve-based correction method 462 can be used to potentially correct one or multiple of these discrete solution candidates, in order to compute a feasible but possibly suboptimal mixed-integer solution 255 to the high-dimensional MIOCP problem.

FIG. 8D illustrates a block diagram of a machine learning-based prediction with time decomposition method 821-824, based on classification to predict the probability for one or multiple discrete values in a discrete optimizer set on one or multiple time steps of the prediction time horizon, i.e., $\hat{\delta}_0 \in \Delta \subset \{0,1\}^{n_\delta}, \delta_1 \in \Delta \subset \{0,1\}^{n_\delta}, . . . , \delta_N \in \Delta \subset \{0,1\}^{n_\delta}$ 430 of the MICP solution, given the current problem parameter values $\theta$ 425, according to some embodiments. In some embodiments of the invention, each machine learning-based prediction step provides a prediction of the discrete values at one time step in the prediction time horizon. In other embodiments of the invention, each machine learning-based prediction step provides a prediction of the discrete values at multiple consecutive time steps in the prediction time horizon.

Some embodiments of the invention are based on the realization that a trained parametric function approximation architecture, e.g., a machine learning-based prediction model, can provide a probability or confidence level for one or multiple discrete values in a discrete optimizer set on one or multiple time steps of the prediction time horizon, such that the predicted values for the discrete variables 430 can be computed in order to maximize the probability or confidence level. In some embodiments of the invention, the predicted values 430 are selected based on sampling from a probability distribution, and the probability for each of the discrete values in the discrete optimizer set is equal to the probability or confidence level that is provided by the trained machine learning-based prediction model. Some embodiments of the invention are based on the realization that multiple discrete candidate solutions can be computed by sampling multiple times from the probability distribution that is provided by the trained multi-class classification network architecture for one or multiple discrete values in a discrete optimizer set on one or multiple time steps of the prediction time horizon.

Specifically, in some embodiments of the invention, the machine learning-based prediction 430 consists of multiple evaluations, either sequentially or in parallel, of a machine learning network for solving a multi-class classification problem in order to predict the discrete values in a discrete optimizer set $\delta_0 \in \Delta \subset \{0,1\}^{n_\delta}$ on time step 0 821, in order to predict the discrete values in a discrete optimizer set $\delta_1 \in \Delta \subset \{0,1\}^{n_\delta}$ on time step 1 822, and this procedure continues 823, until the prediction of the discrete values in a discrete optimizer set $\hat{\delta}_N \in \Delta \subset \{0,1\}^{n_\delta}$ 718 on time step N 824. In some embodiments of the invention, the predictor for each of the time steps is an RNN, e.g., consisting of one or multiple LSTM networks, GRUs and/or one or multiple feedforward neural networks, with an input dimension that is equal to the number $n_\theta$ of problem parameter values 425 and an output dimension that is equal to the number $|\Delta|$ of unique discrete values in the training data set for the discrete variables $\delta_i$ at one time step $i \in \{0, 1, . . . , N\}$ in the prediction time horizon of the MIOCP.

Some embodiments of the invention are based on the realization that the output dimension of the machine learning architecture for the multi-class classification can be reduced considerably based on the time decomposition as described in FIG. 8D, due to a reduction in the number of target class labels in supervised learning, which may result in improved sampling efficiency and/or improved performance of the machine learning-based predictor. For example, the maximum number of target class label values is $2^{(N+1)n_\delta}$, given $n_\delta$ discrete variables at each time step i=0, 1, . . . , N, which can be reduced to a maximum of $2^{n_\delta}$ target class label values per time step if the classifier provides a prediction of the discrete values at one time step in the prediction time horizon. In addition, some embodiments of the invention are based on the realization that the number $|\Delta|$ of unique discrete values can be considerably smaller than the theoretical maximum number of target class label values $|\Delta| < 2^{n_\delta}$, due to a sampling of problem parameter values that are representative of the optimal control problems which are of interest in practice and due to the constraints on feasibility of the MIOCP problem.

Some embodiments of the invention are based on the realization that hidden states of a RNN architecture can be used as a memory in the machine learning-based prediction to encode the temporal structure of the discrete solution $$\delta_0^*, \delta_1^*, . . . , \delta_N^*$$

of the MIOCP, given the problem parameter values $\theta$.

Figure 9A:
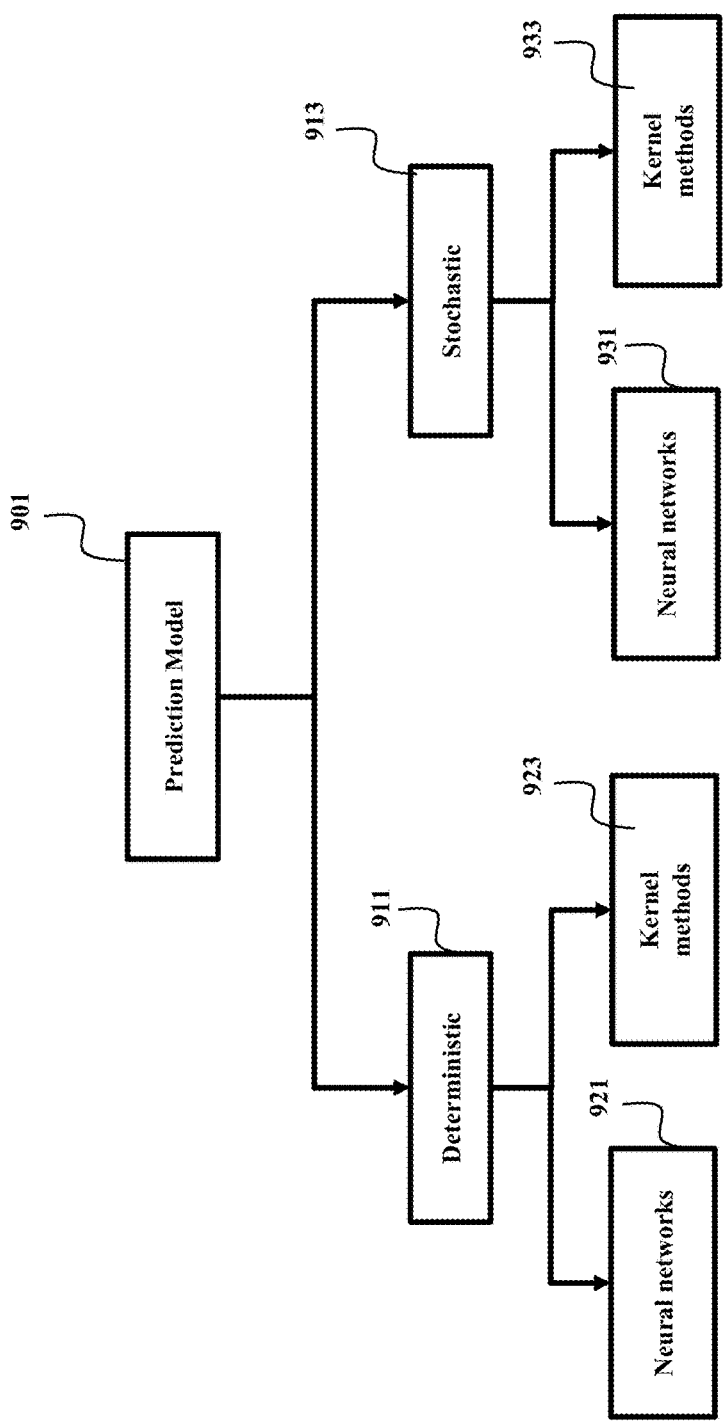
FIG. 9A illustrates examples of machine learning algorithms for the prediction model, according to some embodiments of the present disclosure.

FIG. 9A illustrates examples of machine learning algorithms that can be used to implement the prediction model, according to some embodiments of the present disclosure. In particular, FIG. 9A encapsulates various prediction models 901 that may be trained to generate predictions of solution values for the discrete optimization variables of the MICP problem. The prediction models may be deterministic 911 or stochastic 913 and may rely on neural architectures 921/931 or kernel representations 923/933. Examples of deterministic prediction models include multi-layer perceptrons, recurrent and/or convolutional neural networks 921, kernel regression and support vector machines 923, and the like. Examples of stochastic prediction models include Bayesian neural networks, neural processes 931, Gaussian processes, Kriging interpolation 933, and the like. One embodiment described in FIG. 9B uses a deep neural network as a prediction model.

Figure 9B:
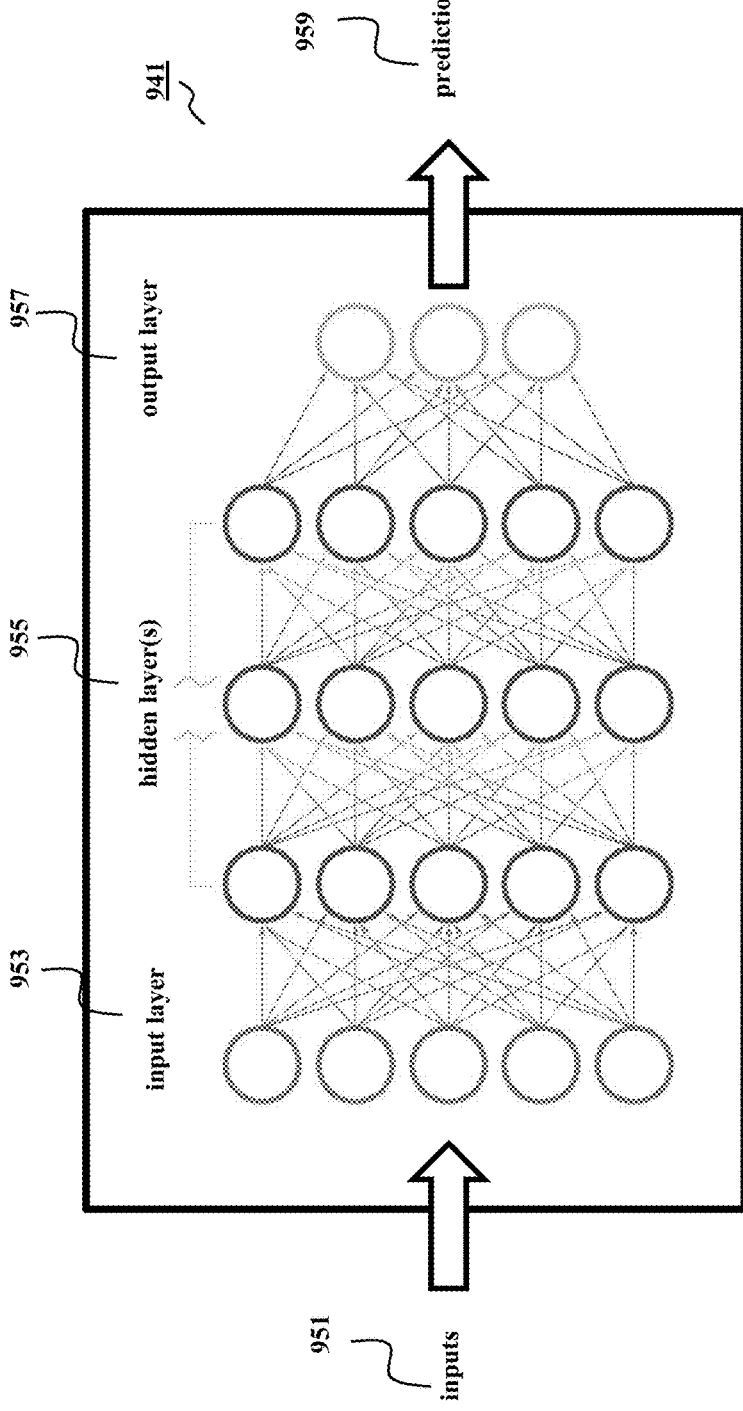
FIG. 9B illustrates a schematic of layers and signals involved in a deep neural network for the machine learning-based prediction model, according to some embodiments of the present disclosure.

FIG. 9B shows a schematic of layers and signals involved in a deep neural network 941, according to some embodiments of the present disclosure. From the data collected for training, an input signal 951 is provided to the deep neural network 941 through the input layer 953 which is typically a feature extraction layer and may be linear or comprise convolutional filters in order to automatically extract useful characteristics from the input signal 951. For a linear input layer, the transformation is linear, and the feature $$f_0 = W_0^\tau X + w_0 \quad (12a)$$

where $W_0$ and $w_0$ form the weights and biases of the input layer and $X$ is the input to the deep neural network 941. Consequently, the features are passed through multiple hidden layers 955 (typically larger than 2 for a deep neural network), and they are transformed via activation functions $\alpha(\cdot)$ such as rectified linear units (ReLUs), sigmoid functions, or modifications and combinations thereof. One can represent the operations occurring in the hidden layers using compositions of functions, where the output from the final hidden layer is given by $$f_n = \alpha_n \circ \ldots \circ \alpha_2 (W_2^\tau \alpha_1(W_1^\tau \alpha_0(f_0) + w_1) + w_2). \quad (12b)$$

The output layer 957 is used here for regression or multi-class classification and, for example, the output layer can be linear so the prediction output 959 becomes $$Y = W_\infty^\top f_n + w_\infty \quad (12c)$$

and training the deep neural network 941 involves solving an optimization problem to obtain good values of the weights and biases in the input layer 953, in the output layer 957 and in each of the hidden layers 955.

While common training methods for prediction models aim at minimizing the training error of the prediction model equally in every direction, some embodiments of the invention are based on the realization that the training error should be minimized primarily in directions that cannot be fixed by the iterative-presolve based correction method. Specifically, some embodiments of the invention are based on the realization that predictions by the trained machine learning network 430 for certain discrete optimization variables in the MICP problem can be trivially corrected by the iterative presolve method 435. Alternatively, other predictions by the trained machine learning network 430 for certain discrete optimization variables in the MICP problem cannot be corrected by the iterative presolve method 435, and therefore the training error with respect to the latter discrete optimization variables should be minimized primarily.

Figure 9C:
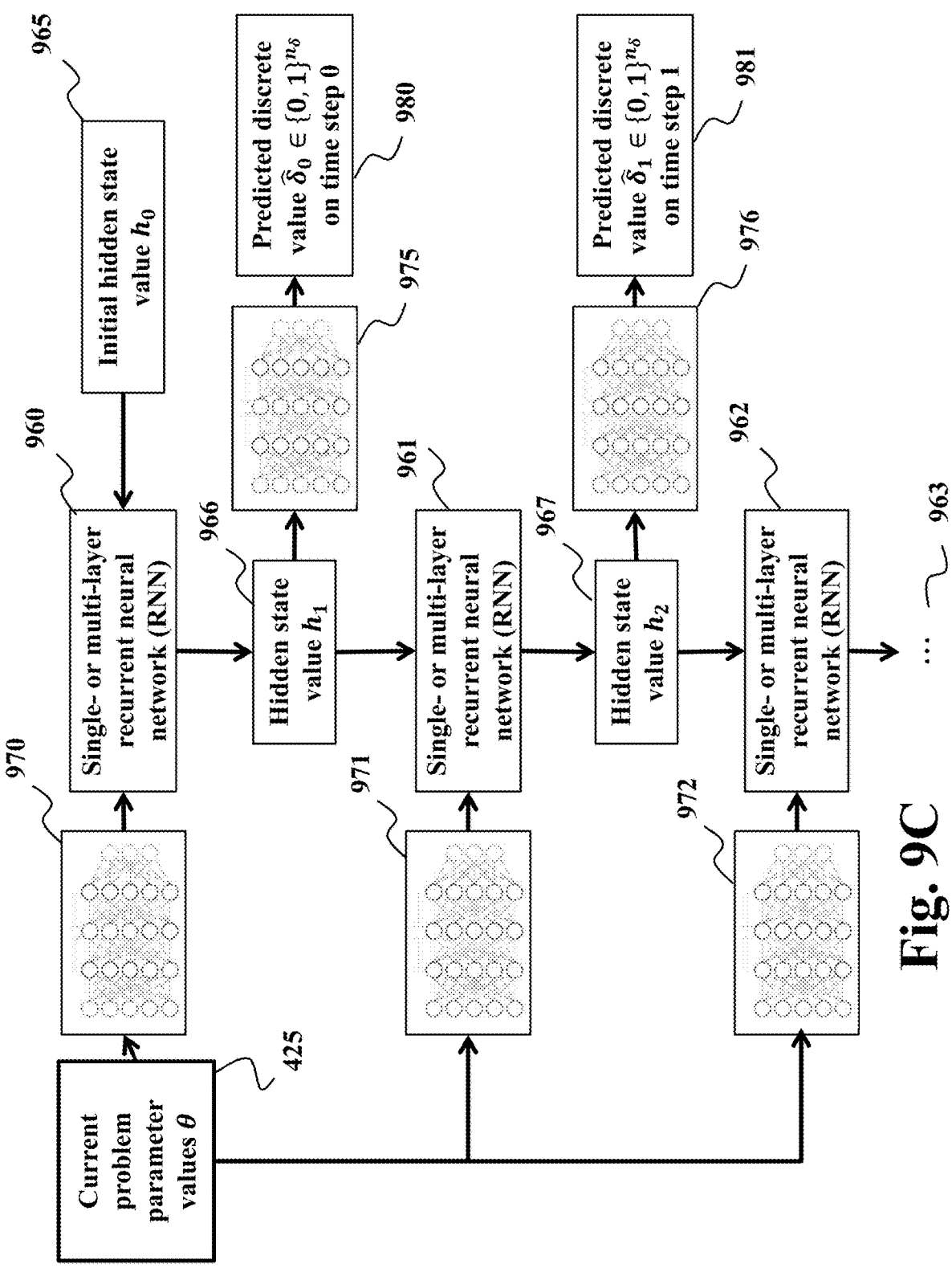
FIG. 9C illustrates a schematic of deep neural networks, hidden states and single- or multi-layer recurrent neural networks (RNNs) for the machine learning prediction with time decomposition method, according to some embodiments.

FIG. 9C illustrates a schematic of an example of a machine learning-based prediction model, using deep neural networks, hidden states and single- or multi-layer recurrent neural networks (RNNs) for the machine learning-based prediction with time decomposition method for the discrete MIOCP solution, according to some embodiments of the invention. The current problem parameter values $\theta$ are provided to one or multiple deep neural networks 970-971-972 in order to extract features that can be used by one or multiple single- or multi-layer RNN architectures 960-961-962. For example, given the feature inputs from the neural network 970 and given an initial hidden state value $h_0$ 965, a single- or multi-layer RNN 960 computes an updated hidden state value $h_1$ 966 that can be used, together with feature inputs from the neural network 971, by a single- or multi-layer RNN 961 to compute an updated hidden state value $h_2$ 967 that can again be used, together with feature inputs from the neural network 972, by a single- or multi-layer RNN 962 to compute updated hidden state values that are used by one or multiple additional single- or multi-layer RNN architectures 963. Each of the updated hidden state values 966-967 can be provided to a deep neural network 975-976 to compute the predicted discrete values $\hat{\delta}_i \in \{0,1\}^{n_\delta}$ 980-981 for each time step $i=0, 1, \ldots, N$ over the prediction time horizon of the MIOCP.

In some embodiments of the invention, each of the RNN architectures 960-961-962 is a single- or multi-layer LSTM- or GRU-based network. Some embodiments of the invention are based on the realization that each deep neural network for the feature extraction from the parameters 970-971-972 can be the same neural network with the same values for weights and biases. Similarly, some embodiments of the invention are based on the realization that each RNN 960-961-962 for each time step in the prediction time horizon can be the same RNN model with the same values for weights and biases. Finally, some embodiments of the invention are based on the realization that each deep neural network for the output computation from the hidden state values 975-976 can be the same neural network with the same values for weights and biases.

Figure 10A:
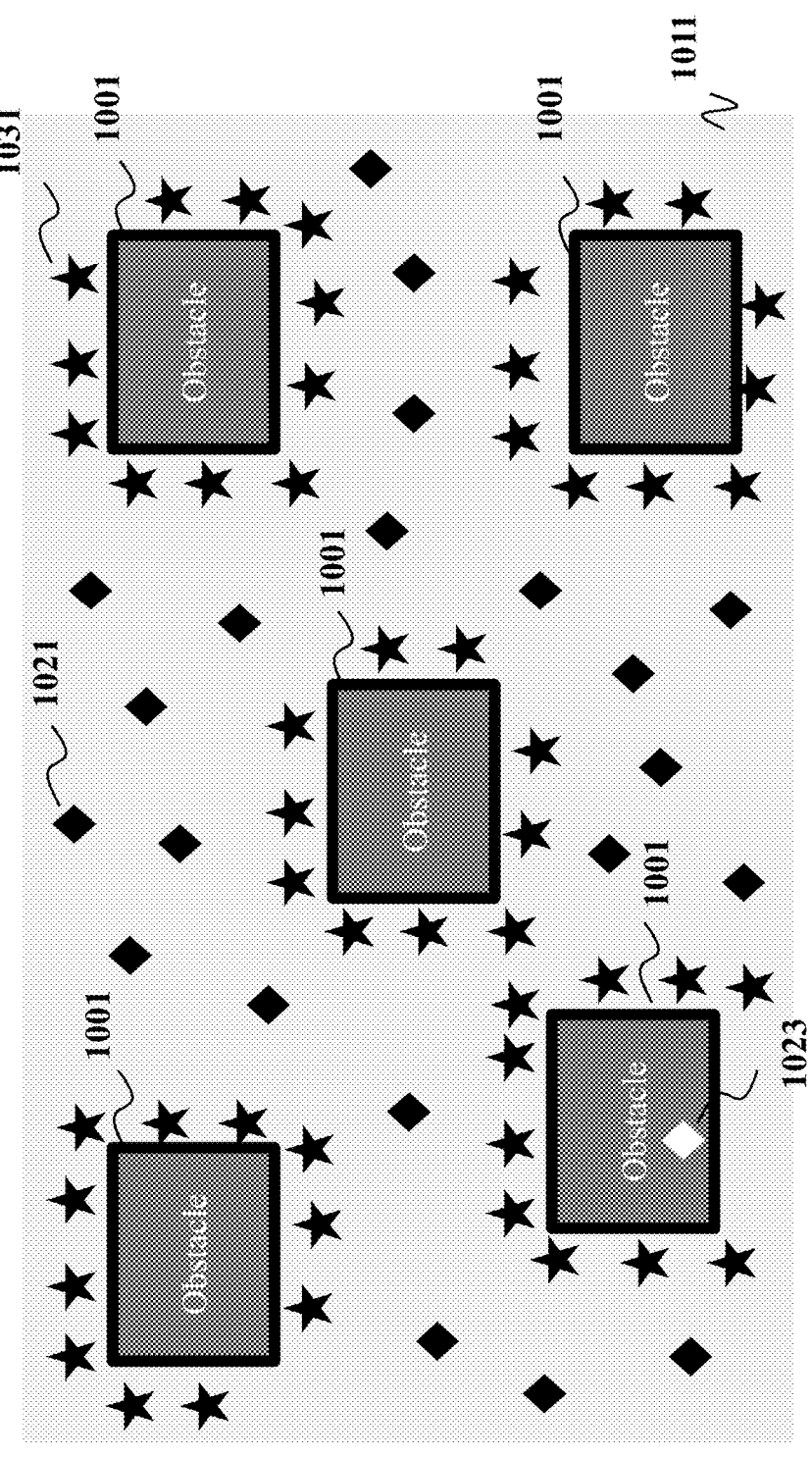
FIG. 10A illustrates a schematic for data generation using focused sampling of the problem parameters, according to some embodiments of the present disclosure.

FIG. 10A shows a schematic for offline data generation 400 using focused sampling, according to some embodiments of the present disclosure. In particular, FIG. 10A demonstrates the principle of focused sampling for collecting sampled problem parameter values. According to some embodiments, the focused sampler is based on the realization that it is required to generate more data samples with state values that are close, in position, to one or multiple obstacles 1001 within the environment 1011 of the controlled system. This enables to explicitly minimize the training loss in areas near the obstacles 1001, where the optimal control solution is likely to change rapidly, and possibly discontinuously, with respect to the initial states of the system. To this end, a multi-step sampling strategy is enacted, wherein a pre-defined number of initial samples 1021 are generated using a standard sampling methodology from which data tuples are extracted. Some examples of sampling methodologies include uniform distribution, sparse grids, or low-discrepancy sequences defined on the state-space of interest. Of these initial samples, some samples are infeasible as they are overlapping with the obstacles: these infeasible samples 1023 are removed from the dataset since they do not contribute to the training loss. After this first level of sampling, another set of samples that are focused near the obstacles are generated: these samples 1031 are drawn from a focused sampler. Some embodiments of focused samplers 1051 are described further with reference to FIG. 10B.

Figure 10B:
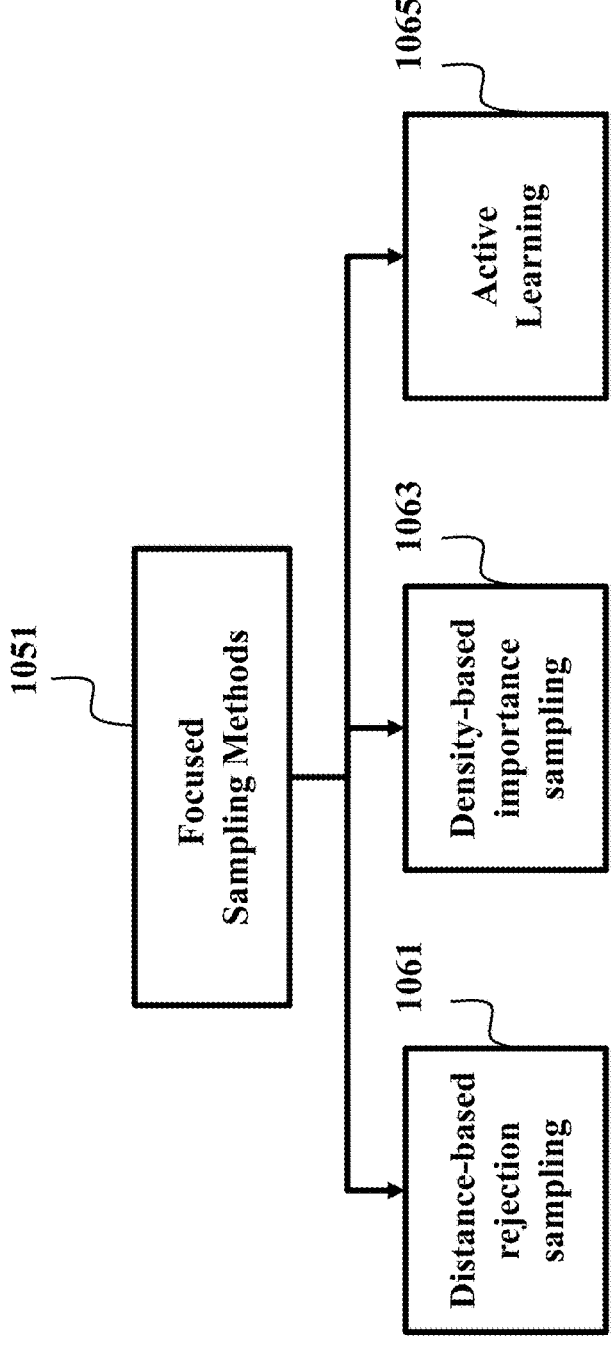
FIG. 10B illustrates examples of focused sampling methodologies for data generation, according to some embodiments of the present disclosure.

FIG. 10B shows various focused sampling methodologies, according to the embodiments of the present disclosure. One embodiment employs distance-based focused sampling, wherein the focused samples are generated by distance-based rejection sampling 1061. This involves generating a sample $$x_0^i$$

on the admissible state-space, determining whether $$x_0^i$$

is within a neighborhood of any obstacle based on a pre-defined neighborhood for a pre-defined distance metric, and rejecting the sample if it is outside the prescribed neighbor-hood. By performing rejection sampling repeatedly, the focused sampler generates $$x_0^j$$

that are biased to be positioned near to the obstacles. The sampled problem parameter values include a set of regular samples and a set of biased samples, where the set of biased samples are biased towards the constraint.

Another embodiment of the focused sampler involves density-based importance sampling 1063 from a distribution that is designed taking the obstacle positions into account. According to this embodiment, a distribution on the parameter space of interest is constructed such that the probability of selecting a data point increases as the focused sampler 1051 gets closer to an obstacle, for example. For instance, such a distribution can be generated efficiently via kernel-ized density estimation methods and extracting samples from such a skewed distribution automatically focuses samples on close proximity to the obstacle.

Another embodiment of focused sampling involves active learning 1065, wherein the initial set of training data is used for constructing a learner, which subsequently chooses the next batch of samples that contain the most useful information (for example, according to an entropy measure). By repeated learning and batch selection, the data collected will comprise focused parameter samples around the most informative regions of the parameter space.

Figure 11A:
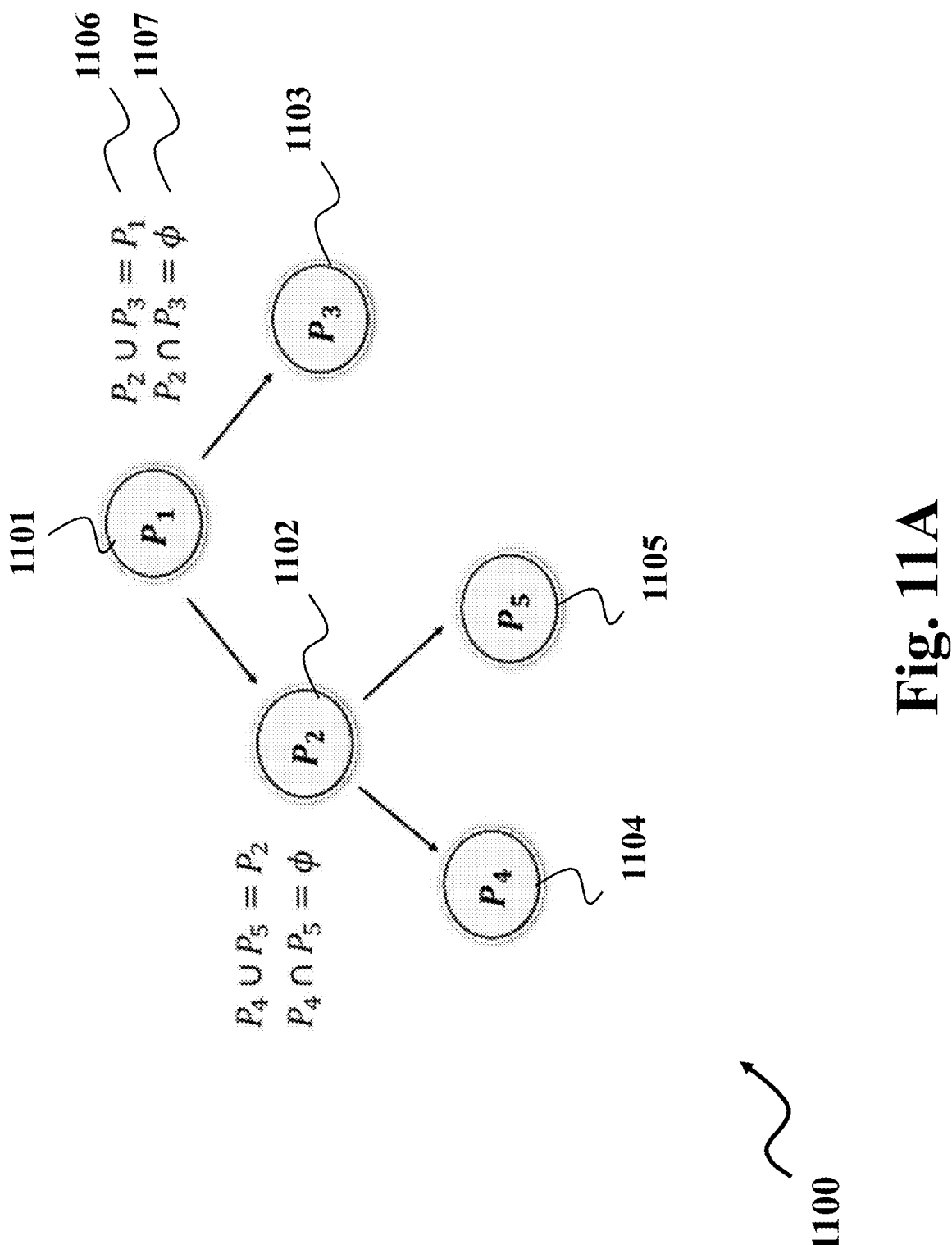
FIG. 11A illustrates a schematic of an example of a binary control variable search tree that represents a nested tree of search regions for the integer-feasible solution of the MICP for a sampled set of problem parameter values, according to some embodiments of the invention.

FIG. 11A illustrates a schematic of an example of a binary control variable search tree that represents a nested tree of search regions for the integer-feasible solution of an MICP subproblem, according to some embodiments of the invention. FIG. 11A shows a schematic representation of a branch-and-bound method, which can be used in the offline data generation step for training the machine learning-based predictor to implement the MIMPC controller in some embodiments of the invention, by showing the binary search tree 1100 at a particular iteration of the mixed-integer optimization algorithm to solve the MIOCP for a sampled set of values for the problem parameters. The main idea of a branch-and-bound (B&B) method is to sequentially create partitions of the original MICP problem and then attempt to solve those partitions, where each partition corresponds to a particular region of the discrete control variable search space. In some embodiments, a branch-and-bound method selects a partition or node and selects a discrete control variable to branch this partition into smaller partitions or search regions, resulting in a nested tree of partitions or search regions.

For example, the partition $P_1$ 1101 represents a discrete search region that can be split or branched into two smaller partitions or regions $P_2$ 1102 and $P_3$ 1103, i.e., a first and a second region that are nested in a common region. The first and the second region are disjoint, i.e., the intersection of these regions is empty $P_2 \cap P_3 = \phi$ 1107, but they form the original partition or region $P_1$ together, i.e., the union $P_2 \cup P_3 = P_1$ 1106 holds after branching. The branch-and-bound method then solves an integer-relaxed convex problem for both the first and the second partition or region of the search space, resulting in two solutions (local optimal solutions) that can be compared against each other as well as against the currently known upper bound value to the optimal objective value. The first and/or the second partition or region can be pruned if their performance metric is less optimal than the currently known upper bound to the optimal objective value of the MICP. The upper bound value can be updated if the first region, the second region or both regions result in a discrete feasible solution to the MICP. The branch-and-bound method then continues by selecting a remaining region in the current nested tree of regions for further partitioning.

While solving each partition may still be challenging, it is fairly efficient to obtain local lower bounds on the optimal objective value, by solving local relaxations of the mixed-integer program or by using duality. If the solution method for the MICP happens to obtain an integer-feasible solution while solving a local relaxation, the branch-and-bound method can then use it to obtain a global upper bound for the mixed-integer control solution of the MICP to find a feasible and (locally) optimal solution of the MIOCP for a sampled set of values for the problem parameters. This may help to avoid solving or branching certain partitions that were already created, i.e., these partitions or nodes can be pruned. This general algorithmic idea of partitioning can be repre-sented as a binary search tree 1100, including a root node, e.g., $P_1$ 1101 at the top of the tree, and leaf nodes, e.g., $P_4$ 1104 and $P_5$ 1105 at the bottom of the tree. In addition, the nodes $P_2$ 1102 and $P_3$ 1103 are typically referred to as the direct children of node $P_1$ 1101, while node $P_1$ 1101 is referred to as the parent of nodes $P_2$ 1102 and $P_3$ 1103. Similarly, nodes $P_4$ 1104 and $P_5$ 1105 are children of their parent node $P_2$ 1102.

Figure 11B:
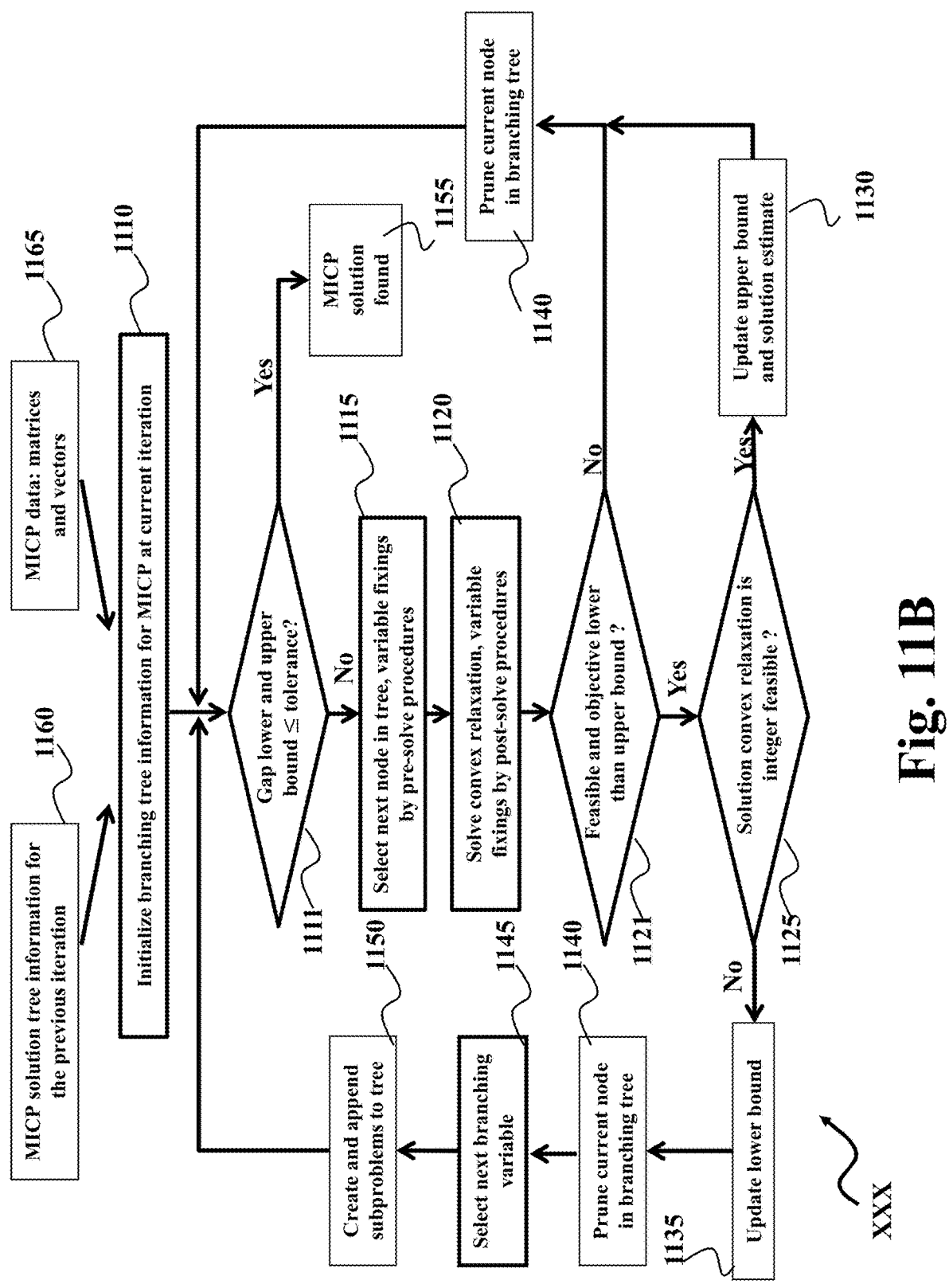
FIG. 11B illustrates a block diagram of a branch-and-bound mixed-integer optimization algorithm to search for the integer-feasible optimal solution of the MICP based on a nested tree of search regions and corresponding lower/upper bound values, according to some embodiments.

FIG. 11B illustrates a block diagram of a branch-and-bound optimization algorithm to search for the integer-feasible optimal solution of the MICP for a sampled set of problem parameter values, based on a nested tree of search regions and corresponding lower/upper bound values, according to some embodiments of the invention. The block diagram of a branch-and-bound mixed-integer optimization algorithm illustrated in FIG. 11B can be used in the offline data generation step for training the machine learning-based predictor to implement the MIMPC controller in some embodiments. The branch-and-bound method initializes the branching search tree information for the mixed-integer convex program (MICP) at the current control time step 1110, based on the MICP data 1165 that consists of matrices and vectors. The initialization can additionally use the branching search tree information and MICP solution infor-mation from the previous iteration 1160 in order to generate a warm started initialization for the current control time step 1110. The main goal of the optimization algorithm is to construct lower and upper bounds on the objective value of the MICP solution. At step 1111, if the gap between the lower and upper bound value is smaller than a particular tolerance value, then the mixed-integer optimal control solution 1155 is found.

As long as the gap between the lower and upper bound value is larger than a particular tolerance value at step 1111, and a maximum execution time is not yet reached by the optimization algorithm, then the branch-and-bound method continues to search iteratively for the mixed-integer optimal control solution of the MICP 1155 for a sampled set of problem parameter values. Each iteration of the branch-and-bound method starts by selecting the next node in the tree, corresponding to the next region or partition of the integer variable search space, with possible variable fixings based on pre-solve branching techniques 1115. After the node selection, the corresponding integer-relaxed convex problem is solved, with possible variable fixings based on post-solve branching techniques 1120.

If the integer-relaxed convex problem has a feasible solution, then the resulting relaxed control solution provides a lower bound on the objective value for that particular region or partition of the integer variable search space. At step 1121, if the objective is determined to be larger than the currently known upper bound for the objective value of the optimal mixed-integer control solution of the MICP, then the selected node is pruned or removed from the branching tree 1140. However, at step 1121, if the objective is determined to be lower than the currently known upper bound, and the relaxed control solution is integer feasible 1125, then the currently known upper bound and corresponding mixed-integer control solution estimate is updated at step 1130.

If the integer-relaxed convex problem has a feasible solution and the objective is lower than the currently known upper bound 1121, but the relaxed control solution is not yet integer feasible 1125, then the global lower bound for the objective can be updated 1135 to be the minimum of the objective values for the remaining leaf nodes in the branching tree and the selected node is pruned from the tree 1140. In addition, starting from the current node, a discrete variable with a fractional value is selected for branching according to a particular branching strategy 1145, in order to create and append the resulting auxiliary MICP subproblems, corresponding to sub-regions or partitions of the discrete search space of the original MICP, as children of that node in the branching tree 1150.

An important step in the branch-and-bound method is how to create the partitions, i.e., which node to select 1115 and which discrete variable to select for branching 1145. Some embodiments are based on branching one of the binary control variables with fractional values in the integer-relaxed convex problem solution. For example, if a particular binary control variable $U_{i,k} \in \{0,1\}$ has a fractional value as part of the integer-relaxed convex problem solution, then some embodiments create two partitions of the MICP subproblem by adding, respectively, the equality constraint $u_{i,k}=0$ to one subproblem and the equality constraint $u_{i,k}=1$ to the other subproblem. Some embodiments are based on a reliability branching strategy for variable selection 1145, which aims to predict the future branching behavior based on information from previous branching decisions.

Some embodiments are based on a branch-and-bound method that uses a depth-first node selection strategy, which can be implemented using a last-in-first-out (LIFO) buffer. The next node to be solved is selected as one of the children of the current node and this process is repeated until a node is pruned, i.e., the node is either infeasible, optimal or dominated by the currently known upper bound value, which is followed by a backtracking procedure. Instead, some embodiments are based on a branch-and-bound method that uses a best-first strategy that selects the node with the currently lowest local lower bound. Some embodiments employ a combination of the depth-first and best-first node selection approach, in which the depth-first node selection strategy is used until an integer-feasible control solution is found, followed by using the best-first node selection strategy in the subsequent iterations of the branch-and-bound based optimization algorithm. The latter implementation is motivated by aiming to find an integer-feasible control solution early at the start of the branch-and-bound procedure (depth-first) to allow for early pruning, followed by a more greedy search for better feasible solutions (best-first).

The branch-and-bound method continues iterating until either one or multiple of the following conditions have been satisfied:

The maximum execution time for the processor is reached.

All the nodes in the branching search tree have been pruned, such that no new node can be selected for solving convex relaxations or branching.

The optimality gap between the global lower and upper bound value for the objective of the MICP subproblem solution is smaller than the tolerance.

Figure 12A:
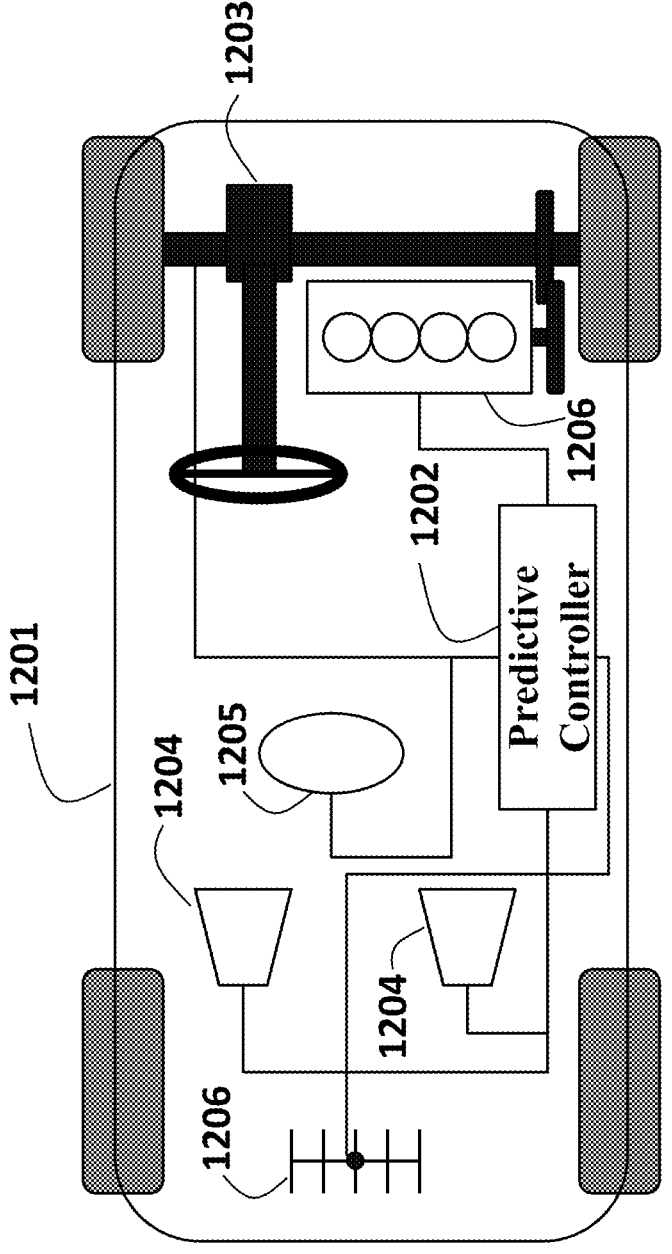
FIG. 12A illustrates a schematic of a vehicle including a predictive controller employing principles of some embodiments.

FIG. 12A illustrates a schematic of a vehicle 1201 including a predictive controller 1202 employing principles of some embodiments. As used herein, the vehicle 1201 can be any type of wheeled vehicle, such as a passenger car, bus, or rover. Also, the vehicle 1201 can be an autonomous or semi-autonomous vehicle. For example, some embodiments control the motion of the vehicle 1201. Examples of the motion include lateral motion of the vehicle controlled by a steering system 1203 of the vehicle 1201. In one embodiment, the steering system 1203 is controlled by the controller 1202. Additionally or alternatively, the steering system 1203 can be controlled by a driver of the vehicle 1201.

The vehicle can also include an engine 1206, which can be controlled by the controller 1202 or by other components of the vehicle 1201. The vehicle can also include one or more sensors 1204 to sense the surrounding environment. Examples of the sensors 1204 include distance range finders, radars, lidars, and cameras. The vehicle 1201 can also include one or more sensors 1205 to sense its current motion quantities and internal status. Examples of the sensors 1205 include global positioning system (GPS), accelerometers, inertial measurement units, gyroscopes, shaft rotational sensors, torque sensors, deflection sensors, pressure sensor, and flow sensors. The sensors provide information to the controller 1202. The vehicle can be equipped with a transceiver 1206 enabling communication capabilities of the controller 1202 through wired or wireless communication channels.

Figure 12B:
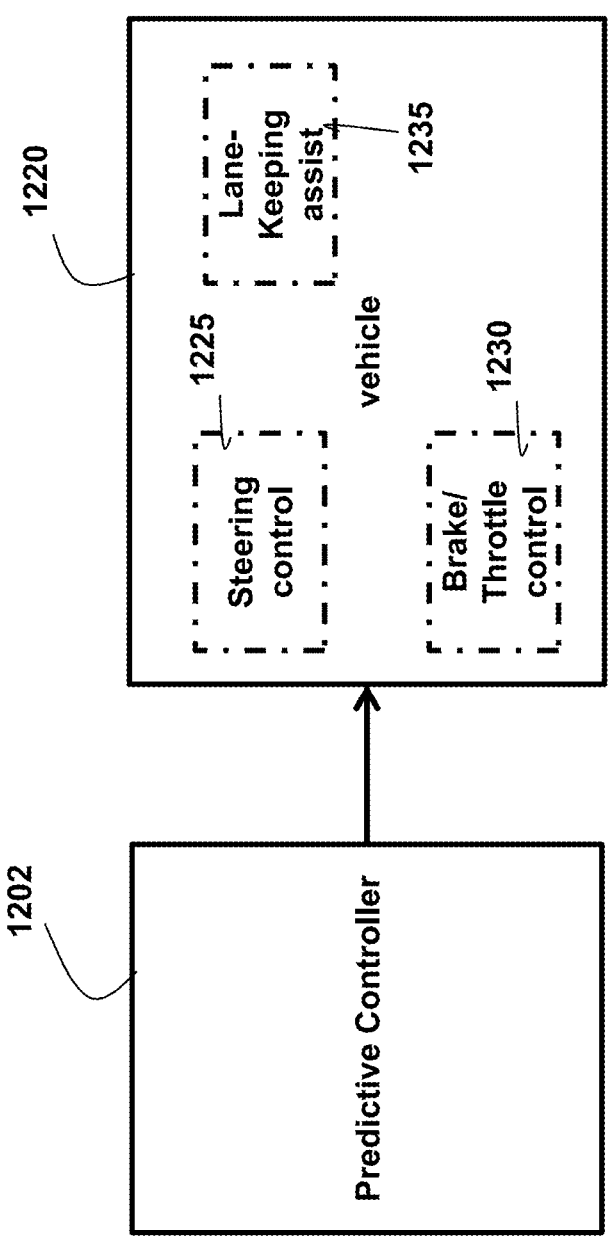
FIG. 12B illustrates a schematic of interaction between the predictive controller and other controllers of the vehicles, according to some embodiments.

FIG. 12B illustrates a schematic of interaction between the controller 1202, e.g., a mixed-integer model predictive controller (MIMPC) and other controllers 1220 of the vehicle 1201, according to some embodiments. For example, in some embodiments, the controllers 1220 of the vehicle 1201 are steering 1225 and brake/throttle controllers 1230 that control rotation and acceleration of the vehicle 1220, respectively. In such a case, the predictive controller 1202 outputs control inputs to the controllers 1225 and 1230 to control the state of the vehicle 1201. The controllers 1220 can also include high-level controllers, e.g., a lane-keeping assist controller 1235, that further process the control inputs of the predictive controller 1202. In both cases, the controllers 1220 use the outputs of the predictive controller 1202 to control at least one actuator of the vehicle 1201, such as the steering wheel and/or the brakes of the vehicle 1201, in order to control the motion of the vehicle 1201. Further, the predictive controller 1202 determines an input to the vehicle 1201 based on a mixed-integer optimal control solution, where the input to the vehicle 1201 includes one or a combination of an acceleration of the vehicle 1201, an engine torque of the vehicle 1201, brake torques, and a steering angle, and the discrete optimization variables to model one or a combination of discrete control decisions, switching in the system dynamics, gear shifting, and obstacle avoidance constraints.

Figure 12C:
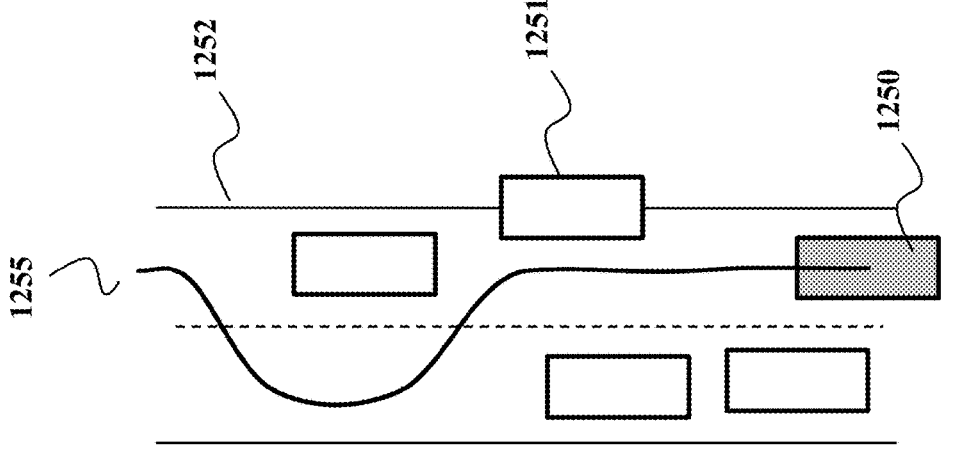
FIG. 12C illustrates a schematic of a path and/or motion planning method for a controlled vehicle employing principles of some embodiments.

FIG. 12C illustrates a schematic of a path and/or motion planning method for a controlled vehicle employing principles of some embodiments. Further, FIG. 12C illustrates a schematic of an autonomous or semi-autonomous controlled vehicle 1250 for which a dynamically feasible, and often optimal trajectory 1255 can be computed by using embodiments of the present disclosure. The generated trajectory aims to keep the vehicle within particular road bounds 1252, and aims to avoid other controlled and/or uncontrolled vehicles, i.e., these vehicles are obstacles 1251 for this particular controlled vehicle 1250. In some embodiments, each of the obstacles 1251 can be represented by one or multiple inequality constraints in a time or space formulation of the constrained mixed-integer convex programming problem, including one or multiple additional discrete variables for each of the obstacles. For example, based on embodiments configured to implement a mixed-integer model predictive controller, the autonomous or semi-autonomous controlled vehicle 1250 can make discrete decisions in real time such as, e.g., pass another vehicle on the left or on the right side or instead to stay behind another vehicle within the current lane of the road 1252, while additionally making continuous decisions in real time such as, e.g., the velocity, acceleration or steering inputs to control the motion of the vehicle 1250.

Figure 12D:
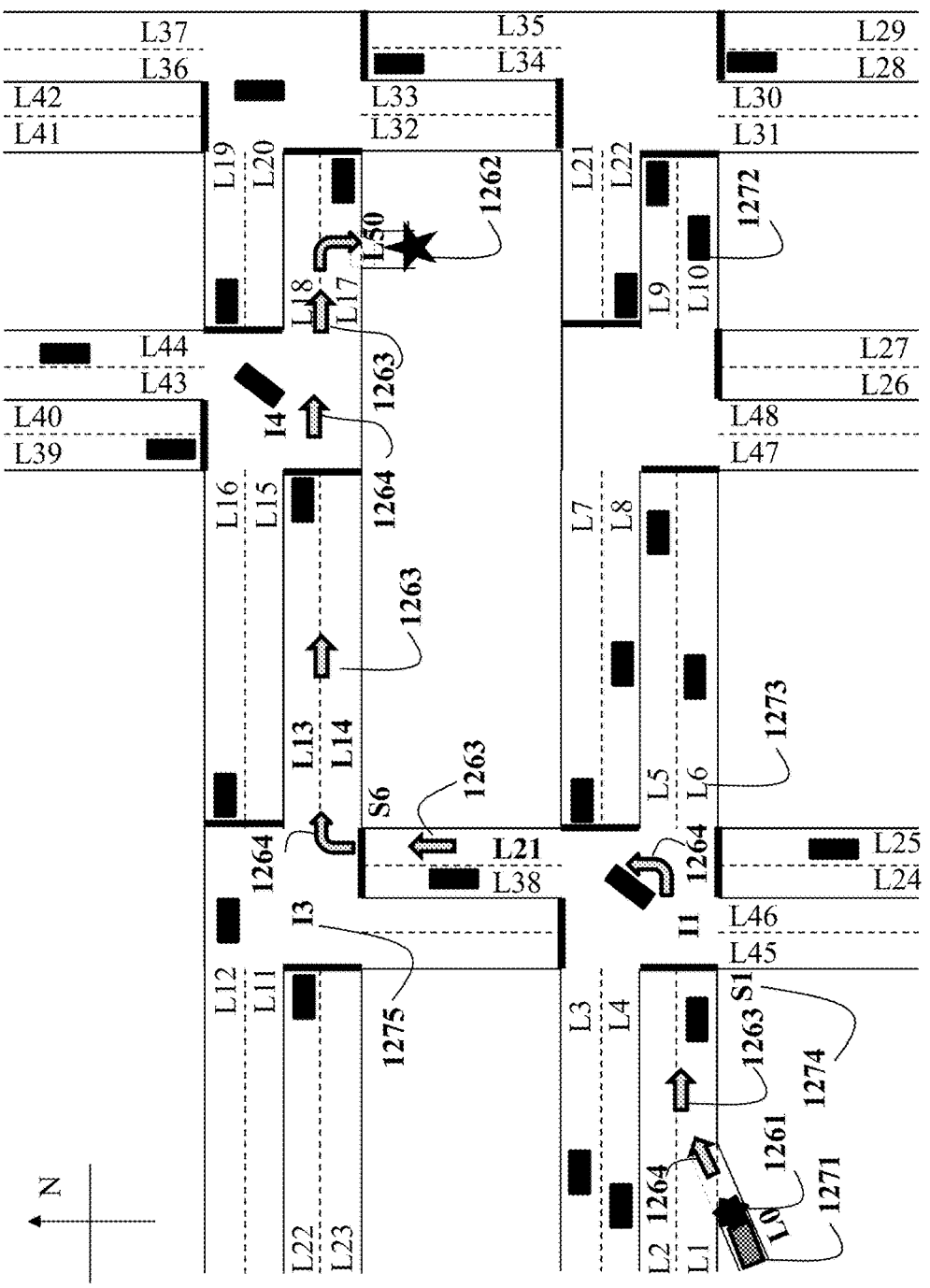
FIG. 12D illustrates an exemplary traffic scene for a single- or multi-vehicle decision making module based on some embodiments.

FIG. 12D illustrates an exemplary traffic scene for a single- or multi-vehicle decision making module based on some embodiments. The FIG. 12D depicts a scenario with one or multiple vehicles under control, referred to as an ego vehicle 1271, with the traffic composed of other vehicles shown similar to 1272, lanes marked for instance 1273 as L6, stop lines marked for instance 1274 as S1, intersections marked for instance 1275 as 13. For the vehicle in position 1261, with final destination 1262, a routing module provides the sequence of roads indicated by arrows 1263, and the sequence of turns indicated by arrows 1264. It should be noted however that the sequence of roads 1263 and the sequence of turns 1264 does not by itself specify a trajectory or a path for the vehicle. There are a number of discrete decisions to take such as in what lane the vehicle is to drive, if the vehicle should change lane or stay in the current lane, if the vehicle should start decelerating to stop at the stop line or not, if the vehicle is allowed to cross the intersection, and so on. Furthermore, there are a number of continuous decisions to make, such as the timed sequence of positions and orientations that the vehicle should achieve on the travel from its initial point to its destination. These decisions highly depend on the current traffic at the moment when the vehicle reaches the corresponding location, which is in general unknown to a routing module due to the uncertainty of traffic motion and uncertainty of the moment at which the vehicle will reach the location. In some embodiments of the present disclosure, a motion plan can be computed for one or multiple controlled ego vehicles 1271, possibly with communication to allow for coordination between the vehicles (V2V) and/or between a smart infrastructure system and the vehicles (V2X), by solving one or multiple connected mixed-integer convex programming problems.

Figure 13A:
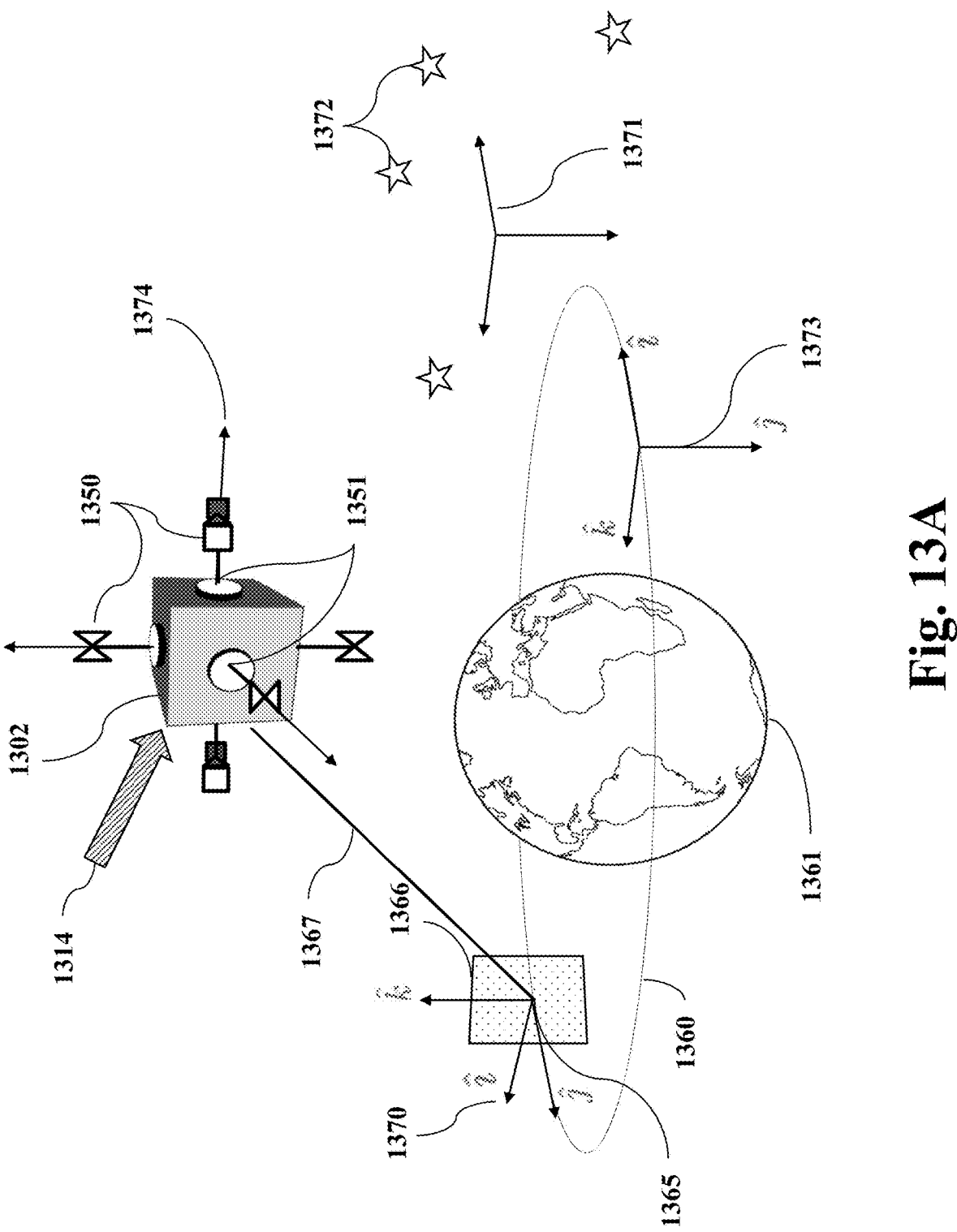
FIGS. 13A and 13B are schematics of the spacecraft mixed-integer predictive control problem formulation employing principles, according to some embodiments.
Figure 13B:
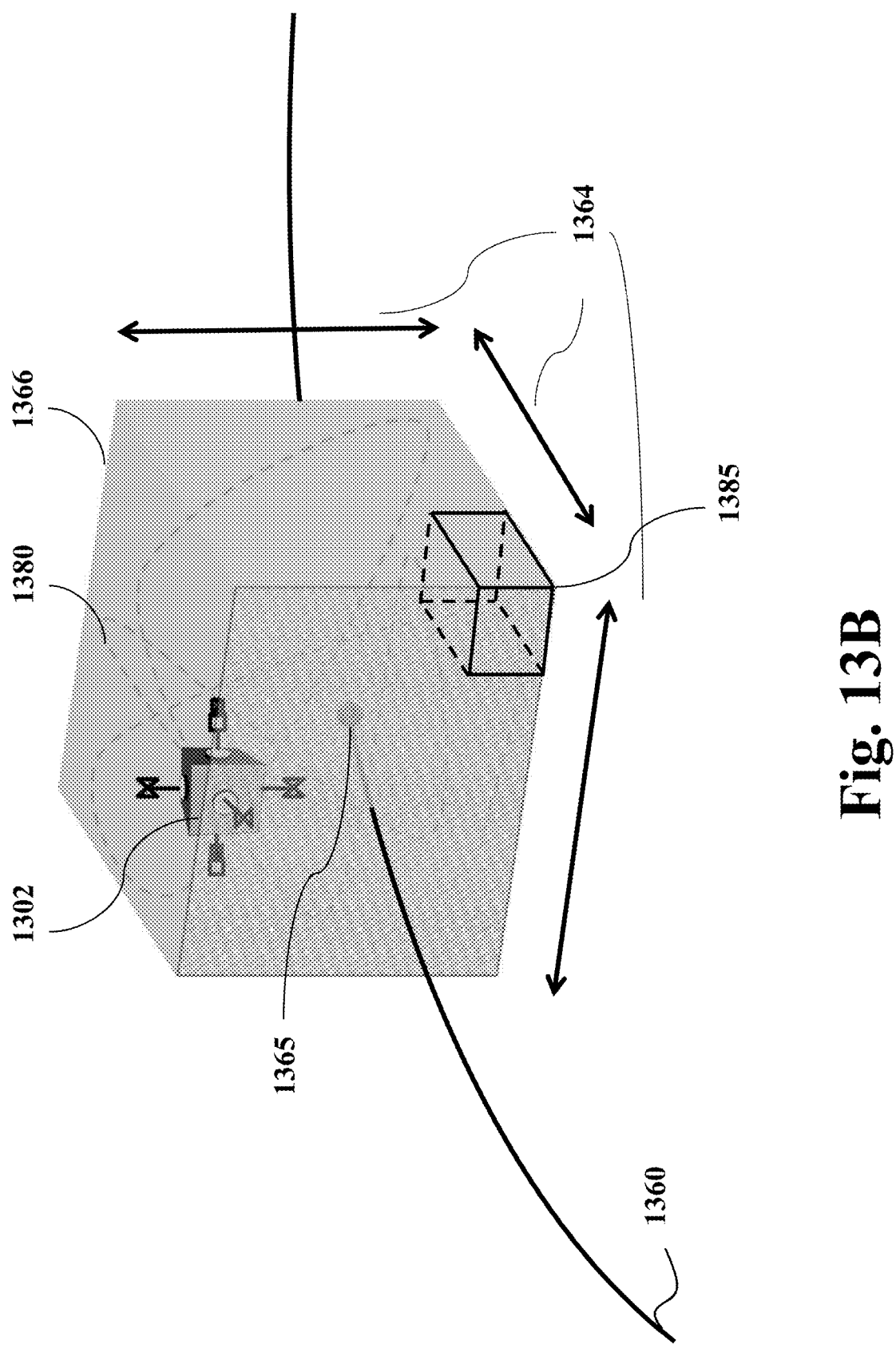

FIG. 13A and FIG. 13B are schematics of a spacecraft mixed-integer model predictive control problem formulation employing principles of some embodiments of the disclosure. More specifically, FIG. 13A and FIG. 13B illustrate a spacecraft 1302 equipped with a plurality of actuators such as thrusters 1350 and momentum exchange devices 1351. Examples of the type of momentum exchange devices include reaction wheels (RWs) and gyroscopes. The spacecraft 1302 is a vehicle, vessel, or machine designed to fly in outer space whose operation changes quantities such as the position of the spacecraft 1302, its velocities, and its attitude or orientation, in response to commands that are sent to the actuators. When commanded, the actuators impart forces on the spacecraft 1302 that increase or decrease the velocity of the spacecraft 1302 and thus cause the spacecraft 1302 to translate its position, and, when commanded, the actuators also impart torques on the spacecraft 1302, which cause the spacecraft 1302 to rotate and thereby change its attitude or orientation. As used herein, the operation of the spacecraft 1302 is determined by the operation of the actuators that determine a motion of the spacecraft 1302 that changes such quantities.

The spacecraft 1302 flies in outer space along an open or closed orbital path 1360 around, between, or near one or more gravitational bodies such as the Earth 1361, moon, and/or other celestial planets, stars, asteroids, comets. Usually, a desired or target position 1365 along the orbital path is given. A reference frame 1370 is attached to the desired position, where the origin of the frame, i.e., the all zeros coordinates in that reference frame are the coordinates of the desired position at all times.

The spacecraft 1302 is subject to various disturbance forces 1314. These disturbance forces can include forces that were not accounted for when determining the orbital path for the spacecraft 1302. These disturbance forces act on the spacecraft 1302 to move the spacecraft 1302 away from the desired position on the orbital path. These forces can include, but are not limited to, gravitational attraction, radiation pressure, atmospheric drag, non-spherical central bodies, and leaking propellant. Thus, the spacecraft 1302 can be at a distance 1367 away from the target position.

Because of the disturbance forces, it is not always possible to keep the spacecraft 1302 at the desired position along its orbit. As such, it is desired that the spacecraft 1302 instead remains within a window 1366 with specified dimensions 1364 around the desired position. To that end, the spacecraft 1302 is controlled to move along any path 1380 that is contained within the desired target window. In this example, the window 1366 has a rectangular shape, but the shape of the window can vary for different embodiments.

The spacecraft 1302 is also often required to maintain a desired orientation. For example, a spacecraft-fixed reference frame 1374 is required to be aligned with a desired reference frame such as an inertial reference frame 1371 that is fixed relative to distant stars 1372, or a reference frame 1373 that is always oriented in a manner that points towards the Earth. However, depending on the shape of the spacecraft 1302, different disturbance forces 1314 can act non-uniformly on the spacecraft 1302, thereby generating disturbance torques, which cause the spacecraft 1302 to rotate away from its desired orientation. In order to compensate for the disturbance torques, momentum exchange devices 1351 such as reaction wheels are used to absorb the disturbance torques, thus allowing the spacecraft to maintain its desired orientation.

So that the momentum exchange devices do not saturate, and thereby lose the ability to compensate for disturbance torques, their stored momentum must be unloaded, e.g., by reducing spin rates of the reaction wheels. Unloading the momentum exchange devices imparts an undesired torque on the spacecraft 1302. Such an undesired torque is also compensated for by the thrusters.

In some embodiments of the invention, using one or multiple equations to describe the linear or piecewise linear dynamics and/or convex constraints of the controlled system, the MIMPC controller determines an input to the spacecraft 1302 based on the mixed-integer optimal control solution, wherein the input to the spacecraft 1302 actuates one or a combination of thrusters and momentum exchange devices, and the discrete optimization variables are used to model one or a combination of discrete control decisions, switching in the system dynamics, integer values for the thruster commands, and obstacle avoidance constraints.

In some embodiments of the invention, the spacecraft 1302 can be modeled as a hybrid system, including both continuous and discrete elements of operation, and the commands that are sent to the actuators are computed using a mixed-integer model predictive controller (MIMPC). For example, in some embodiments, the commands that are sent to the thrusters 1350 can only take a discrete set of values, and therefore resulting into a set of binary or integer control input variables for each stage within the mixed-integer control horizon.

In some embodiments of the invention, the predictive controller is designed such that the spacecraft 1302 remains outside of a particular zone 1385 with specified dimensions, close to the desired position along the orbit. The latter zone can be either fixed in time or it can be time varying, and is often referred to as an exclusion zone 1385, for which the corresponding logic inequality constraints can be modeled using an additional set of binary or integer control input variables for each stage within the mixed-integer control horizon. In this example, the exclusion zone 1385 has a rectangular shape, and it is positioned in a corner of the desired window 1366, but the shape and position of the exclusion zone within the desired target window can vary for different embodiments.

Figure 14A:
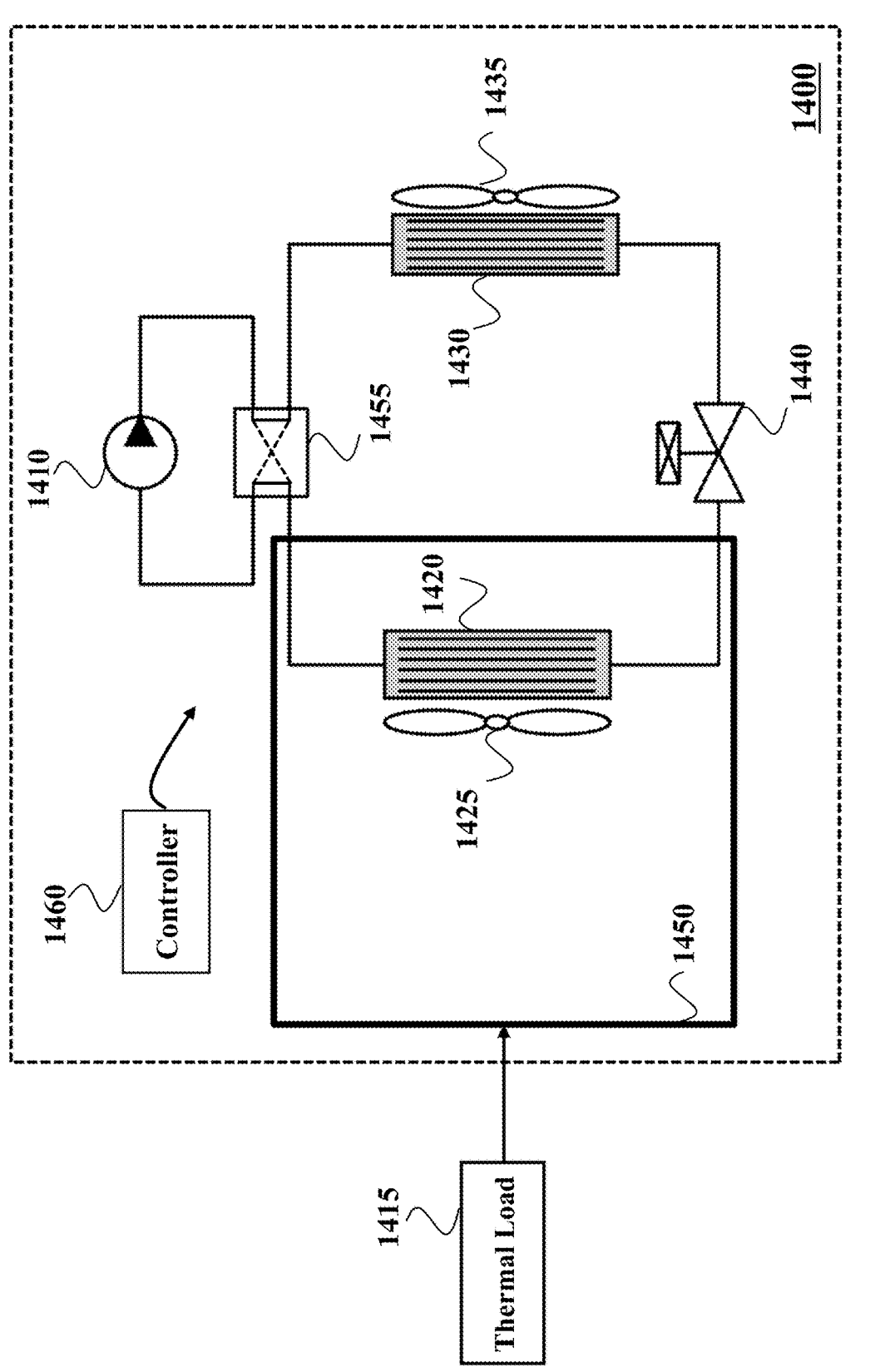
FIG. 14A illustrates a schematic of a vapor compression system controlled by a controller, according to some embodiments.

FIG. 14A illustrates a schematic of a vapor compression system 1400 controlled by a controller 1460, according to some embodiments. The controller 1460 includes a predictive controller, such as a controller implementing a mixed-integer model predictive control (MIMPC). The components of the vapor compression system (VCS) 1400 can include an indoor heat exchanger 1420 located in an indoor space or zone 1450, an outdoor unit heat exchanger 1430 located in the ambient environment, a compressor 1410 and an expansion valve 1440. A thermal load 1415 acts on the indoor space or zone 1450.

Additionally, the VCS 1400 can include a flow reversing valve 1455 that is used to direct high pressure refrigerant exiting the compressor to either the outdoor unit heat exchanger or the indoor unit heat exchanger, and direct low pressure refrigerant returning from either the indoor unit heat exchanger or outdoor unit heat exchanger to the inlet of the compressor. In the case where high pressure refrigerant is directed to the outdoor unit heat exchanger, the outdoor unit heat exchanger acts as a condenser and the indoor unit acts as an evaporator, wherein the system rejects heat from the zone to the ambient environment, which is operationally referred to as "cooling mode." Conversely, in the case where the high pressure refrigerant is directed to the indoor unit heat exchanger, the indoor unit heat exchanger acts as a condenser and the outdoor unit heat exchanger acts as an evaporator, extracting heat from the ambient environment and pumping this heat into the zone, which is operationally referred to as "heating mode."

Figure 14B:
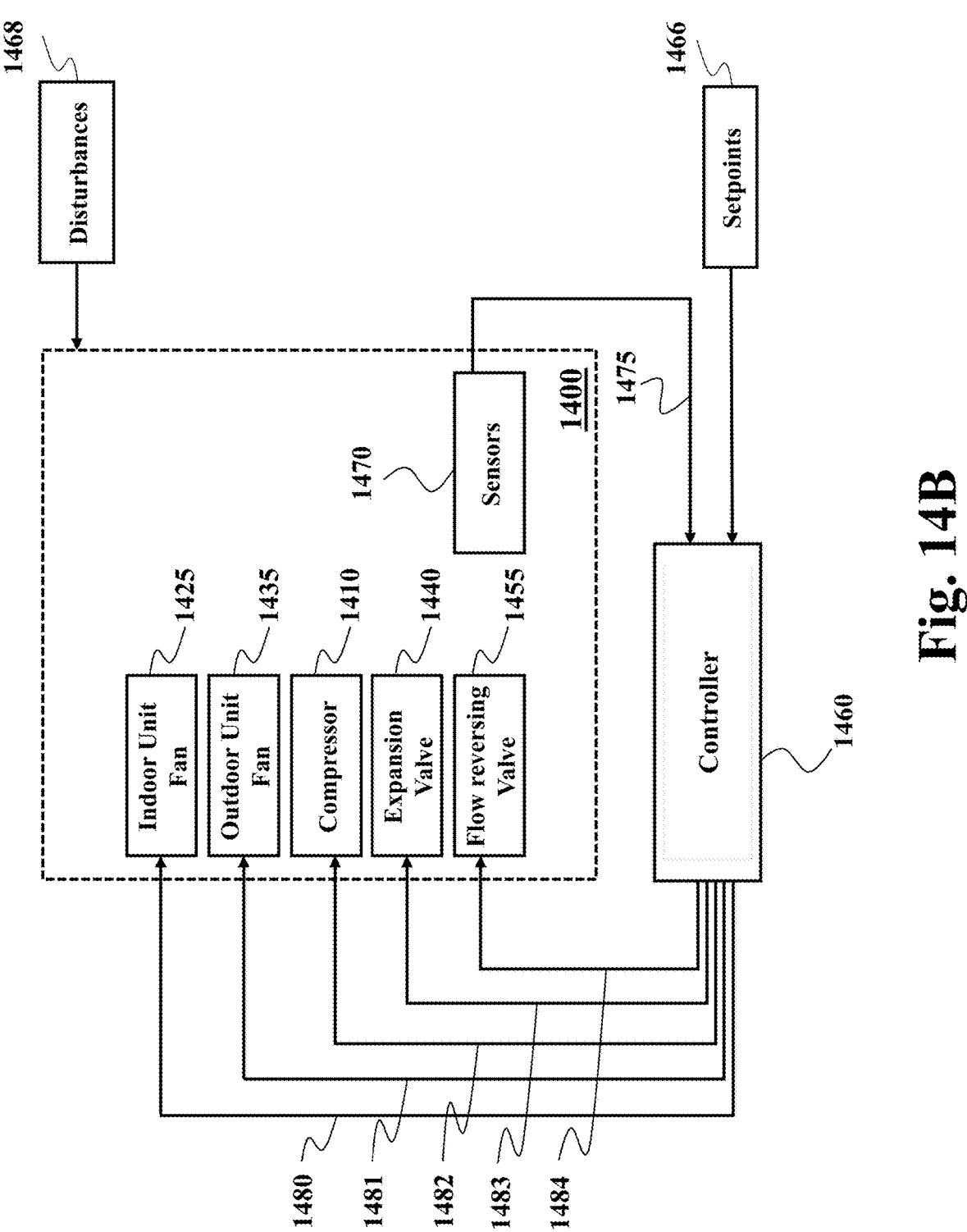
FIG. 14B illustrates an example of the configuration of signals, sensors, and controller used in the VCS, according to some embodiments.

FIG. 14B illustrates an example of the configuration of signals, sensors, and controller used in the VCS 1400, according to some embodiments. A controller 1460 reads information from sensors 1470 configured to measure various temperatures, pressures, flow rates or other information about the operation of the system, including measurable disturbances such as the ambient air temperature. The controller 1460 can be provided with setpoints 1466 that represent desired values of measured signals of the process such as a desired zone temperature. Setpoint information can come from a thermostat, wireless remote control, or internal memory or storage media. The controller then computes control inputs such that some measured outputs are driven to their setpoints. These control inputs can include an indoor unit fan speed 1480, an outdoor unit fan speed 1481, a compressor rotational speed 1482, an expansion valve position 1483, and a flow reversing valve position 1484. In this manner, the controller controls operation of the vapor compression system such that the setpoint values are achieved in the presence of disturbances 1468, such as a thermal load, acting on the system.

In some embodiments, the VCS 1400 can be modeled as a hybrid system, including both continuous and discrete elements of operation, and the commands that are sent to the actuators are computed using a predictive controller, such as the mixed-integer model predictive controller (MIMPC). For example, in some embodiments, the commands that are sent to the valves and/or the fans can only take a discrete set of values, and therefore resulting into a set of binary or integer control input variables for each stage within the mixed-integer control horizon.

In some embodiments, the predictive controller determines an input to the vapor compression system based on the mixed-integer optimal control solution, wherein the input to the vapor compression system includes one or a combination of an indoor unit fan speed, an outdoor unit fan speed, a compressor rotational speed, an expansion valve position, and a flow reversing valve position, and the discrete optimization variables are used to model one or a combination of discrete control decisions, switching in the system dynamics, and integer values for the commands that are sent to the valves and/or to the fans.

In some embodiments, the dynamic behavior of the VCS 1400 can change rapidly or even switch at certain time instances, depending on the current state of the system and the current control input values. The resulting hybrid VCS 1400 with switching dynamics can be modeled using an additional set of binary or integer control input variables for each stage within the mixed-integer control horizon.

Figure 15:
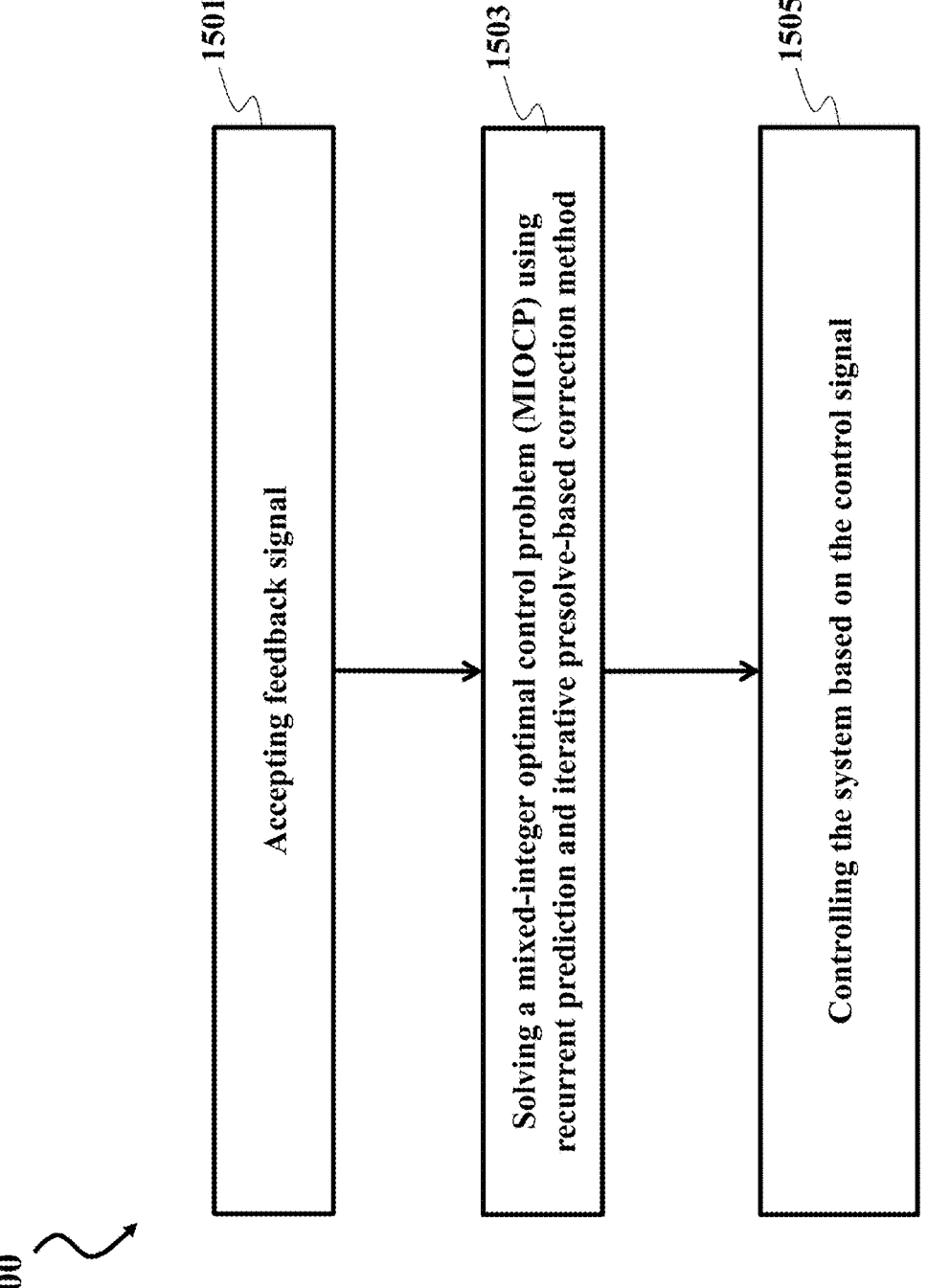
FIG. 15 illustrates a method for controlling a system, according to an example embodiment.

FIG. 15 illustrates a method 1500 for controlling a system, according to an example embodiment. At step 1501, the method includes accepting feedback signal including measurements of the problem parameters, for example, including a state of the system and/or a state of the system's environment. At step 1503, the method includes solving a mixed-integer optimal control problem (MIOCP) using a recurrent machine learning-based prediction and iterative presolve-based correction method that searches for a feasible and (locally) optimal solution of the mixed-integer convex programming (MICP) problem. At step 1505, controlling the system based on the control signal to change the state of the system.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A controller for controlling a motion of a device to perform a task changing a state of the device subject to constraints, the controller comprising: a processor; and a memory having instructions stored thereon that, when executed by the processor, cause the controller to:

collect parameters of the task, including the state of the device;

input the parameters of the task to evaluate a parametric function trained to output predicted values for a set of discrete variables in a mixed-integer convex programming (MICP) problem for performing the task defined by the parameters;

fix a first subset of discrete variables in the MICP to the predicted values outputted by the trained parametric function;

perform a presolve-based correction configured to update at least some of the predicted values of a remaining subset of discrete variables in the MICP to values that are uniquely defined by the fixed values for the first subset of discrete variables and the constraints;

transform the MICP into a convex programming (CP) problem, based on the fixed values of the first subset of discrete variables and the updated values of the remaining subset of discrete variables;

solve the CP problem subject to the constraints to produce a feasible motion trajectory for performing the task defined by the parameters;

command the device to change the state according to the motion trajectory, wherein to perform the presolve-based correction, the controller iteratively selects discrete variables to the first subset and updates the predicted values in the remaining subset of discrete variables until either an infeasibility is detected or until values for all discrete variables are fixed allowing to transforming the MICP into the CP problem;

if the infeasibility is detected, execute a backup control solution to change the state of the device; and otherwise, if the values for all discrete variables are fixed, solves the CP problem subject to the constraints to produce the feasible motion trajectory.

2. The controller of claim 1, wherein the parametric function is trained to output the predicted values for the set of discrete variables at a single time step or at multiple consecutive time steps in a prediction time horizon of the MICP.

3. The controller of claim 1, wherein the parametric function is evaluated once or multiple times to produce multiple predicted values for each discrete variable in the set of discrete variables in the MICP, resulting in multiple candidate discrete solutions;

wherein the controller performs the presolve-based correction for each candidate discrete solution to transform the MICP into multiple CP problems and determine multiple motion trajectories, and wherein the controller is further configured to select the feasible motion trajectory for performing the task from the multiple motion trajectories.

4. The controller of claim 3, wherein the feasible motion trajectory is selected from the multiple motion trajectories to be an optimal motion trajectory with the lowest objective value in a minimization problem, or the largest objective value in a maximization problem.

5. The controller of claim 3, wherein the parametric function is trained, based on a multi-class classification approach, to output a probability or confidence level for each of the predicted values of each discrete variable in the set of discrete variables, wherein the first subset of discrete variables is selected based on the probability or confidence level of the predicted values.

6. The controller of claim 5, wherein multiple values of each of the discrete variables in the MICP are selected to maximize the probability or confidence level that is outputted by the trained parametric function for each set of predicted values of the discrete variables.

7. The controller of claim 5, wherein multiple values of each of the discrete variables in the MICP are produced by sampling a probability distribution at a single time step or at multiple consecutive time steps in the prediction time horizon, and the probability for each set of fixed values of the discrete variables in a discrete optimizer set at a single time step or at multiple consecutive time steps in the prediction time horizon is equal to the probability that is outputted by the trained parametric function for performing the task defined by the parameters.

8. The controller of claim 3, wherein the parametric function is trained, based on a regression approach, to directly output a continuous approximation for feasible values of one or multiple discrete variables at a single time step or at multiple consecutive time steps in the prediction time horizon of the MICP for performing the task defined by the problem parameters.

9. The controller of claim 8, wherein the predicted values of the set of discrete variables are produced by rounding the continuous approximation that is outputted by the trained parametric function to a nearest integer-feasible candidate solution.

10. The controller of claim 3, wherein the processor is at least one parallel processor and the solution to the MICP problem is found by testing the multiple candidate solutions in parallel to find the feasible motion trajectory.

11. The controller of claim, 1 wherein an iteration of the presolve-based correction consists of one or multiple single presolve steps, and each single presolve step is an iterative procedure that performs one or multiple iterations until a termination condition is met, and each iteration of the single presolve step comprises one or a combination of presolve operations including domain propagation for bound strengthening of continuous and/or discrete optimization variables, based on equality and inequality constraints in the MICP for performing the task defined by the problem parameters; redundant inequality constraint detection and removal, and dual fixing of continuous and/or discrete optimization variables, based on the cost function and based on equality and inequality constraints in the MICP; inequality constraint coefficient strengthening to replace one or multiple inequality constraints by one or multiple dominating inequality constraints, and the dominating inequality constraints can reduce the feasible search space of the relaxed problem without removing an integer-feasible solution of the MICP; and binary variable probing that aims to fix values of one or multiple discrete variables by probing feasibility of fixed values of one or multiple discrete variables in the MICP for performing the task defined by the problem parameters.

12. The controller of claim 11, wherein each iteration of the single presolve step comprises one or multiple tailored block-sparse presolve operations that exploit the block-structured sparsity of a mixed-integer optimal control problem (MIOCP) for performing the task defined by the parameters.

13. The controller of claim 12, wherein the tailored block-sparse presolve operations can include one or a combination of block-sparse forward-backward operations for domain propagation and bound strengthening of continuous and/or discrete optimization variables, based on equality and inequality constraints in the block-structured MIOCP for performing the task defined by the problem parameters; block-sparse redundant inequality constraint detection and dual fixing of continuous and/or discrete optimization variables, based on the cost function and based on equality and inequality constraints in the block-structured MIOCP; block-sparse inequality constraint coefficient strengthening to replace one or multiple inequality constraints by one or multiple dominating inequality constraints in the block-structured MIOCP; and block-sparse binary variable probing that aims to fix values of one or multiple discrete variables by probing feasibility of fixed values of one or multiple discrete variables in the block-structured MIOCP.

14. The controller of claim 2, wherein the parametric function is a recurrent neural network (RNN) and each step of the RNN corresponds to a prediction for values of a set of discrete variables at a single or multiple consecutive time steps in the prediction time horizon of the MICP, such that a sequential evaluation of the RNN results in predicted values for each of the discrete variables of the MICP.

15. The controller of claim 2, wherein the parametric function approximation architecture can consist of one or multiple layers of a feedforward deep neural network, one or multiple layers of a long short-term memory (LSTM) network, one or multiple layers of a gated recurrent unit (GRU) and/or one or multiple layers of a convolutional neural network (CNN).

16. The controller of claim 1, wherein a first subset of discrete variables in the MICP are fixed to the predicted values outputted by the trained parametric function, a second subset of discrete variables in the MICP are fixed by a presolve-based correction to values that are uniquely defined by the fixed values for the first subset of discrete variables and the constraints, and a third subset of discrete variables in the MICP are selected to be free optimization variables, such that an approximation of the MICP with a reduced number of discrete optimization variables is solved subject to the constraints to produce a feasible motion trajectory, for example, using a branch-and-bound (B&B) optimization method in combination with one or multiple tailored block-sparse presolve operations that exploit the block-structured sparsity of a mixed-integer optimal control problem (MIOCP) for performing the task defined by the parameters.

17. A hybrid dynamical system including the controller of claim 1, wherein the control command generated by the controller specifies a target state of the hybrid dynamical system, the hybrid dynamical system comprises: a tracking controller configured to generate one or multiple control inputs to the actuators of the hybrid dynamical system to reduce an error between the current state and a target state of the hybrid dynamical system, wherein the tracking controller is a PID controller or a model predictive controller (MPC).

18. The controller of claim 1, wherein the controller is a mixed-integer model predictive controller (MIMPC), wherein the MIMPC computes a control signal based on parameters of the task, including a current state of the system and control command, and wherein the MIMPC computes a control solution that comprises a sequence of future optimal discrete and continuous control inputs over a prediction time horizon of the hybrid dynamical system, by solving a constrained mixed-integer optimization problem at each control time step.

19. The controller of claim 1, wherein the device is a vehicle, and wherein the controller determines an input to the vehicle based on the MICP solution, wherein the input to the vehicle includes one or a combination of an acceleration of the vehicle, an engine torque of the vehicle, brake torques, and a steering angle; the discrete optimization variables are used to model one or a combination of discrete control decisions, switching in the system dynamics, gear shifting, and obstacle avoidance constraints; and the problem parameters of the task can include a current state of the vehicle, a goal or target state, a position and/or orientation of one or multiple obstacles, one or multiple actuation limits, one or multiple weight values in objective function and/or one or multiple bound values in mixed-integer inequality constraints of the mixed-integer optimal control problem (MIOCP).

20. The controller of claim 1, wherein the device is a spacecraft, and wherein the controller determines an input to the spacecraft based on the MICP solution, wherein the input to the spacecraft actuates one or a combination of thrusters and momentum exchange devices; the discrete optimization variables are used to model one or a combination of discrete control decisions, switching in the system dynamics, integer values for the thruster commands, and obstacle avoidance constraints; and the problem parameters of the task can include a current state of the spacecraft, a goal or target state, a position and/or orientation of one or multiple obstacles, one or multiple actuation limits, one or multiple weight values in objective function and/or one or multiple bound values in mixed-integer inequality constraints of the MIOCP.

21. The controller of claim 1, wherein the device is a vapor compression system, and wherein the controller determines an input to the vapor compression system based on the MICP solution, wherein the input to the vapor compression system includes one or a combination of an indoor unit fan speed, an outdoor unit fan speed, a compressor rotational speed, an expansion valve position, and a flow reversing valve position; the discrete optimization variables are used to model one or a combination of discrete control decisions, switching in the system dynamics, and integer values for the commands that are sent to the valves and/or to the fans; and the problem parameters of the task can include a current state of the vapor compression system, a goal or target state, one or multiple actuation limits, one or multiple weight values in objective function and/or one or multiple bound values in mixed-integer inequality constraints of the MIOCP.

* * * * *